(12) United States Patent
Huang

(10) Patent No.: US 11,762,171 B2
(45) Date of Patent: Sep. 19, 2023

(54) THREE-PIECE COMPACT OPTICAL LENS SYSTEM

(71) Applicant: NEWMAX TECHNOLOGY CO., LTD., Taichung (TW)

(72) Inventor: Ching-Yun Huang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 17/826,122

(22) Filed: May 26, 2022

(65) Prior Publication Data

US 2022/0291484 A1 Sep. 15, 2022

Related U.S. Application Data

(63) Continuation of application No. 16/739,127, filed on Jan. 10, 2020, now abandoned.

(51) Int. Cl.
*G02B 13/00* (2006.01)
*G02B 9/12* (2006.01)

(52) U.S. Cl.
CPC .......... *G02B 13/0035* (2013.01); *G02B 9/12* (2013.01)

(58) Field of Classification Search
CPC .... G02B 13/0035; G02B 9/12; G02B 23/243; G06K 9/00006; G06K 9/00053
See application file for complete search history.

(56) References Cited

U.S. PATENT DOCUMENTS

2020/0174226 A1* 6/2020 Lin .................... G02B 13/0035

* cited by examiner

*Primary Examiner* — Cara E Rakowski
(74) *Attorney, Agent, or Firm* — BRUCE STONE LLP; Joseph A. Bruce

(57) ABSTRACT

A three-piece compact optical lens system includes, in order from the object side to the image side: a flat panel assembly, a first lens element; a stop; a second lens element; and a third lens element. Wherein a distance from an object to an image plane along the optical axis is OTL, a distance from an image-side surface of the flat panel to the image plane along the optical axis is PTL, an image height of the image plane is Y, an object height of a chief ray of the image height of the image plane which corresponds to the image-side surface of the flat panel is P, and they satisfy the relations: 2.5 mm<PTL<4.5 mm; 2.2<P/Y<7.0; 4<OTL/Y<12.

17 Claims, 42 Drawing Sheets

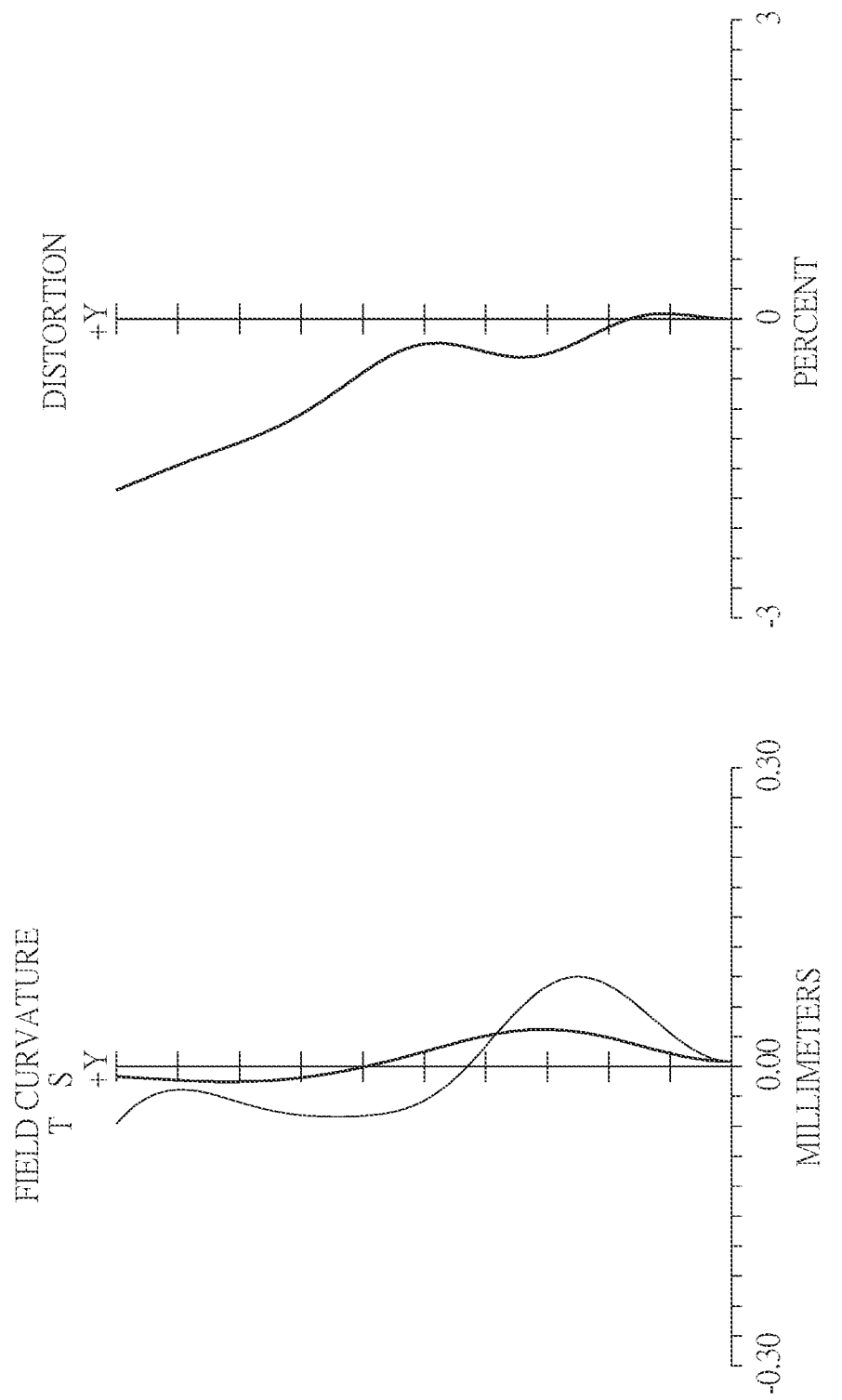

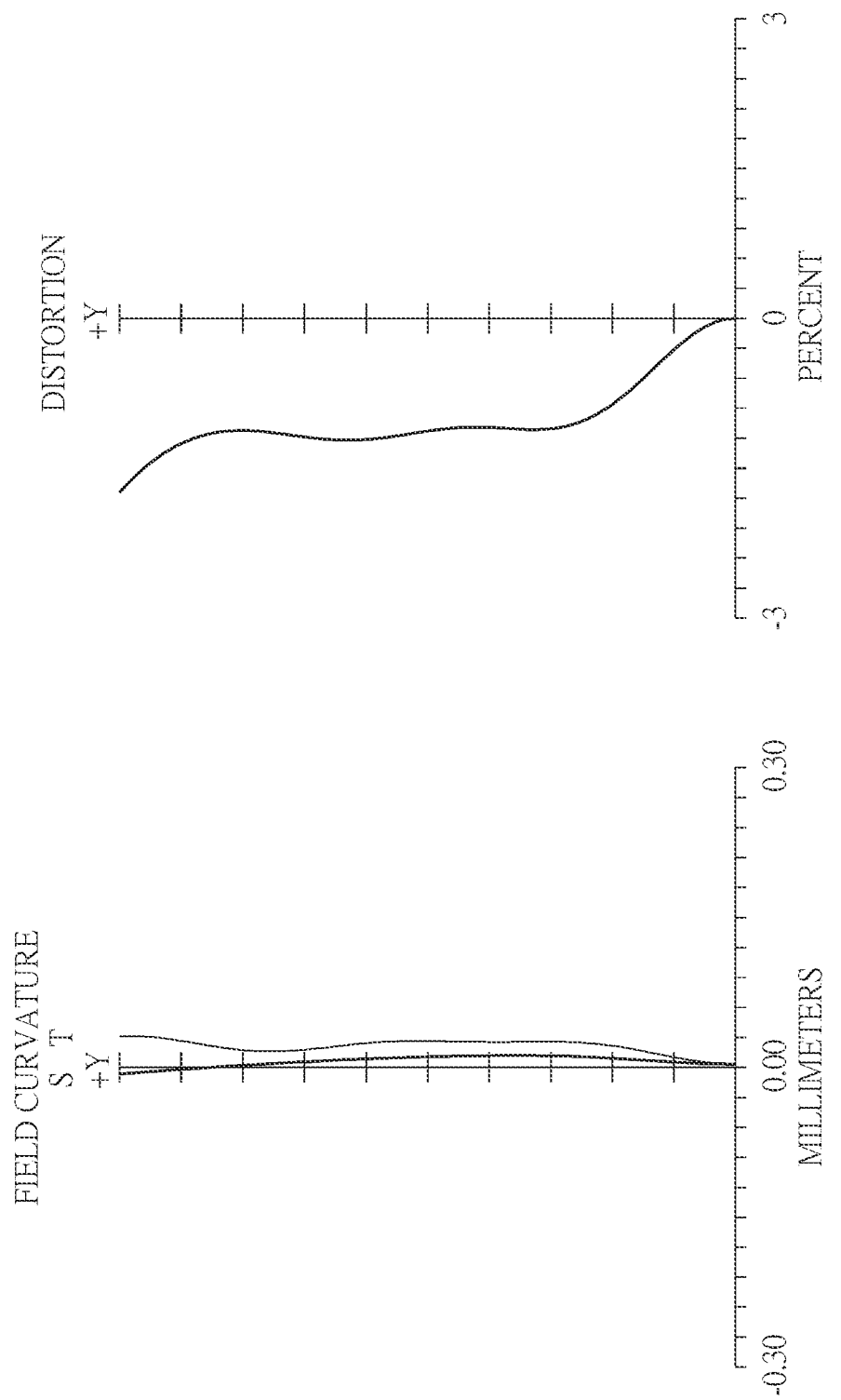

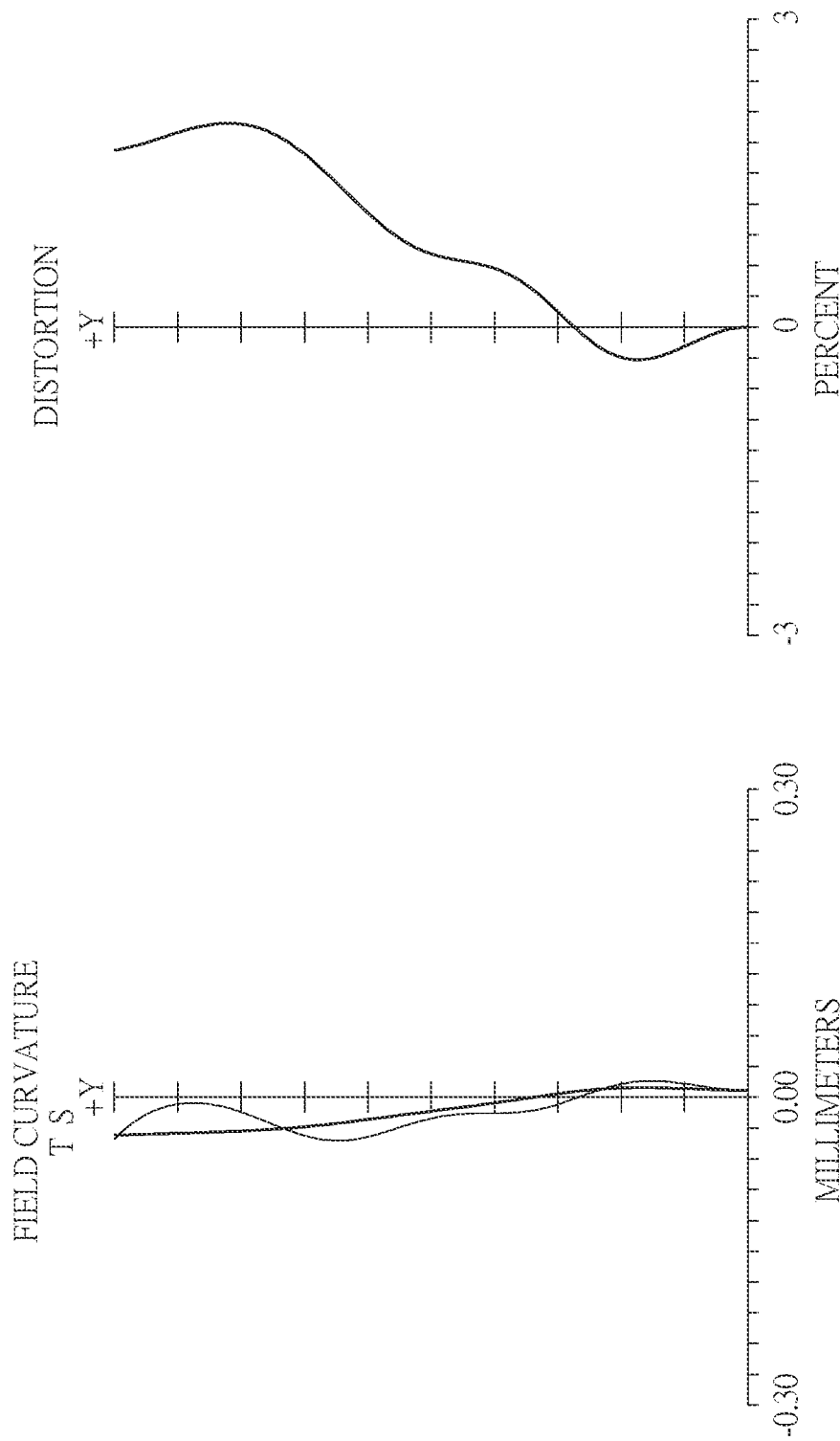

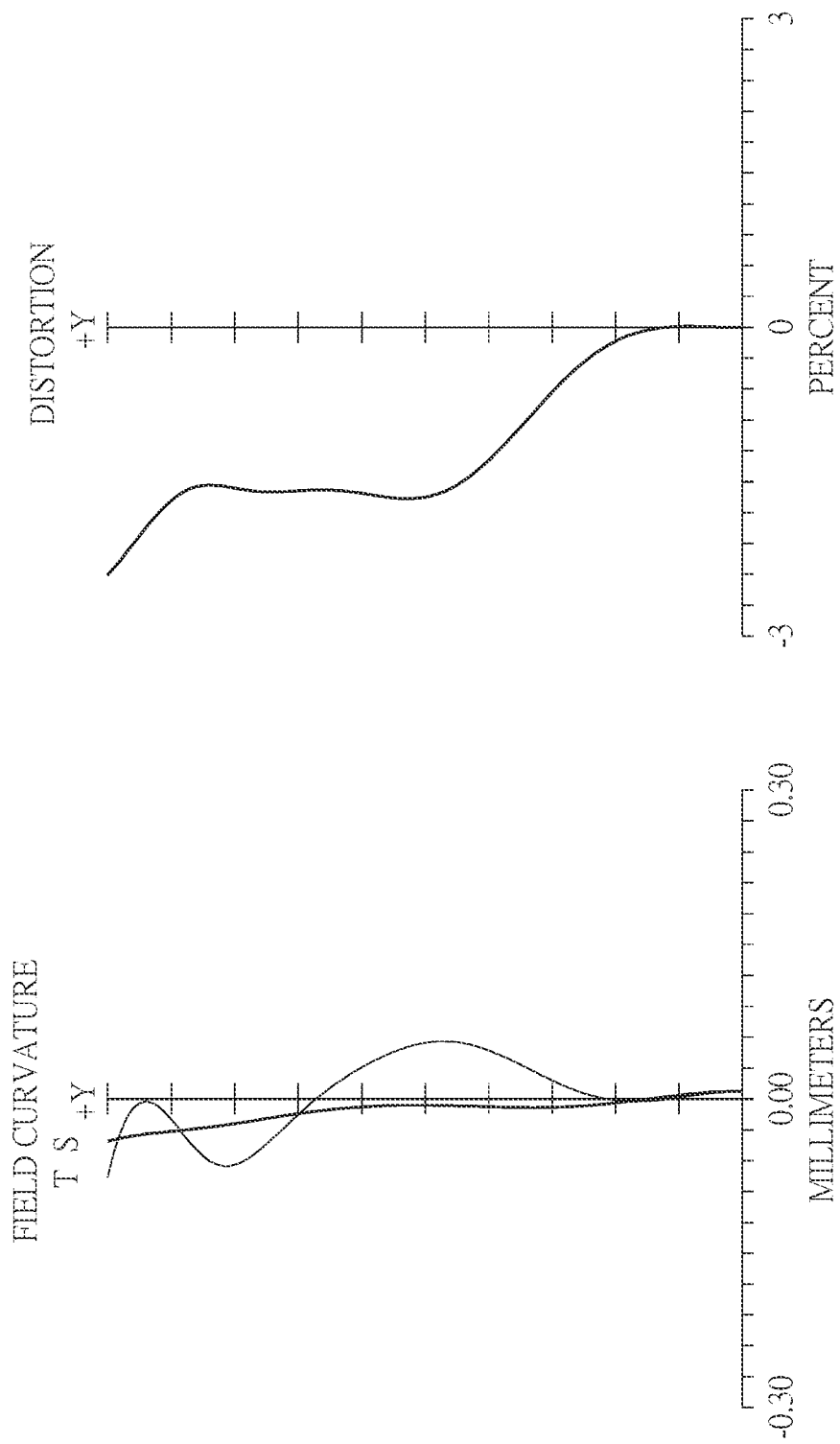

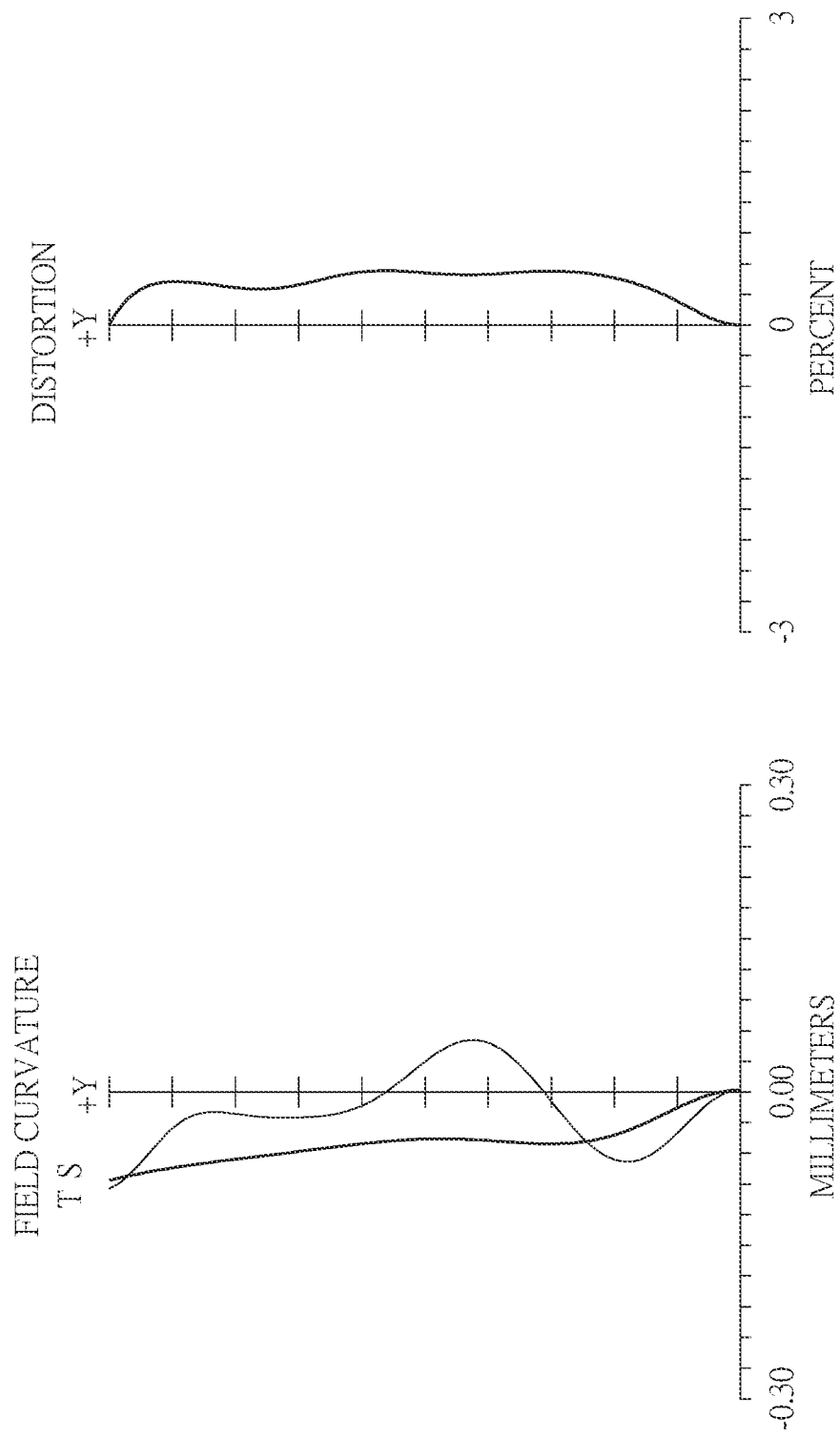

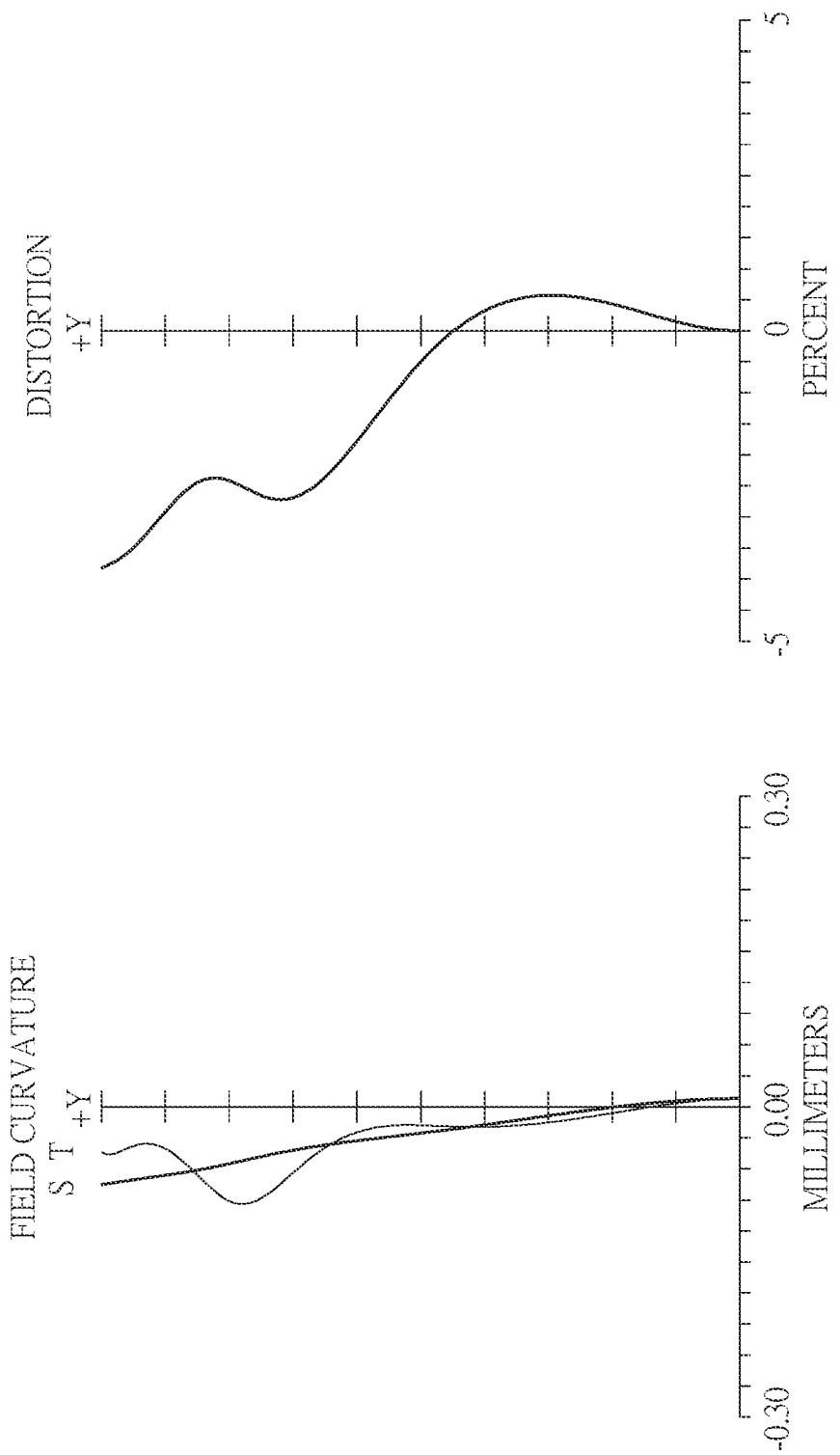

THREE-PIECE COMPACT OPTICAL LENS SYSTEM

CROSS REFERENCE TO RELATED APPLICATION

This application is a continuation application of U.S. patent application Ser. No. 16/739,127, which claims the earlier filing date of Jan. 10, 2020, the entire specification of which is incorporated herein by reference.

BACKGROUND

Field of the Invention

The present invention relates to a lens system, and more particularly to a three-piece compact optical lens system applicable to electronic products.

Description of Related Art

The biometric identification (biometric) system based on the unique biometric characteristics of each organism, because of its uniqueness, universality, permanence, testability, convenience, acceptability, and impermissibility, it is often used in existing mobile devices on the current market, or even in future electronic devices. However, at present, the biometric identification system used in mobile devices is based on the principle of capacitance. Although it can reduce the required volume of the biometric identification system, the circuit structure is too complex, which makes the manufacturing cost too high, and the relative unit price of the product is also higher.

Although there are traditional biometric identification systems using optical imaging principles, such as fingerprint identification, vein identification and so on, the traditional biometric identification systems have the problem of too large volume, which makes it difficult to miniaturize the electronic devices equipped with the biometric identification systems, and it is also harder to carry.

The present invention mitigates and/or obviates the aforementioned disadvantages.

SUMMARY

The primary objective of the present invention is to provide a three-piece compact optical lens system which can reduce the distance between an object and the three-piece compact optical lens system, reduce the volume effectively, and maintain its miniaturization.

Another objective of the present invention is to provide a three-piece compact optical lens system which can effectively collect light at a large angle, receive a wider range of images and achieve identification effects within very short distances.

Therefore, a three-piece compact optical lens system in accordance with the present invention comprises, in order from an object side to an image side: a flat panel made of glass; a first lens element with a negative refractive power, at least one of an object-side surface and an image-side surface of the first lens element being aspheric; a stop; a second lens element with a positive refractive power having an object-side surface being convex near an optical axis, at least one of the object-side surface and an image-side surface of the second lens element being aspheric; and a third lens element with a refractive power, at least one of an object-side surface and an image-side surface of the third lens element being aspheric.

Wherein the three-piece compact optical lens system has a total of three lens elements with refractive power, a distance from an object to an image plane along the optical axis is OTL, a distance from an image-side surface of the flat panel to the image plane along the optical axis is PTL, an image height of the image plane is Y, an object height of a chief ray of the image height of the image plane which corresponds to the image-side surface of the flat panel is P, and they satisfy the relations: 2.5 mm<PTL<4.5 mm; 2.2<P/Y<7.0; 4<OTL/Y<12.

Preferably, a focal length of the three-piece compact optical lens system is f, a focal length of the first lens element is f1, and they satisfy the relation: −0.86<f/f1<−0.22, so that the refractive power of the three-piece compact optical lens system can be balanced, so as to correct the aberration of the three-piece compact optical lens system effectively and reduce the sensitivity of the three-piece compact optical lens system.

Preferably, the focal length of the three-piece compact optical lens system is f, a focal length of the second lens element is f2, and they satisfy the relation: 0.05<f/f2<1.27, so that the refractive power of the three-piece compact optical lens system can be balanced, so as to correct the aberration of the three-piece compact optical lens system effectively and reduce the sensitivity of the three-piece compact optical lens system.

Preferably, the focal length of the three-piece compact optical lens system is f, a focal length of the third lens element is f3, and they satisfy the relation: −0.17<f/f3<0.82, so that the refractive power of the three-piece compact optical lens system can be balanced, so as to correct the aberration of the three-piece compact optical lens system effectively and reduce the sensitivity of the three-piece compact optical lens system.

Preferably, the focal length of the three-piece compact optical lens system is f, a focal length of the second lens element and the third lens element combined is f23, and they satisfy the relation: 0.45<f/f23<1.04, so that the shortening of the total length of the system and the correction of aberration can be balanced.

Preferably, the focal length of the first lens element is f1, the focal length of the second lens element and the third lens element combined is f23, and they satisfy the relation: −3.07<f1/f23<−0.63, so that the resolution can be improved evidently.

Preferably, the focal length of the first lens element is f1, a radius of curvature of the object-side surface of the first lens element is R1, and they satisfy the relation: −0.13<f1/R1<4.95, which can reduce the distortion.

Preferably, the focal length of the first lens element is f1, a radius of curvature of the image-side surface of the first lens element is R2, and they satisfy the relation: −2.41<f1/R2<1.93, so that the curvature of the image-side surface of the first lens element will be appropriate, it will be favorable to reduce the total length of the three-piece compact optical lens system.

Preferably, the focal length of the second lens element is f2, a radius of curvature of the object-side surface of the second lens element is R3, and they satisfy the relation: 0.25<f2/R3<5.64, it will be favorable to reduce the sensitivity of the system, effectively improving the yield of production.

Preferably, the focal length of the second lens element is f2, a radius of curvature of the image-side surface of the second lens element is R4, and they satisfy the relation: −2.04<f2/R4<3.87, so that it can further reduce the peripheral curvature of the image-side surface of the second lens element, and realize the characteristic of reducing stray light.

Preferably, the focal length of the third lens element is f3, a radius of curvature of the object-side surface of the third lens element is R5, and they satisfy the relation: −56.34<f3/R5<2.58, so that the magnification of imaging is corrected.

Preferably, the focal length of the third lens element is f3, a radius of curvature of the image-side surface of the third lens element is R6, and they satisfy the relation: −40.72<f3/R6<0.49, so that the magnification of imaging is corrected.

Preferably, the radius of curvature of the object-side surface of the first lens element is R1, the radius of curvature of the image-side surface of the first lens element is R2, and they satisfy the relation: −38.2<R1/R2<276.13, so that the spherical aberration and astigmatism of the three-piece compact optical lens system can be reduced.

Preferably, the radius of curvature of the object-side surface of the second lens element is R3, the radius of curvature of the image-side surface of the second lens element is R4, and they satisfy the relation: −5.91<R3/R4<0.82, so that the astigmatism of the three-piece compact optical lens system can be reduced.

Preferably, the radius of curvature of the object-side surface of the third lens element is R5, the radius of curvature of the image-side surface of the third lens element is R6, and they satisfy the relation: −2.86<R5/R6<22.19, so that the curvature configuration of the surfaces of the third lens element can be balanced effectively, so as to balance the field of view with the total track length.

Preferably, the focal length of the three-piece compact optical lens system is f, the distance from the object to the image plane along the optical axis is OTL, and they satisfy the relation: 7.71<OTL/f<17.62, it will be favorable to maintain the objective of miniaturization and long focus of the three-piece compact optical lens system, which can be used in thin electronic products.

Preferably, the focal length of the first lens element is f1, the focal length of the second lens element is f2, the focal length of the third lens element is f3, and they satisfy the relation: −4.56 mm$^{-2}$<(f1+f2+f3)/(f1*f2*f3)<−0.53 mm$^{-2}$, so that the object can be well imaged on the image plane with small aberration and high relative illumination on the short object distance.

Preferably, the object-side surface of the first lens element is concave near the optical axis, which can effectively collect light at a large angle and receive a wider range of images within very short distances.

Preferably, the image-side surface of the second lens element is convex near the optical axis, which can improve the image resolution of the three-piece compact optical lens system.

Preferably, the image-side surface of the third lens element is convex near the optical axis, which can correct the aberration from a large angle of view of compensation.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 1C shows the image plane curve and the distortion curve of the first embodiment of the present invention;

FIG. 3C shows the image plane curve and the distortion curve of the third embodiment of the present invention;

FIG. 4C shows the image plane curve and the distortion curve of the fourth embodiment of the present invention;

FIG. 5C shows the image plane curve and the distortion curve of the fifth embodiment of the present invention;

FIG. 9C shows the image plane curve and the distortion curve of the ninth embodiment of the present invention;

FIG. 13C shows the image plane curve and the distortion curve of the thirteenth embodiment of the present invention;

DETAILED DESCRIPTION

Figure 1A:
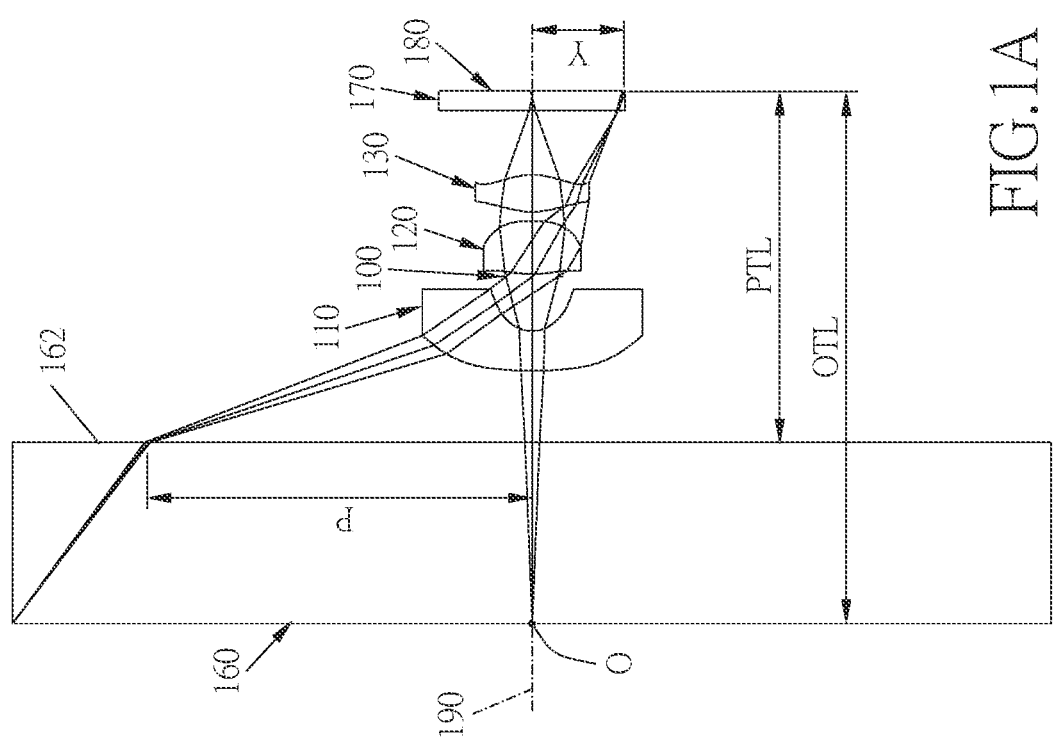
FIG. 1A shows a three-piece compact optical lens system in accordance with a first embodiment of the present invention.
Figure 1B:
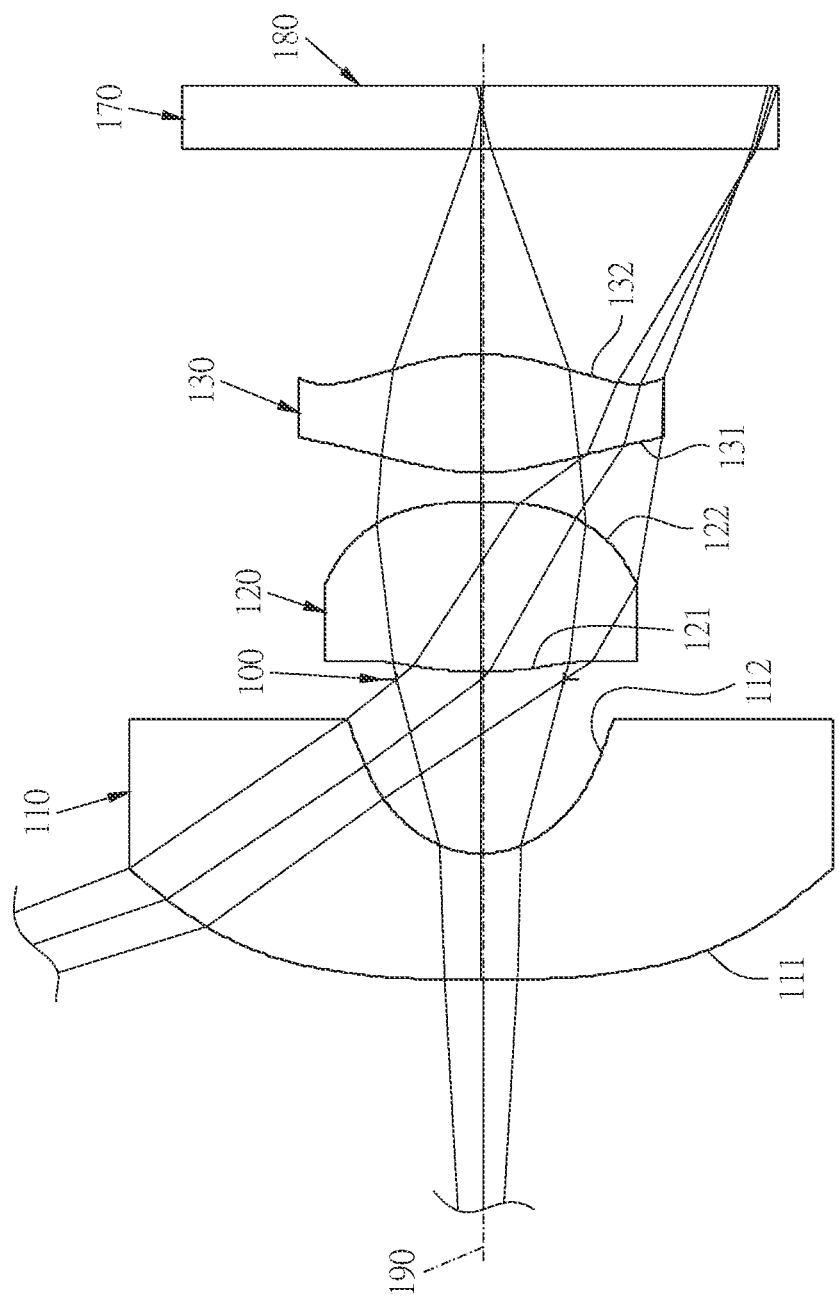
FIG. 1B is a partial enlarged view of FIG. 1A.

Referring to FIGS. 1A, 1B and FIG. 1C, FIG. 1A shows a three-piece compact optical lens system in accordance with a first embodiment of the present invention, FIG. 1B is a partial enlarged view of FIG. 1A, and FIG. 1C shows, in order from left to right, the image plane curve and the distortion curve of the first embodiment of the present invention. A three-piece compact optical lens system in accordance with the first embodiment of the present invention comprises, in order from an object side to an image side: a flat panel 160, a first lens element 110, a stop 100, a second lens element 120, a third lens element 130, an IR cut filter 170, and an image plane 180, wherein the three-piece compact optical lens system has a total of three lens elements with refractive power. The stop 100 is disposed between the first lens element 110 and the second lens element 120.

The flat panel 160 made of glass is located between an object O and the first lens element 110 and has no influence on the focal length of the three-piece compact optical lens system.

The first lens element 110 with a negative refractive power has an object-side surface 111 being convex near an optical axis 190 and an image-side surface 112 being concave near the optical axis 190, the object-side surface 111 and the image-side surface 112 are aspheric, and the first lens element 110 is made of plastic material.

The second lens element 120 with a positive refractive power has an object-side surface 121 being convex near the optical axis 190 and the image-side surface 122 being convex near the optical axis 190, the object-side surface 121 and the image-side surface 122 are aspheric, and the second lens element 120 is made of plastic material.

The third lens element 130 with a positive refractive power has an object-side surface 131 being convex near the optical axis 190 and an image-side surface 132 being convex near the optical axis 190, the object-side surface 131 and the image-side surface 132 are aspheric, and the third lens element 130 is made of plastic material.

The IR cut filter 170 made of glass is located between the third lens element 130 and the image plane 180 and has no influence on the focal length of the three-piece compact optical lens system.

The equation for the aspheric surface profiles of the respective lens elements of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16}$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present three-piece compact optical lens system, a focal length of the three-piece compact optical lens system is f, a f-number of the three-piece compact optical lens system is Fno, the three-piece compact optical lens system has a maximum view angle (field of view) FOV, and they satisfy the relations: f=0.47 mm; Fno=1.34; and FOV=145.8 degrees.

In the first embodiment of the present three-piece compact optical lens system, a distance from the object O to the image plane 180 along the optical axis 190 is OTL, a distance from an image-side surface 162 of the flat panel 160 to the image plane 180 along the optical axis 190 is PTL, an image height of the image plane 180 is Y, an object height of a chief ray of the image height of the image plane 180 which corresponds to the image-side surface 162 of the flat panel 160 is P, and they satisfy the relations: PTL=3.71 mm; P/Y=4.21; OTL/Y=5.29.

In the first embodiment of the present three-piece compact optical lens system, the focal length of the three-piece compact optical lens system is f, a focal length of the first lens element 110 is f1, and they satisfy the relation: f/f1=−0.55.

In the first embodiment of the present three-piece compact optical lens system, the focal length of the three-piece compact optical lens system is f, a focal length of the second lens element 120 is f2, and they satisfy the relation: f/f2=0.27.

In the first embodiment of the present three-piece compact optical lens system, the focal length of the three-piece compact optical lens system is f, a focal length of the third lens element 130 is f3, and they satisfy the relation: f/f3=0.55.

In the first embodiment of the present three-piece compact optical lens system, the focal length of the three-piece compact optical lens system is f, a focal length of the second lens element 120 and the third lens element 130 combined is f23, and they satisfy the relation: f/f23=0.67.

In the first embodiment of the present three-piece compact optical lens system, the focal length of the first lens element 110 is f1, the focal length of the second lens element 120 and the third lens element 130 combined is f23, and they satisfy the relation: f1/f23=−1.21.

In the first embodiment of the present three-piece compact optical lens system, the focal length of the first lens element 110 is f1, a radius of curvature of the object-side surface 111 of the first lens element 110 is R1, and they satisfy the relation: f1/R1=−0.11.

In the first embodiment of the present three-piece compact optical lens system, the focal length of the first lens element 110 is f1, a radius of curvature of the image-side surface 112 of the first lens element 110 is R2, and they satisfy the relation: f1/R2=−2.01.

In the first embodiment of the present three-piece compact optical lens system, the focal length of the second lens element 120 is f2, a radius of curvature of the object-side surface 121 of the second lens element 120 is R3, and they satisfy the relation: f2/R3=1.24.

In the first embodiment of the present three-piece compact optical lens system, the focal length of the second lens element 120 is f2, a radius of curvature of the image-side surface 122 of the second lens element 120 is R4, and they satisfy the relation: f2/R4=−0.73.

In the first embodiment of the present three-piece compact optical lens system, the focal length of the third lens element 130 is f3, a radius of curvature of the object-side surface 131 of the third lens element 130 is R5, and they satisfy the relation: f3/R5=1.10.

In the first embodiment of the present three-piece compact optical lens system, the focal length of the third lens element 130 is f3, a radius of curvature of the image-side surface 132 of the second lens element 130 is R6, and they satisfy the relation: f3/R6=−0.93.

In the first embodiment of the present three-piece compact optical lens system, the radius of curvature of the object-side surface 111 of the first lens element 110 is R1, the radius of curvature of the image-side surface 112 of the first lens element 110 is R2, and they satisfy the relation: R1/R2=18.66.

In the first embodiment of the present three-piece compact optical lens system, the radius of curvature of the object-side surface 121 of the second lens element 120 is R3, the radius of curvature of the image-side surface 122 of the second lens element 120 is R4, and they satisfy the relation: R3/R4=−0.59.

In the first embodiment of the present three-piece compact optical lens system, the radius of curvature of the object-side surface 131 of the third lens element 130 is R5, the radius of curvature of the image-side surface 132 of the third lens element 130 is R6, and they satisfy the relation: R5/R6=−0.84.

The detailed optical data of the first embodiment is shown in table 1, and the aspheric surface data is shown in table 2.

TABLE 1

Embodiment 1
f(focal length) = 0.47 mm, Fno = 1.34, FOV = 145.8 deg.

| surface | | Curvature Radius | | Thickness | Material | Index | Abbe # | Focal length |
|---|---|---|---|---|---|---|---|---|
| 0 | object | infinity | | 0 | | | | |
| 1 | flat panel | infinity | | 1.920 | glass | 1.52 | 64.2 | |
| 2 | | infinity | | 0.759 | | | | |
| 3 | Lens 1 | 7.812 | (ASP) | 0.418 | plastic | 1.54 | 56 | −0.843 |
| 4 | | 0.419 | (ASP) | 0.578 | | | | |
| 5 | stop | infinity | | 0.023 | | | | |
| 6 | Lens 2 | 1.369 | (ASP) | 0.562 | plastic | 1.54 | 56 | 1.697 |
| 7 | | −2.318 | (ASP) | 0.095 | | | | |
| 8 | Lens 3 | 0.775 | (ASP) | 0.392 | plastic | 1.54 | 56 | 0.854 |
| 9 | | −0.920 | (ASP) | 0.678 | | | | |
| 10 | IR-filter | infinity | | 0.210 | glass | 1.52 | 54.5 | |
| 11 | | infinity | | infinity | | | | |
| 12 | Image plane | infinity | | 0.000 | | | | |

TABLE 2

Aspheric Coefficients

| surface | 3 | 4 | 6 | 7 | 8 | 9 |
|---|---|---|---|---|---|---|
| K: | −5.7472E+01 | −8.9357E−01 | −7.4166E+00 | 1.4621E+01 | −1.4072E+01 | −1.6742E+00 |
| A: | 1.6242E−01 | 1.4532E+00 | −3.2397E−01 | −2.4548E+00 | −1.5571E−01 | 4.2135E−01 |
| B: | −6.7207E−02 | 6.6913E+00 | 3.9740E−01 | 5.4445E+00 | 5.3286E−01 | 6.9299E−01 |
| C: | 3.2976E−02 | −8.7955E+01 | −3.9338E+01 | −1.3772E+00 | 2.7696E−01 | 1.2074E−01 |
| D: | −9.7415E−05 | 1.0373E+02 | 1.0799E+02 | −2.7269E+01 | −4.1137E+00 | −8.8446E−01 |
| E: | −5.7296E−03 | 4.3165E+03 | 1.2027E+03 | −3.3511E+01 | −5.1119E+00 | −1.3276E+00 |
| F | 6.9249E−04 | −1.3837E+04 | −5.3627E+03 | 1.6058E+02 | −7.4096E+04 | 7.9142E+00 |
| G | 0.0000E+00 | 0.0000E+00 | 0.0000E+00 | 0.0000E+00 | 2.9197E+05 | 0.0000E+00 |

The units of the radius of curvature, the thickness and the focal length in table 1 are expressed in mm, the surface numbers 0-12 represent the surfaces sequentially arranged from the object-side to the image-side along the optical axis. In table 2, k represents the conic coefficient of the equation of the aspheric surface profiles, and A, B, C, D, E, F, G . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
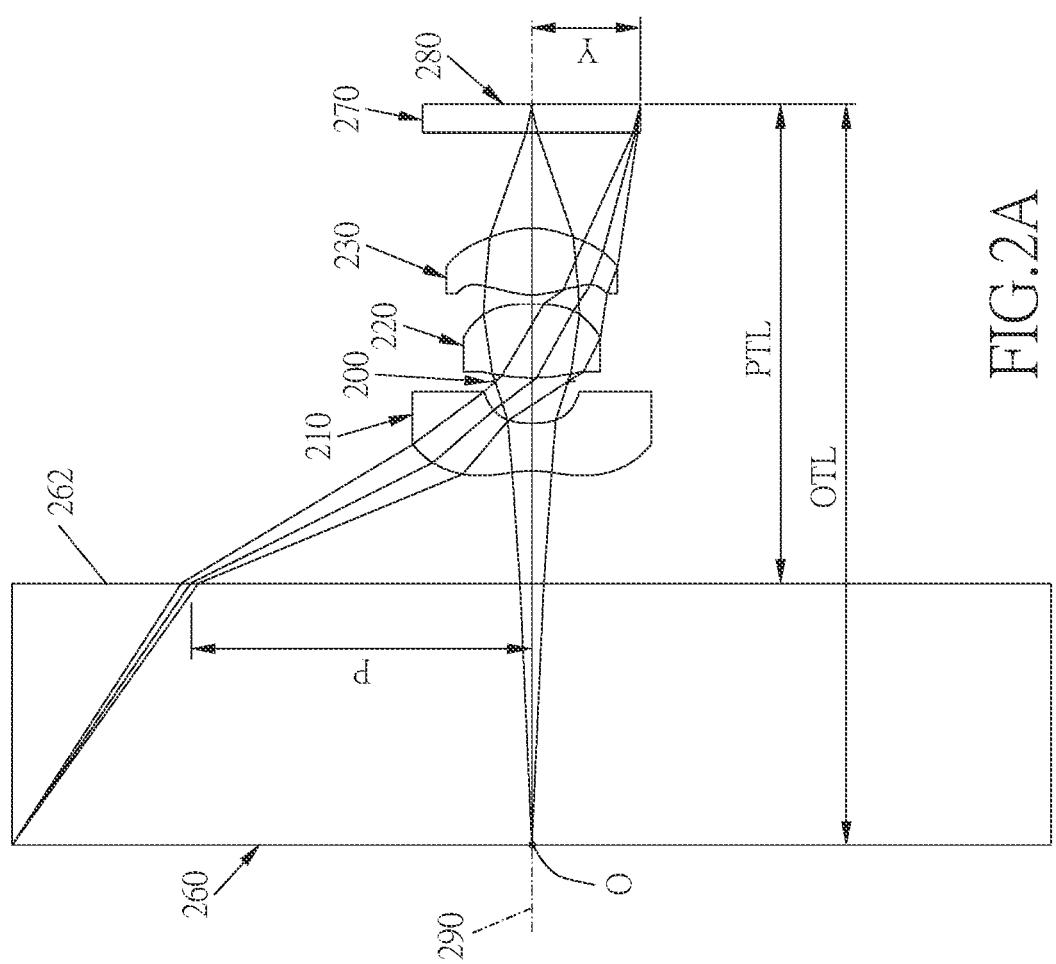
FIG. 2A shows a three-piece compact optical lens system in accordance with a second embodiment of the present invention.
Figure 2B:
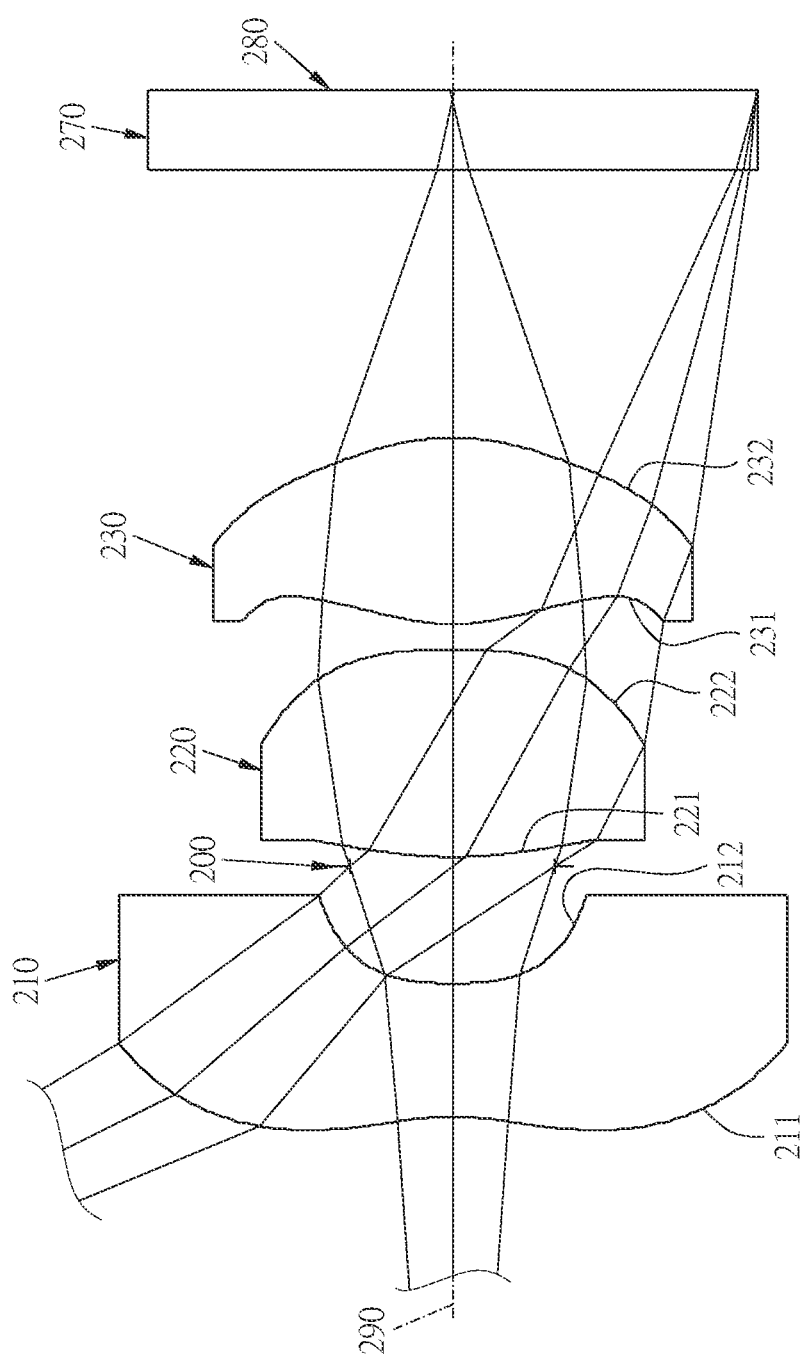
FIG. 2B is a partial enlarged view of FIG. 2A.
Figure 2C:
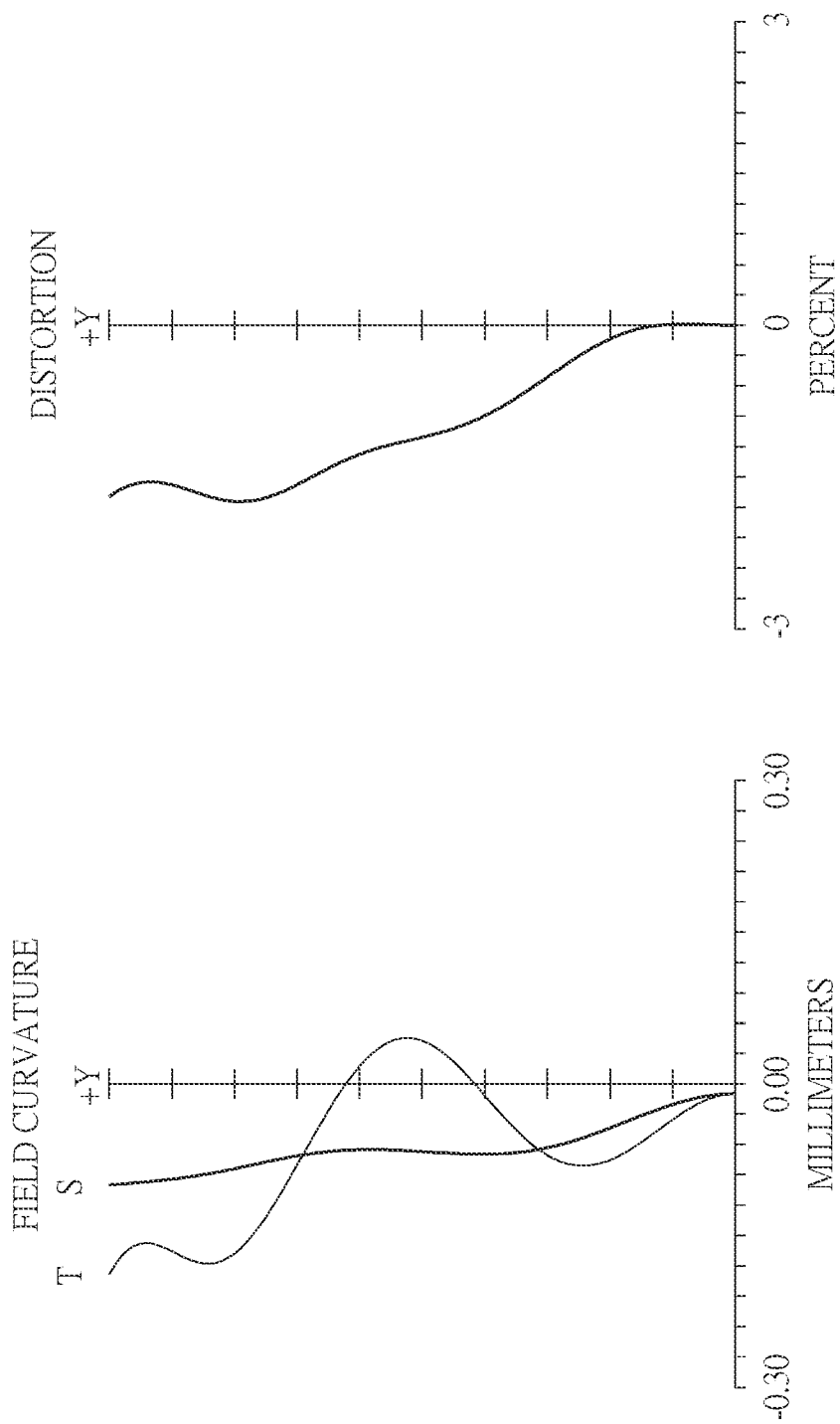
FIG. 2C shows the image plane curve and the distortion curve of the second embodiment of the present invention.

Referring to FIGS. 2A, 2B and FIG. 2C, FIG. 2A shows a three-piece compact optical lens system in accordance with a second embodiment of the present invention, FIG. 2B is a partial enlarged view of FIG. 2A, and FIG. 2C shows, in order from left to right, the image plane curve and the distortion curve of the second embodiment of the present invention. A three-piece compact optical lens system in accordance with the second embodiment of the present invention comprises, in order from an object side to an image side: a flat panel 260, a first lens element 210, a stop 200, a second lens element 220, a third lens element 230, an IR cut filter 270, and an image plane 280, wherein the three-piece compact optical lens system has a total of three lens elements with refractive power. The stop 200 is disposed between the first lens element 210 and the second lens element 220.

The IR cut filter 270 made of glass is located between the third lens element 230 and the image plane 280 and has no influence on the focal length of the three-piece compact optical lens system.

The detailed optical data of the second embodiment is shown in table 3, and the aspheric surface data is shown in table 4.

TABLE 3

Embodiment 2
f(focal length) = 0.51 mm, Fno = 1.35, FOV = 131.8 deg.

| surface | | Curvature Radius | Thickness | Material | Index | Abbe # | Focal length |
|---|---|---|---|---|---|---|---|
| 0 | object | infinity | 0 | | | | |
| 1 | flat panel | infinity | 1.920 | glass | 1.52 | 64.2 | |
| 2 | | infinity | 0.826 | | | | |
| 3 | Lens 1 | −0.844 (ASP) | 0.349 | plastic | 1.54 | 56 | −0.901 |
| 4 | | 1.289 (ASP) | 0.306 | | | | |
| 5 | stop | infinity | 0.025 | | | | |
| 6 | Lens 2 | 1.322 (ASP) | 0.542 | plastic | 1.54 | 56 | 2.301 |
| 7 | | −15.601 (ASP) | 0.069 | | | | |
| 8 | Lens 3 | 0.641 (ASP) | 0.489 | plastic | 1.64 | 22.5 | 0.750 |
| 9 | | −0.790 (ASP) | 0.700 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 4

Aspheric Coefficients

| surface | 3 | 4 | 6 | 7 | 8 | 9 |
|---|---|---|---|---|---|---|
| K: | −2.3442E+01 | −4.9844E+01 | 2.8490E+00 | 9.9001E+01 | −7.6416E+00 | −7.7619E−01 |
| A: | 1.0765E+00 | 7.5873E+00 | −1.5036E+00 | −6.6820E+00 | −1.4350E+00 | 6.2334E−01 |
| B: | −2.1726E+00 | 2.0950E+01 | 4.6266E+00 | 5.4069E+01 | 7.9387E+00 | 1.7980E+00 |
| C: | 3.0355E+00 | −4.9614E+02 | 1.8684E+01 | −2.9229E+02 | −3.0382E+01 | −1.6452E+01 |
| D: | −1.9456E+00 | 2.4255E+03 | −1.3363E+02 | 6.4603E+02 | 4.1754E+01 | 4.6006E+01 |
| E: | −2.4161E−01 | −5.7838E+03 | −1.8030E+03 | 4.4773E+02 | 5.5685E+01 | −7.0441E+01 |
| F | 1.1009E+00 | 1.4339E+05 | 1.5015E+04 | −4.3322E+03 | −4.7327E+02 | 3.7539E+01 |
| G | −4.5514E−01 | −6.5383E+05 | −3.0287E+04 | 5.1888E+03 | 6.7829E+02 | 1.5713E+01 |

The flat panel 260 made of glass is located between an object O and the first lens element 210 and has no influence on the focal length of the three-piece compact optical lens system.

The first lens element 210 with a negative refractive power has an object-side surface 211 being concave near an optical axis 290 and an image-side surface 212 being concave near the optical axis 290, the object-side surface 211 and the image-side surface 212 are aspheric, and the first lens element 210 is made of plastic material.

The second lens element 220 with a positive refractive power has an object-side surface 221 being convex near the optical axis 290 and the image-side surface 222 being convex near the optical axis 290, the object-side surface 221 and the image-side surface 222 are aspheric, and the second lens element 220 is made of plastic material.

The third lens element 230 with a positive refractive power has an object-side surface 231 being convex near the optical axis 290 and an image-side surface 232 being convex near the optical axis 290, the object-side surface 231 and the image-side surface 232 are aspheric, and the third lens element 230 is made of plastic material.

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | |
|---|---|
| f[mm] | 0.51 |
| Fno | 1.35 |
| FOV[deg.] | 131.8 |
| OTL | 5.44 |
| PTL | 3.52 |
| $|f/(f1 * f2 * f3)|[mm^{-2}]$ | 0.33 |
| f/f1 | −0.57 |
| f/f2 | 0.22 |
| f/f3 | 0.69 |
| f/f23 | 0.74 |
| f1/f23 | −1.30 |

-continued

| Embodiment 2 | |
|---|---|
| f1/R1 | 1.07 |
| f1/R2 | −0.70 |
| f2/R3 | 1.74 |
| f2/R4 | −0.15 |
| f3/R5 | 1.17 |
| f3/R6 | −0.95 |
| R1/R2 | −0.65 |
| R3/R4 | −0.08 |
| R5/R6 | −0.81 |
| OTL/f | 10.58 |
| PTL/f | 6.84 |
| (f1 + f2 + f3)/(f1 * f2 * f3) [mm$^{-2}$] | −1.38 |
| P/Y | 3.13 |
| OTL/Y | 6.10 |

Figure 3A:
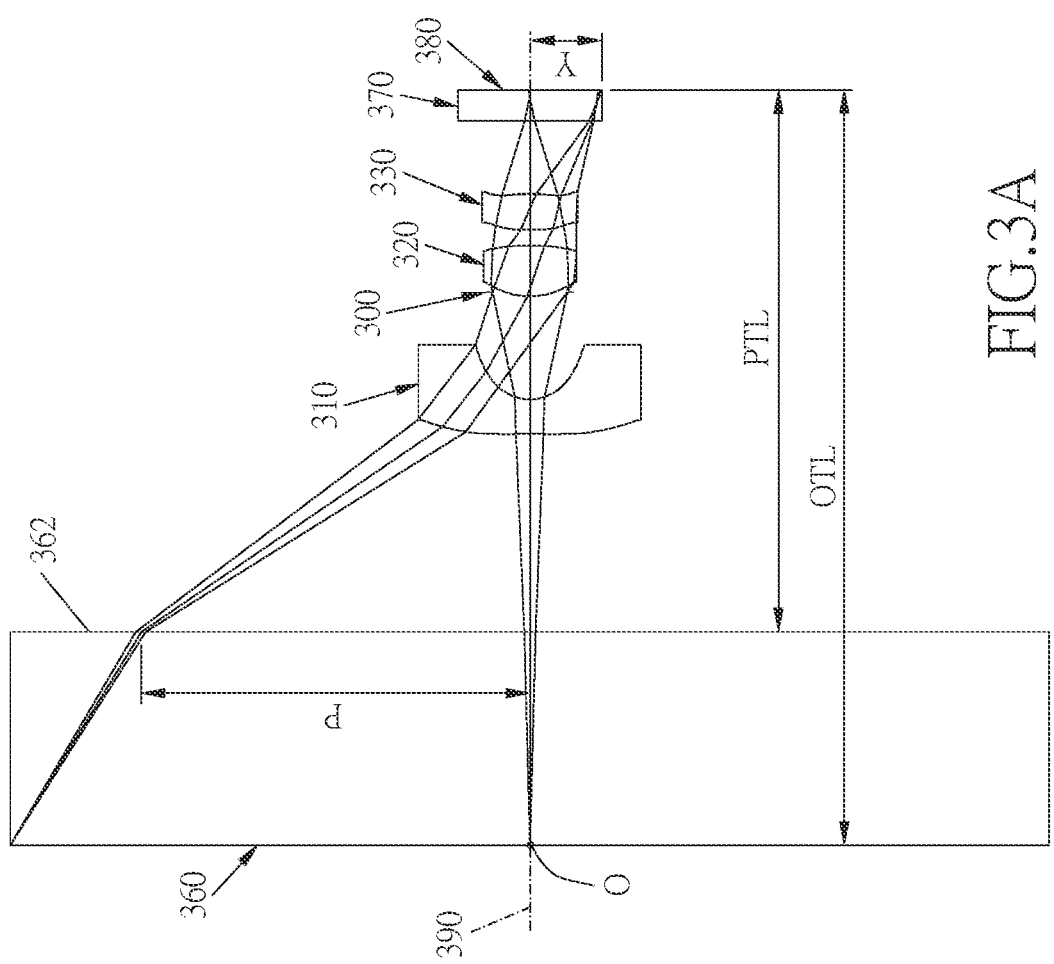
FIG. 3A shows a three-piece compact optical lens system in accordance with a third embodiment of the present invention.
Figure 3B:
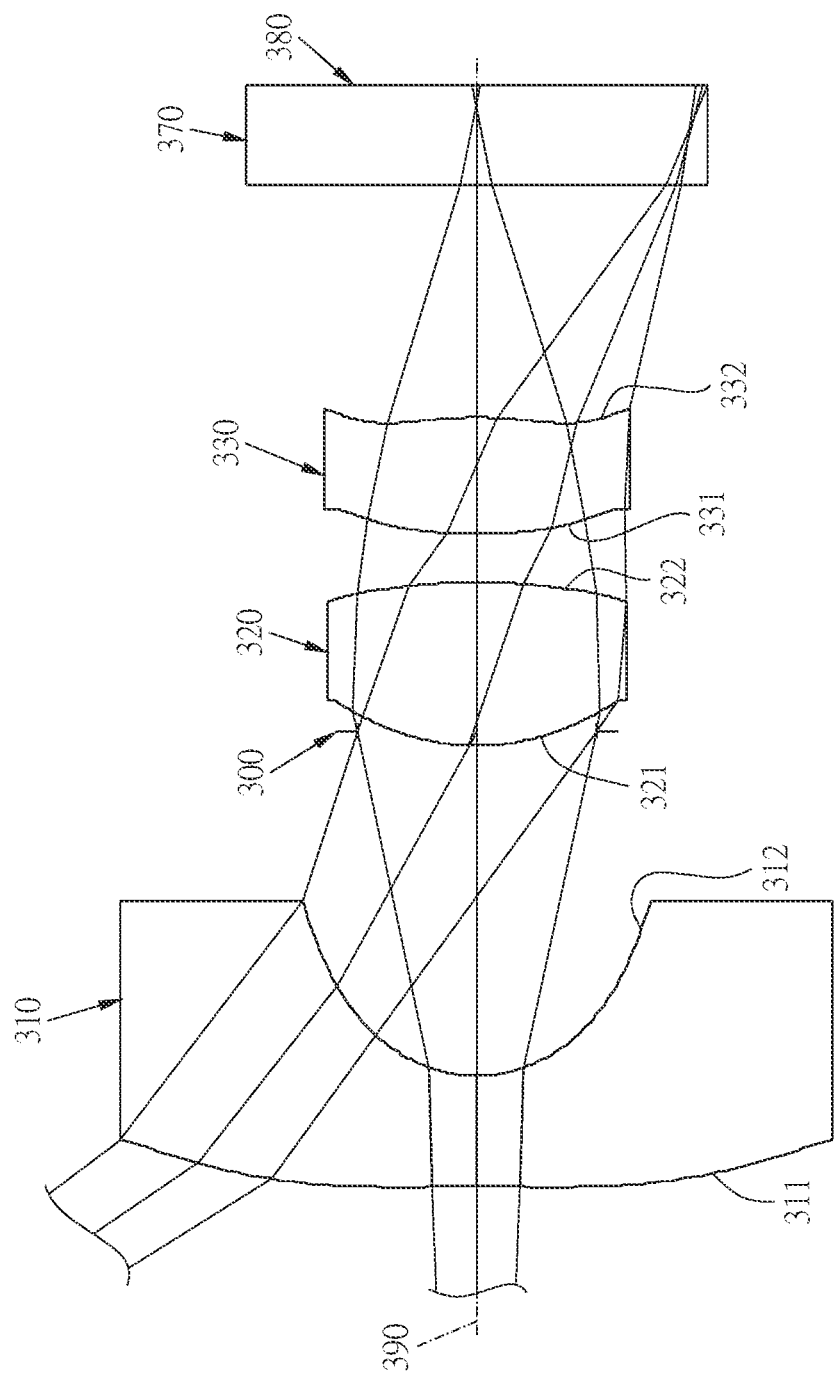
FIG. 3B is a partial enlarged view of FIG. 3A.

Referring to FIGS. 3A, 3B and FIG. 3C, FIG. 3A shows a three-piece compact optical lens system in accordance with a third embodiment of the present invention, FIG. 3B is a partial enlarged view of FIG. 3A, and FIG. 3C shows, in order from left to right, the image plane curve and the distortion curve of the third embodiment of the present invention. A three-piece compact optical lens system in accordance with the third embodiment of the present invention comprises, in order from an object side to an image side: a flat panel 360, a first lens element 310, a stop 300, a second lens element 320, a third lens element 330, an IR cut filter 370, and an image plane 380, wherein the three-piece compact optical lens system has a total of three lens elements with refractive power. The stop 300 is disposed between the first lens element 310 and the second lens element 320.

The flat panel 360 made of glass is located between an object O and the first lens element 310 and has no influence on the focal length of the three-piece compact optical lens system.

The first lens element 310 with a negative refractive power has an object-side surface 311 being concave near an optical axis 390 and an image-side surface 312 being concave near the optical axis 390, the object-side surface 311 and the image-side surface 312 are aspheric, and the first lens element 310 is made of plastic material.

The second lens element 320 with a positive refractive power has an object-side surface 321 being convex near the optical axis 390 and the image-side surface 322 being convex near the optical axis 390, the object-side surface 321 and the image-side surface 322 are aspheric, and the second lens element 320 is made of plastic material.

The third lens element 330 with a positive refractive power has an object-side surface 331 being convex near the optical axis 390 and an image-side surface 332 being convex near the optical axis 390, the object-side surface 331 and the image-side surface 332 are aspheric, and the third lens element 330 is made of plastic material.

The IR cut filter 370 made of glass is located between the third lens element 330 and the image plane 380 and has no influence on the focal length of the three-piece compact optical lens system.

The detailed optical data of the third embodiment is shown in table 5, and the aspheric surface data is shown in table 6.

TABLE 5

Embodiment 3
f(focal length) = 0.37 mm, Fno = 1.50, FOV = 116.5 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.454 | glass | 1.52 | 64.2 | |
| 2 | | infinity | 1.350 | | | | |
| 3 | Lens 1 | −11.787 (ASP) | 0.236 | plastic | 1.54 | 56 | −0.651 |
| 4 | | 0.370 (ASP) | 0.735 | | | | |
| 5 | stop | infinity | −0.031 | | | | |
| 6 | Lens 2 | 0.592 (ASP) | 0.349 | plastic | 1.54 | 56 | 0.764 |
| 7 | | −1.130 (ASP) | 0.104 | | | | |
| 8 | Lens 3 | 2.336 (ASP) | 0.246 | plastic | 1.54 | 56 | 1.294 |
| 9 | | −0.979 (ASP) | 0.497 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 6

Aspheric Coefficients

| surface | 3 | 4 | 6 | 7 | 8 | 9 |
|---|---|---|---|---|---|---|
| K: | 1.6058E+02 | −7.5575E−01 | −9.7799E+00 | 2.4875E+00 | 3.8881E+01 | −1.0594E+01 |
| A: | 6.8820E−01 | 3.9330E+00 | 4.6571E+00 | 4.4428E+00 | 4.8606E+00 | 4.8716E+00 |
| B: | −8.9595E−01 | −7.0708E+01 | −3.8797E+01 | −4.6195E+01 | −4.5841E+01 | −3.1721E+01 |
| C: | 3.3376E−01 | 1.2979E+03 | 7.3248E+02 | 1.9297E+02 | 6.4849E+02 | 7.4309E+02 |
| D: | 4.7435E−01 | −7.2135E+03 | −6.7705E+03 | 2.1227E+03 | −7.4531E+03 | −3.2461E+03 |
| E: | −6.2462E−02 | −2.4953E+04 | −4.7525E+04 | −3.9583E+04 | 3.1545E+04 | −3.5772E+04 |
| F | −8.1138E−01 | 4.2635E+05 | 9.9861E+05 | 1.5541E+05 | 1.6968E+04 | 3.0349E+05 |
| G | 4.9047E−01 | −1.2109E+06 | −3.7410E+06 | 5.4541E+04 | −6.4405E+05 | −6.1228E+05 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | |
| --- | --- |
| f[mm] | 0.37 |
| Fno | 1.50 |
| FOV[deg.] | 116.5 |
| OTL | 5.15 |
| PTL | 3.70 |
| $|f/(f1 * f2 * f3)|[mm^{-2}]$ | 0.58 |
| f/f1 | −0.57 |
| f/f2 | 0.49 |
| f/f3 | 0.29 |
| f/f23 | 0.63 |
| f1/f23 | −1.11 |
| f1/R1 | 0.06 |
| f1/R2 | −1.76 |
| f2/R3 | 1.29 |
| f2/R4 | −0.68 |
| f3/R5 | 0.55 |
| f3/R6 | −1.32 |
| R1/R2 | −31.83 |
| R3/R4 | −0.52 |
| R5/R6 | −2.39 |
| OTL/f | 13.78 |
| PTL/f | 9.89 |
| $(f1 + f2 + f3)/(f1 * f2 * f3)\ [mm^{-2}]$ | −2.18 |
| P/Y | 5.50 |
| OTL/Y | 9.70 |

Figure 4A:
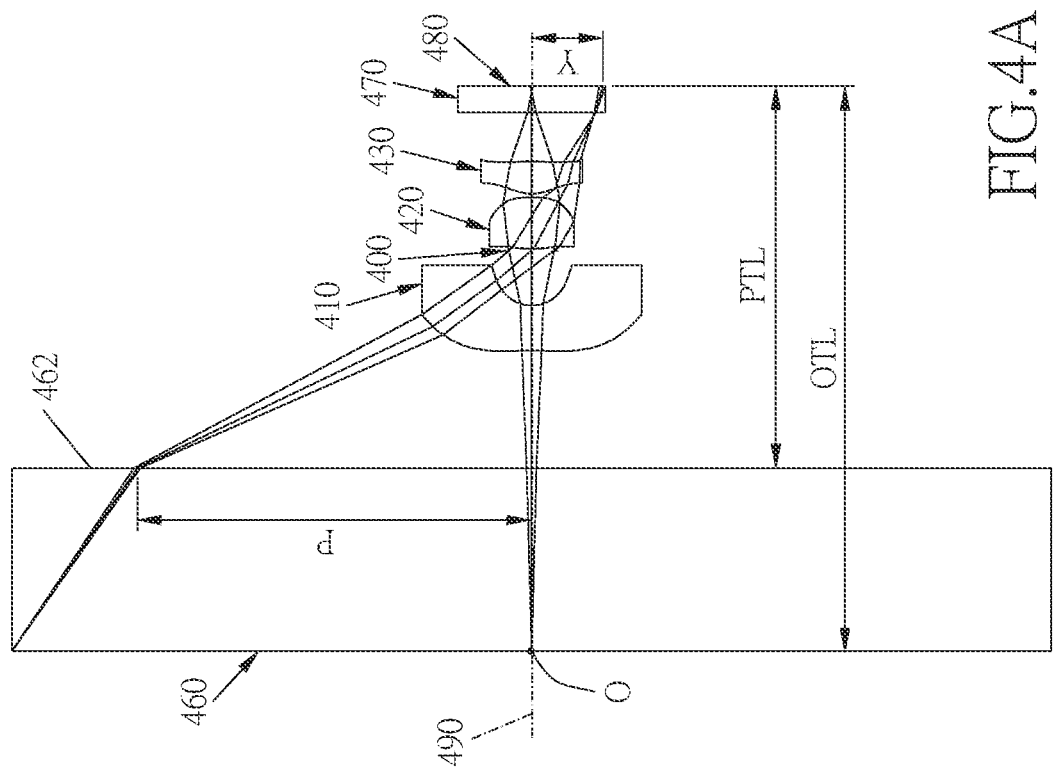
FIG. 4A shows a three-piece compact optical lens system in accordance with a fourth embodiment of the present invention.
Figure 4B:
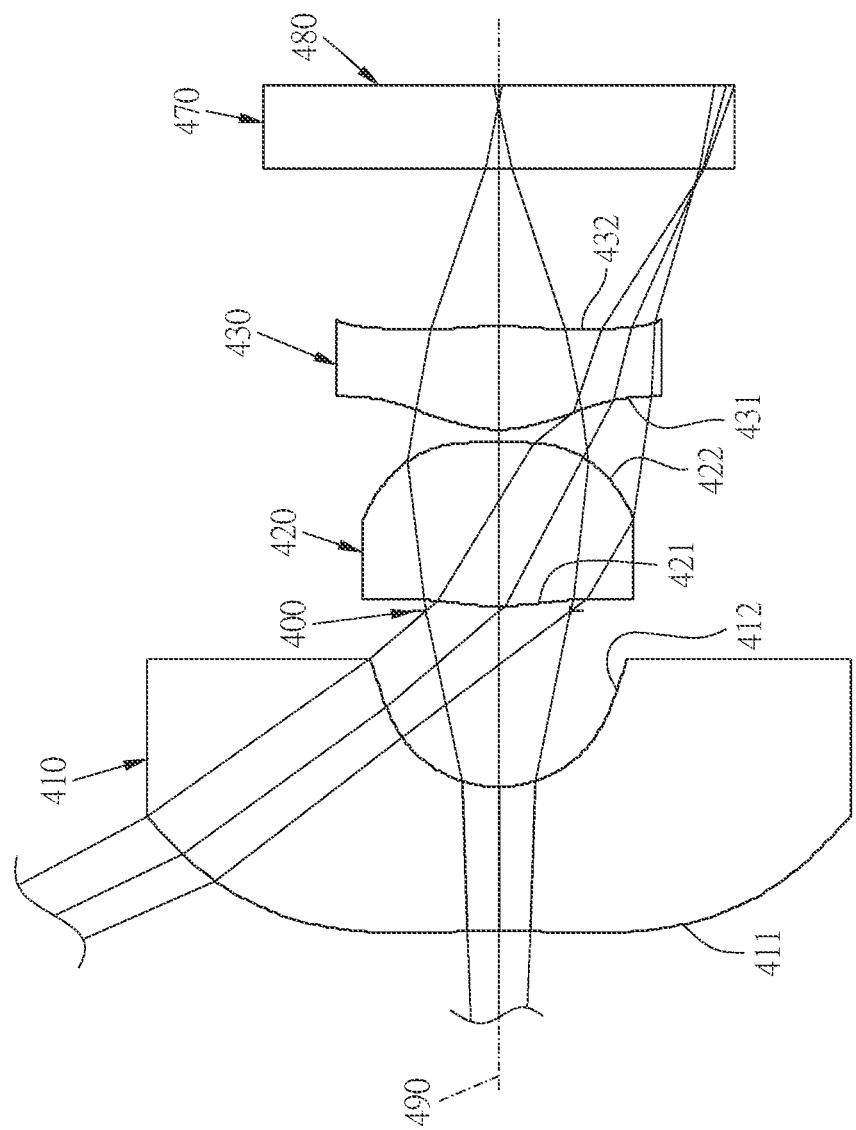
FIG. 4B is a partial enlarged view of FIG. 4A.

Referring to FIGS. 4A, 4B and FIG. 4C, FIG. 4A shows a three-piece compact optical lens system in accordance with a fourth embodiment of the present invention, FIG. 4B is a partial enlarged view of FIG. 4A, and FIG. 4C shows, in order from left to right, the image plane curve and the distortion curve of the fourth embodiment of the present invention. A three-piece compact optical lens system in accordance with the fourth embodiment of the present invention comprises, in order from an object side to an image side: a flat panel 460, a first lens element 410, a stop 400, a second lens element 420, a third lens element 430, an IR cut filter 470, and an image plane 480, wherein the three-piece compact optical lens system has a total of three lens elements with refractive power. The stop 400 is disposed between the first lens element 410 and the second lens element 420.

The flat panel 460 made of glass is located between an object O and the first lens element 410 and has no influence on the focal length of the three-piece compact optical lens system.

The first lens element 410 with a negative refractive power has an object-side surface 411 being concave near an optical axis 490 and an image-side surface 412 being concave near the optical axis 490, the object-side surface 411 and the image-side surface 412 are aspheric, and the first lens element 410 is made of plastic material.

The second lens element 420 with a positive refractive power has an object-side surface 421 being convex near the optical axis 490 and the image-side surface 422 being concave near the optical axis 490, the object-side surface 421 and the image-side surface 422 are aspheric, and the second lens element 420 is made of plastic material.

The third lens element 430 with a positive refractive power has an object-side surface 431 being convex near the optical axis 490 and an image-side surface 432 being convex near the optical axis 490, the object-side surface 431 and the image-side surface 432 are aspheric, and the third lens element 430 is made of plastic material.

The IR cut filter 470 made of glass is located between the third lens element 430 and the image plane 480 and has no influence on the focal length of the three-piece compact optical lens system.

The detailed optical data of the fourth embodiment is shown in table 7, and the aspheric surface data is shown in table 8.

TABLE 7

Embodiment 4
f(focal length) = 0.32 mm, Fno = 1.43, FOV = 132.8 deg.

| surface | | Curvature Radius | | Thickness | Material | Index | Abbe # | Focal length |
| --- | --- | --- | --- | --- | --- | --- | --- | --- |
| 0 | object | infinity | | 0.000 | | | | |
| 1 | flat panel | infinity | | 1.500 | glass | 1.52 | 64.2 | |
| 2 | | infinity | | 0.968 | | | | |
| 3 | Lens 1 | −4.399 | (ASP) | 0.371 | plastic | 1.54 | 56 | −0.598 |
| 4 | | 0.364 | (ASP) | 0.451 | | | | |
| 5 | stop | infinity | | 0.014 | | | | |
| 6 | Lens 2 | 0.945 | (ASP) | 0.420 | plastic | 1.54 | 56 | 1.876 |
| 7 | | 9.994 | (ASP) | 0.032 | | | | |
| 8 | Lens 3 | 0.350 | (ASP) | 0.266 | plastic | 1.54 | 56 | 0.527 |
| 9 | | −1.199 | (ASP) | 0.407 | | | | |
| 10 | IR-filter | infinity | | 0.210 | glass | 1.52 | 54.5 | |
| 11 | | infinity | | infinity | | | | |
| 12 | Image plane | infinity | | 0.000 | | | | |

TABLE 8

Aspheric Coefficients

| surface | 3 | 4 | 6 | 7 | 8 | 9 |
|---|---|---|---|---|---|---|
| K: | −1.3502E+01 | −6.3226E+00 | 1.0069E+00 | 9.8306E+01 | −7.0878E+00 | −4.6025E−01 |
| A: | 8.6682E−01 | 1.8851E+01 | −5.7046E+00 | −2.0423E+01 | −1.0076E+00 | 5.4831E+00 |
| B: | −1.0817E+00 | −4.1614E+02 | 1.6357E+02 | 2.1326E+02 | 1.1690E+01 | −2.1803E+01 |
| C: | 8.0105E−01 | 8.6679E+03 | −5.9160E+03 | −1.6773E+03 | −6.6140E+01 | 5.7126E+01 |
| D: | 3.2876E−01 | −8.0793E+04 | 6.4621E+04 | 5.8970E+03 | −6.4111E+02 | −6.7776E+02 |
| E: | −1.1007E+00 | 1.4657E+05 | 7.4830E+05 | 2.1931E+03 | 1.6039E+03 | 3.6461E+03 |
| F | 8.2550E−01 | 2.7509E+06 | −2.1714E+07 | −6.5741E+04 | 2.3407E+04 | −2.0109E+03 |
| G | −2.3988E−01 | −1.3395E+07 | 1.2934E+08 | 4.9916E+04 | −7.3613E+04 | −1.1711E+04 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | |
|---|---|
| f[mm] | 0.32 |
| Fno | 1.43 |
| FOV[deg.] | 132.8 |
| OTL | 4.64 |
| PTL | 3.14 |
| \|f/(f1 * f2 * f3)\|[mm$^{-2}$] | 0.54 |
| f/f1 | −0.54 |
| f/f2 | 0.17 |
| f/f3 | 0.61 |
| f/f23 | 0.66 |
| f1/f23 | −1.23 |
| f1/R1 | 0.14 |
| f1/R2 | −1.64 |
| f2/R3 | 1.99 |
| f2/R4 | 0.19 |
| f3/R5 | 1.51 |
| f3/R6 | −0.44 |
| R1/R2 | −12.08 |
| R3/R4 | 0.09 |
| R5/R6 | −0.29 |
| OTL/f | 14.49 |
| PTL/f | 9.80 |
| (f1 + f2 + f3)/(f1 * f2 * f3) [mm$^{-2}$] | −3.05 |
| P/Y | 5.55 |
| OTL/Y | 7.22 |

Figure 5A:
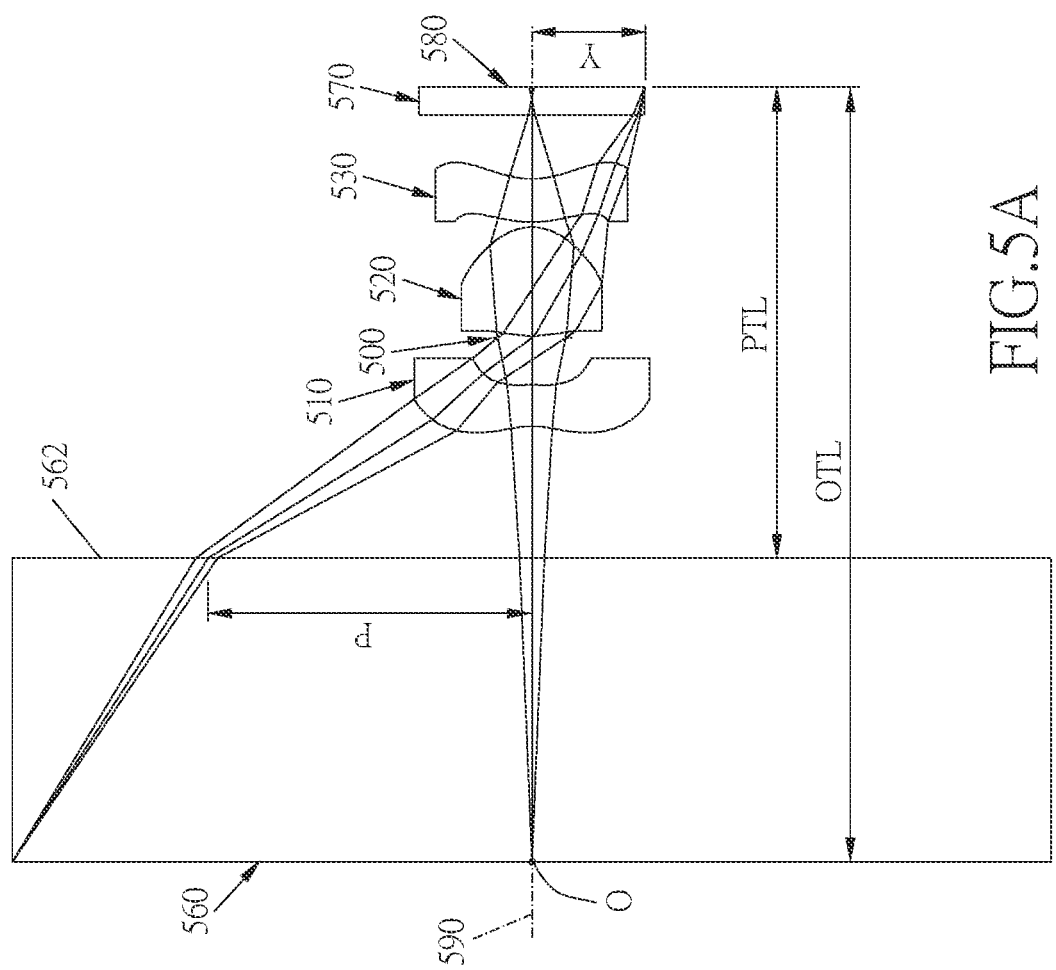
FIG. 5A shows a three-piece compact optical lens system in accordance with a fifth embodiment of the present invention.
Figure 5B:
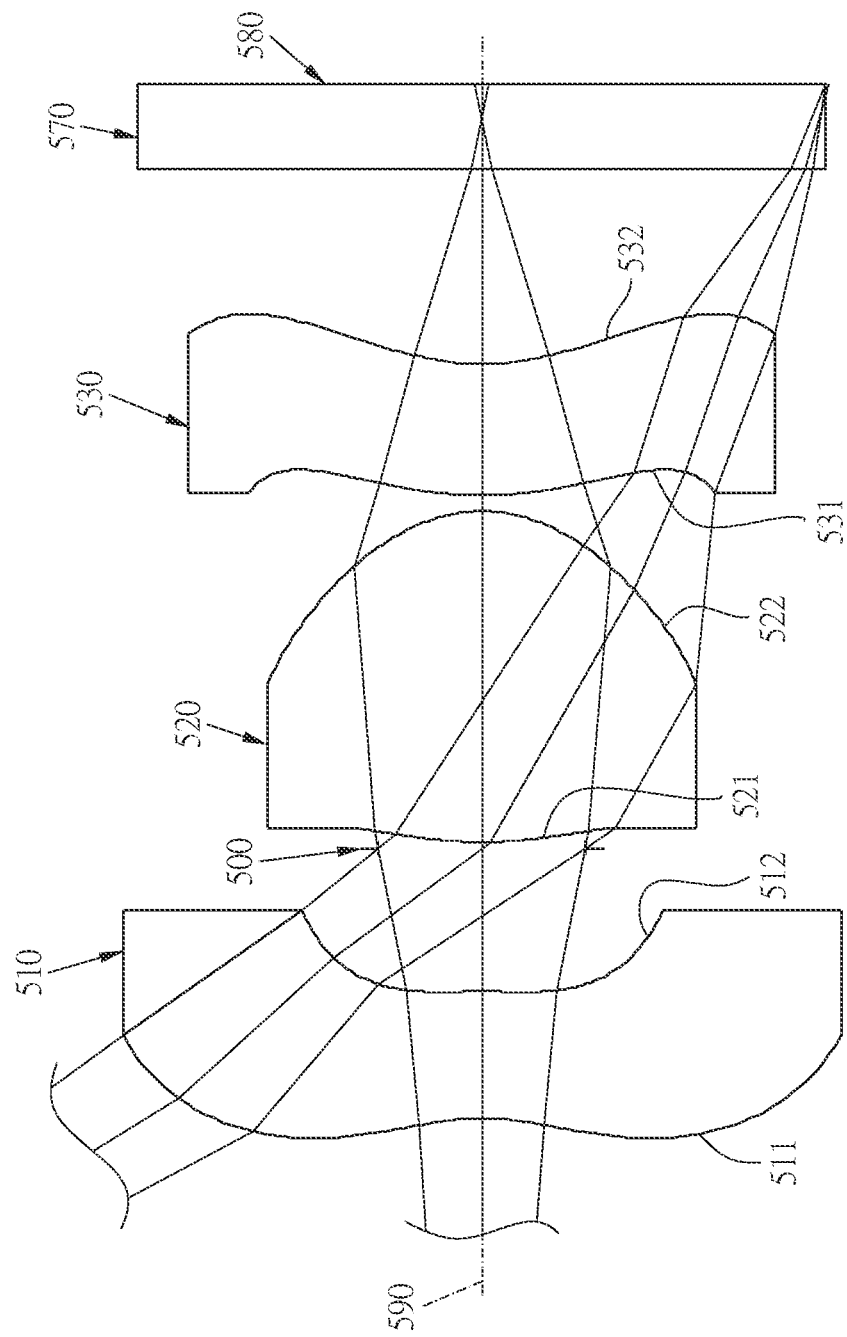
FIG. 5B is a partial enlarged view of FIG. 5A.

Referring to FIGS. 5A, 5B and FIG. 5C, FIG. 5A shows a three-piece compact optical lens system in accordance with a fifth embodiment of the present invention, FIG. 5B is a partial enlarged view of FIG. 5A, and FIG. 5C shows, in order from left to right, the image plane curve and the distortion curve of the fifth embodiment of the present invention. A three-piece compact optical lens system in accordance with the fifth embodiment of the present invention comprises, in order from an object side to an image side: a flat panel 560, a first lens element 510, a stop 500, a second lens element 520, a third lens element 530, an IR cut filter 570, and an image plane 580, wherein the three-piece compact optical lens system has a total of three lens elements with refractive power. The stop 500 is disposed between the first lens element 510 and the second lens element 520.

The flat panel 560 made of glass is located between an object O and the first lens element 510 and has no influence on the focal length of the three-piece compact optical lens system.

The first lens element 510 with a negative refractive power has an object-side surface 511 being concave near an optical axis 590 and an image-side surface 512 being convex near the optical axis 590, the object-side surface 511 and the image-side surface 512 are aspheric, and the first lens element 510 is made of plastic material.

The second lens element 520 with a positive refractive power has an object-side surface 521 being convex near the optical axis 590 and the image-side surface 522 being convex near the optical axis 590, the object-side surface 521 and the image-side surface 522 are aspheric, and the second lens element 520 is made of plastic material.

The third lens element 530 with a negative refractive power has an object-side surface 531 being convex near the optical axis 590 and an image-side surface 532 being concave near the optical axis 590, the object-side surface 531 and the image-side surface 532 are aspheric, and the third lens element 530 is made of plastic material.

The IR cut filter 570 made of glass is located between the third lens element 530 and the image plane 580 and has no influence on the focal length of the three-piece compact optical lens system.

The detailed optical data of the fifth embodiment is shown in table 9, and the aspheric surface data is shown in table 10.

TABLE 9

Embodiment 5
f(focal length) = 0.60 mm, Fno = 1.52, FOV = 121.2 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 2.260 | glass | 1.52 | 64.2 | |
| 2 | | infinity | 0.981 | | | | |
| 3 | Lens 1 | −0.691 (ASP) | 0.309 | plastic | 1.54 | 56 | −1.773 |
| 4 | | −2.936 (ASP) | 0.350 | | | | |
| 5 | stop | infinity | 0.014 | | | | |

TABLE 9-continued

Embodiment 5
f(focal length) = 0.60 mm, Fno = 1.52, FOV = 121.2 deg.

| surface | | Curvature Radius | | Thickness | Material | Index | Abbe # | Focal length |
|---|---|---|---|---|---|---|---|---|
| 6 | Lens 2 | 1.236 | (ASP) | 0.807 | plastic | 1.54 | 56 | 0.712 |
| 7 | | −0.426 | (ASP) | 0.039 | | | | |
| 8 | Lens 3 | 1.282 | (ASP) | 0.320 | plastic | 1.64 | 22.5 | −4.196 |
| 9 | | 0.745 | (ASP) | 0.473 | | | | |
| 10 | IR-filter | infinity | | 0.210 | glass | 1.52 | 54.5 | |
| 11 | | infinity | | infinity | | | | |
| 12 | Image plane | infinity | | 0.000 | | | | |

TABLE 10

Aspheric Coefficients

| surface | 3 | 4 | 6 | 7 | 8 | 9 |
|---|---|---|---|---|---|---|
| K: | −1.2094E+01 | 3.0053E+01 | −1.6743E+00 | −1.1223E+00 | 1.8899E+00 | −4.3747E+00 |
| A: | 1.3867E+00 | 7.3115E+00 | −6.6893E−01 | 7.7324E−01 | 4.5374E−01 | −4.3095E−01 |
| B: | −3.5613E+00 | −2.9315E+01 | −3.9965E+00 | −8.1071E+00 | −1.2455E+01 | 6.5785E−01 |
| C: | 6.5337E+00 | −3.7539E+00 | −5.1474E+01 | 1.0379E+01 | 5.7602E+01 | −1.8934E+00 |
| D: | −6.8298E+00 | 1.2101E+03 | 1.1777E+03 | 1.1280E+02 | −1.5416E+02 | 2.5978E−01 |
| E: | 3.9194E+00 | −5.6257E+03 | −4.6955E+01 | −4.9159E+02 | 2.1158E+02 | 6.0530E−01 |
| F | −1.2748E+00 | 5.9725E+03 | −9.2723E+04 | 6.2647E+02 | −1.8130E+02 | 4.7961E+00 |
| G | 3.4509E−01 | 1.0201E+04 | 3.9507E+05 | −3.1061E+02 | 8.2690E+01 | −5.8551E+00 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | |
|---|---|
| f[mm] | 0.60 |
| Fno | 1.52 |
| FOV[deg.] | 121.2 |
| OTL | 5.76 |
| PTL | 3.50 |
| |f/(f1 * f2 * f3)|[mm$^{-2}$] | 0.11 |
| f/f1 | −0.34 |
| f/f2 | 0.84 |
| f/f3 | −0.14 |
| f/f23 | 0.86 |
| f1/f23 | −2.56 |
| f1/R1 | 2.56 |
| f1/R2 | 0.60 |
| f2/R3 | 0.58 |
| f2/R4 | −1.67 |
| f3/R5 | −3.27 |
| f3/R6 | −5.63 |
| R1/R2 | 0.24 |
| R3/R4 | −2.90 |
| R5/R6 | 1.72 |
| OTL/f | 9.64 |
| PTL/f | 5.86 |
| (f1 + f2 + f3)/(f1 * f2 * f3) [mm$^{-2}$] | −0.99 |
| P/Y | 2.85 |
| OTL/Y | 6.20 |

Figure 6A:
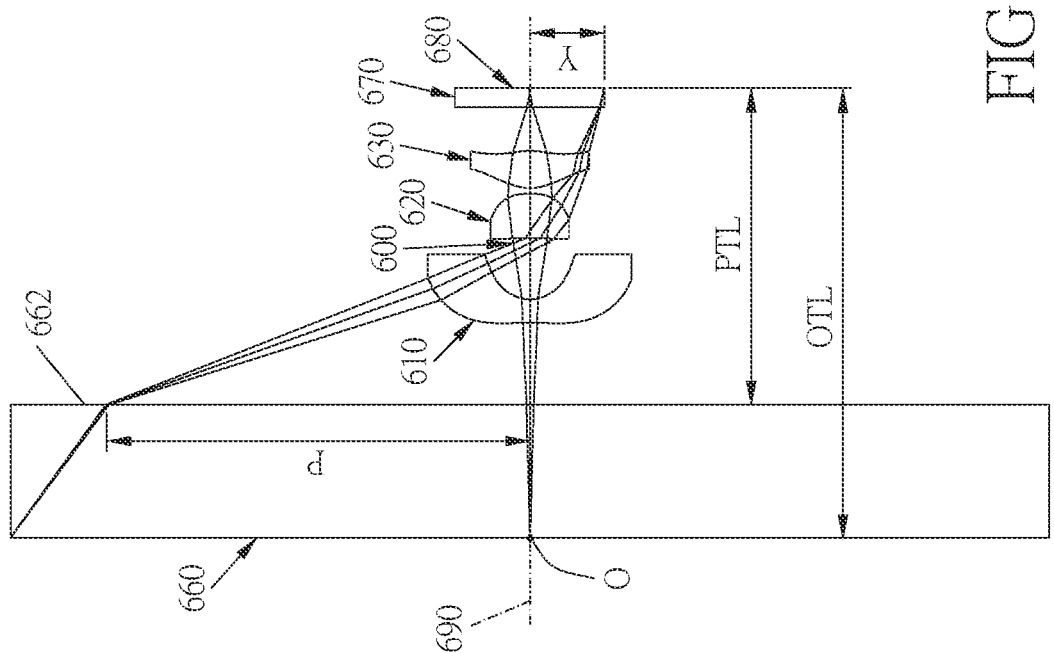
FIG. 6A shows a three-piece compact optical lens system in accordance with a sixth embodiment of the present invention.
Figure 6B:
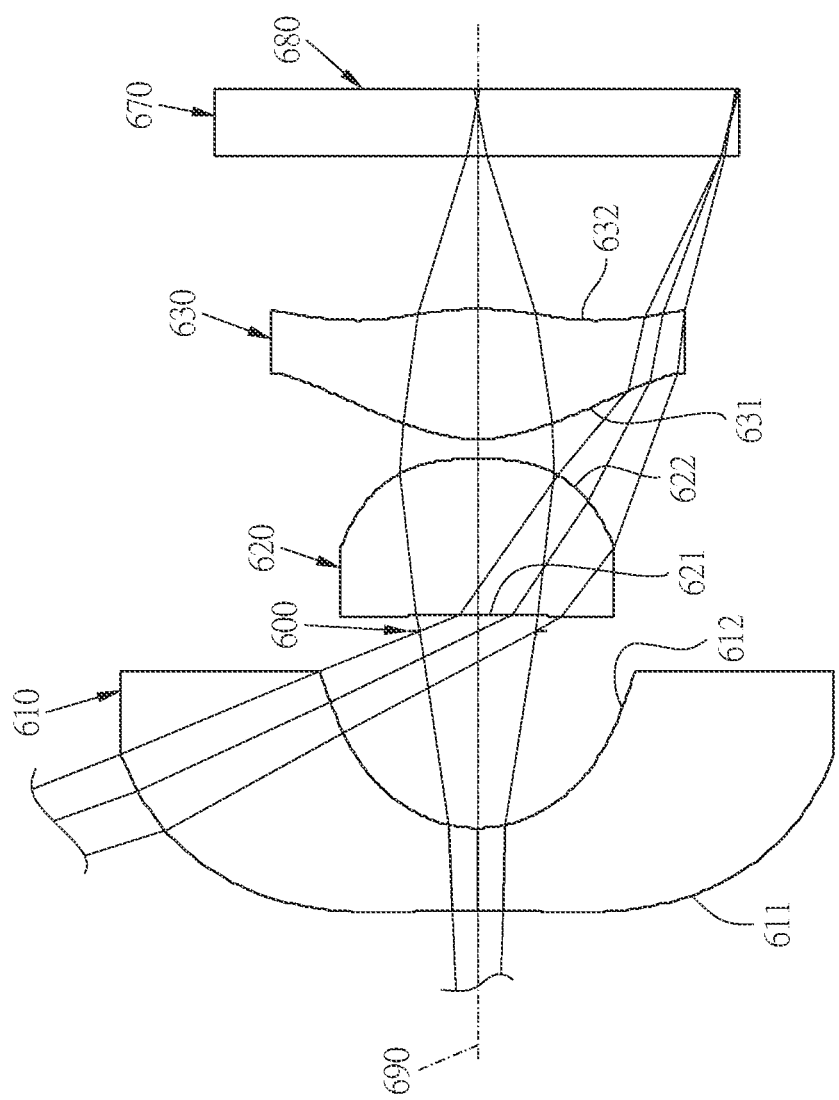
FIG. 6B is a partial enlarged view of FIG. 6A.
Figure 6C:
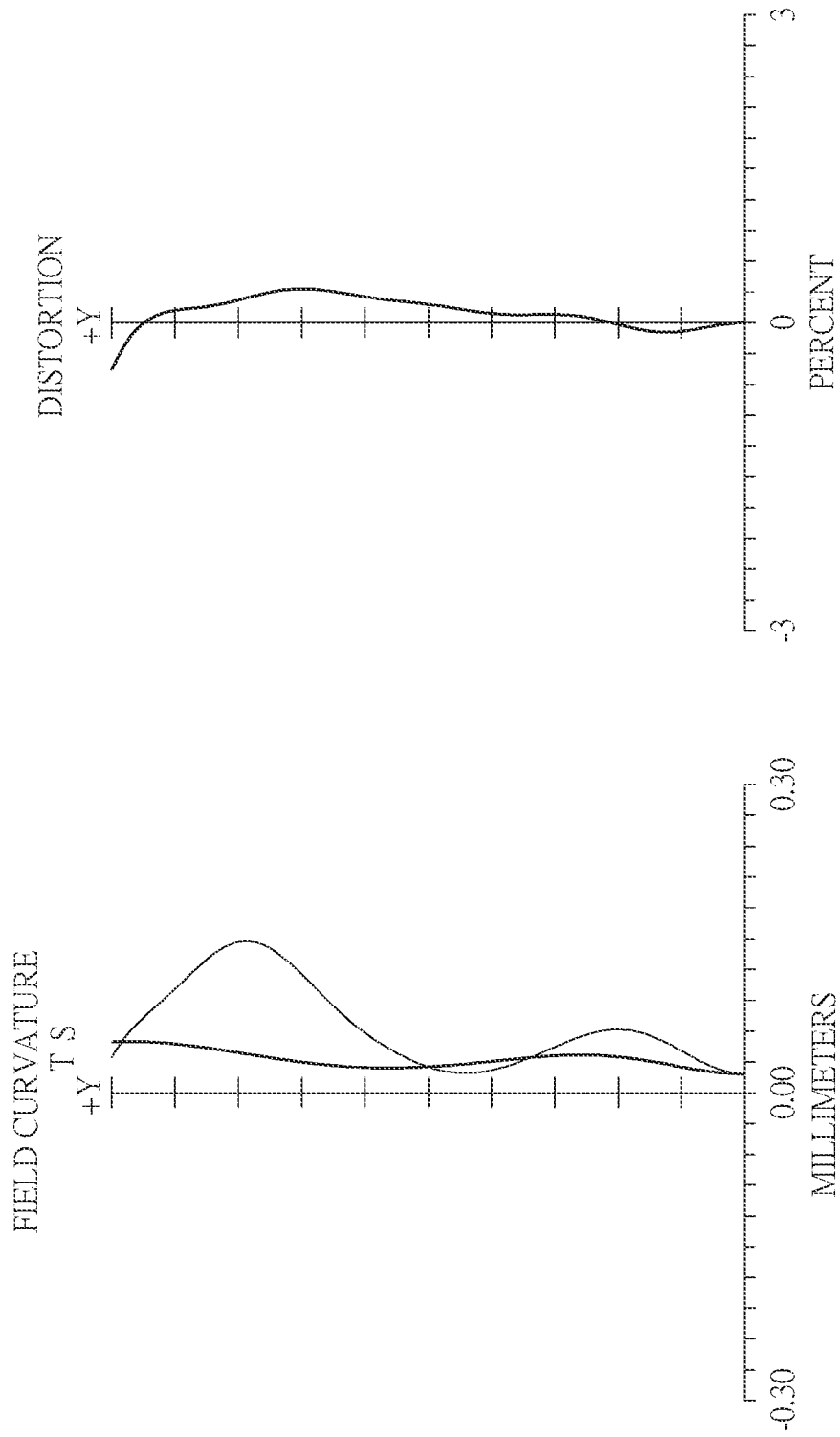
FIG. 6C shows the image plane curve and the distortion curve of the sixth embodiment of the present invention.

Referring to FIGS. 6A, 6B and FIG. 6C, FIG. 6A shows a three-piece compact optical lens system in accordance with a sixth embodiment of the present invention, FIG. 6B is a partial enlarged view of FIG. 6A, and FIG. 6C shows, in order from left to right, the image plane curve and the distortion curve of the sixth embodiment of the present invention. A three-piece compact optical lens system in accordance with the sixth embodiment of the present invention comprises, in order from an object side to an image side: a flat panel 660, a first lens element 610, a stop 600, a second lens element 620, a third lens element 630, an IR cut filter 670, and an image plane 680, wherein the three-piece compact optical lens system has a total of three lens elements with refractive power. The stop 600 is disposed between the first lens element 610 and the second lens element 620.

The flat panel 660 made of glass is located between an object O and the first lens element 610 and has no influence on the focal length of the three-piece compact optical lens system.

The first lens element 610 with a negative refractive power has an object-side surface 611 being concave near an optical axis 690 and an image-side surface 612 being concave near the optical axis 690, the object-side surface 611 and the image-side surface 612 are aspheric, and the first lens element 610 is made of plastic material.

The second lens element 620 with a positive refractive power has an object-side surface 621 being convex near the optical axis 690 and the image-side surface 622 being convex near the optical axis 690, the object-side surface 621 and the image-side surface 622 are aspheric, and the second lens element 620 is made of plastic material.

The third lens element 630 with a positive refractive power has an object-side surface 631 being convex near the optical axis 690 and an image-side surface 632 being convex near the optical axis 690, the object-side surface 631 and the image-side surface 632 are aspheric, and the third lens element 630 is made of plastic material.

The IR cut filter 670 made of glass is located between the third lens element 630 and the image plane 680 and has no influence on the focal length of the three-piece compact optical lens system.

The detailed optical data of the sixth embodiment is shown in table 11, and the aspheric surface data is shown in table 12.

TABLE 11

Embodiment 6
f(focal length) = 0.34 mm, Fno = 1.54, FOV = 144.1 deg.

| surface | | Curvature Radius | | Thickness | Material | Index | Abbe # | Focal length |
|---|---|---|---|---|---|---|---|---|
| 0 | object | infinity | | 0.000 | | | | |
| 1 | flat panel | infinity | | 1.465 | glass | 1.52 | 64.2 | |
| 2 | | infinity | | 0.904 | | | | |
| 3 | Lens 1 | −4.777 | (ASP) | 0.258 | plastic | 1.54 | 56 | −0.780 |
| 4 | | 0.479 | (ASP) | 0.620 | | | | |
| 5 | stop | infinity | | 0.052 | | | | |
| 6 | Lens 2 | 8.705 | (ASP) | 0.490 | plastic | 1.54 | 56 | 2.725 |
| 7 | | −1.767 | (ASP) | 0.062 | | | | |
| 8 | Lens 3 | 0.504 | (ASP) | 0.411 | plastic | 1.54 | 56 | 0.677 |
| 9 | | −1.003 | (ASP) | 0.481 | | | | |
| 10 | IR-filter | infinity | | 0.210 | glass | 1.52 | 54.5 | |
| 11 | | infinity | | infinity | | | | |
| 12 | Image plane | infinity | | 0.000 | | | | |

TABLE 12

Aspheric Coefficients

| surface | 3 | 4 | 6 | 7 | 8 | 9 |
|---|---|---|---|---|---|---|
| K: | 8.7750E+00 | −1.0309E+00 | −9.6544E+01 | 6.2676E+00 | −7.4155E+00 | −7.5721E+00 |
| A: | 5.1825E−01 | 1.3020E+00 | −3.0430E+00 | −6.0750E+00 | 2.3787E−01 | 1.3569E+00 |
| B: | −4.0829E−01 | −1.8485E+01 | 5.2169E+01 | 2.2468E+01 | 5.9802E−01 | −9.1346E−01 |
| C: | 2.1105E−01 | 2.4922E+02 | −8.2728E+02 | −4.0137E+01 | −3.2724E+00 | −2.4076E+00 |
| D: | −1.3298E−03 | −1.3290E+03 | 1.6029E+03 | −1.9584E+02 | −3.5876E+00 | −2.4424E+00 |
| E: | −2.0375E−02 | 3.3857E+03 | 5.5624E+04 | 5.8140E+02 | 7.7841E+00 | 4.8086E+00 |
| F | −1.3470E−02 | −1.9412E+03 | 3.5813E+04 | 5.7035E+02 | 3.4626E+01 | 3.5942E+01 |
| G | 1.0457E−02 | −4.0621E+03 | −3.2585E+06 | −4.3923E+03 | −5.2590E+01 | −5.0802E+01 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | |
|---|---|
| f[mm] | 0.34 |
| Fno | 1.54 |
| FOV[deg.] | 144.1 |
| OTL | 4.95 |
| PTL | 3.49 |
| $\|f/(f1 * f2 * f3)\|[mm^{-2}]$ | 0.23 |
| f/f1 | −0.43 |
| f/f2 | 0.12 |
| f/f3 | 0.50 |
| f/f23 | 0.58 |
| f1/f23 | −1.35 |
| f1/R1 | 0.16 |
| f1/R2 | −1.63 |
| f2/R3 | 0.31 |
| f2/R4 | −1.54 |
| f3/R5 | 1.34 |
| f3/R6 | −0.68 |
| R1/R2 | −9.98 |
| R3/R4 | −4.92 |
| R5/R6 | −0.50 |
| OTL/f | 14.68 |
| PTL/f | 10.34 |
| $(f1 + f2 + f3)/(f1 * f2 * f3)\ [mm^{-2}]$ | −1.82 |
| P/Y | 5.70 |
| OTL/Y | 5.51 |

Figure 7A:
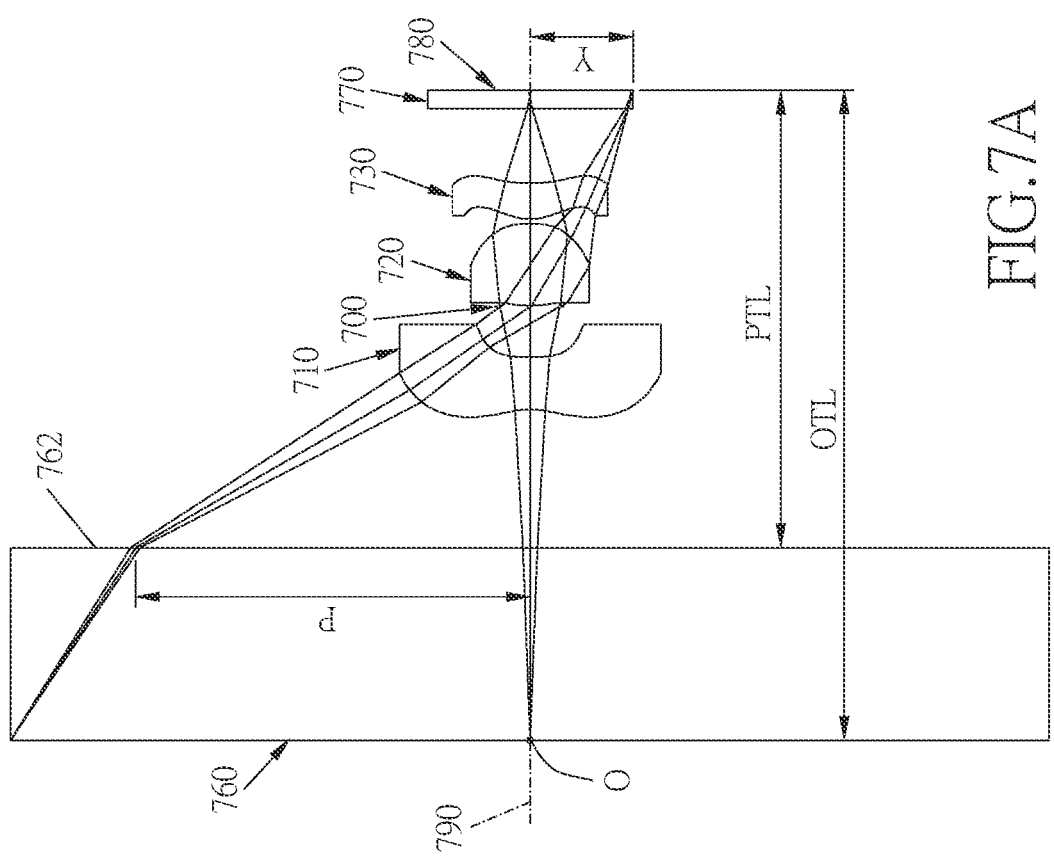
FIG. 7A shows a three-piece compact optical lens system in accordance with a seventh embodiment of the present invention.
Figure 7B:
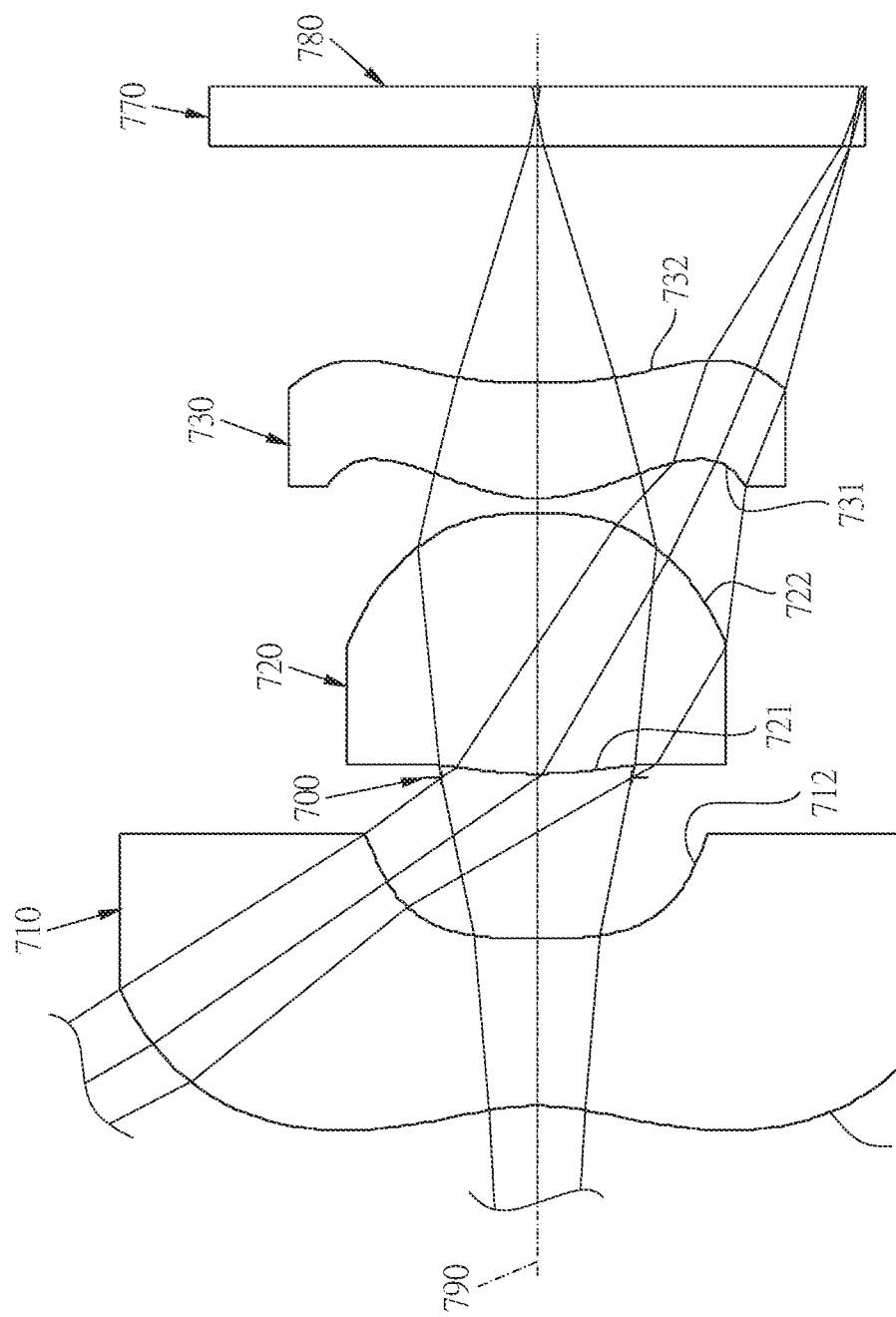
FIG. 7B is a partial enlarged view of FIG. 7A.
Figure 7C:
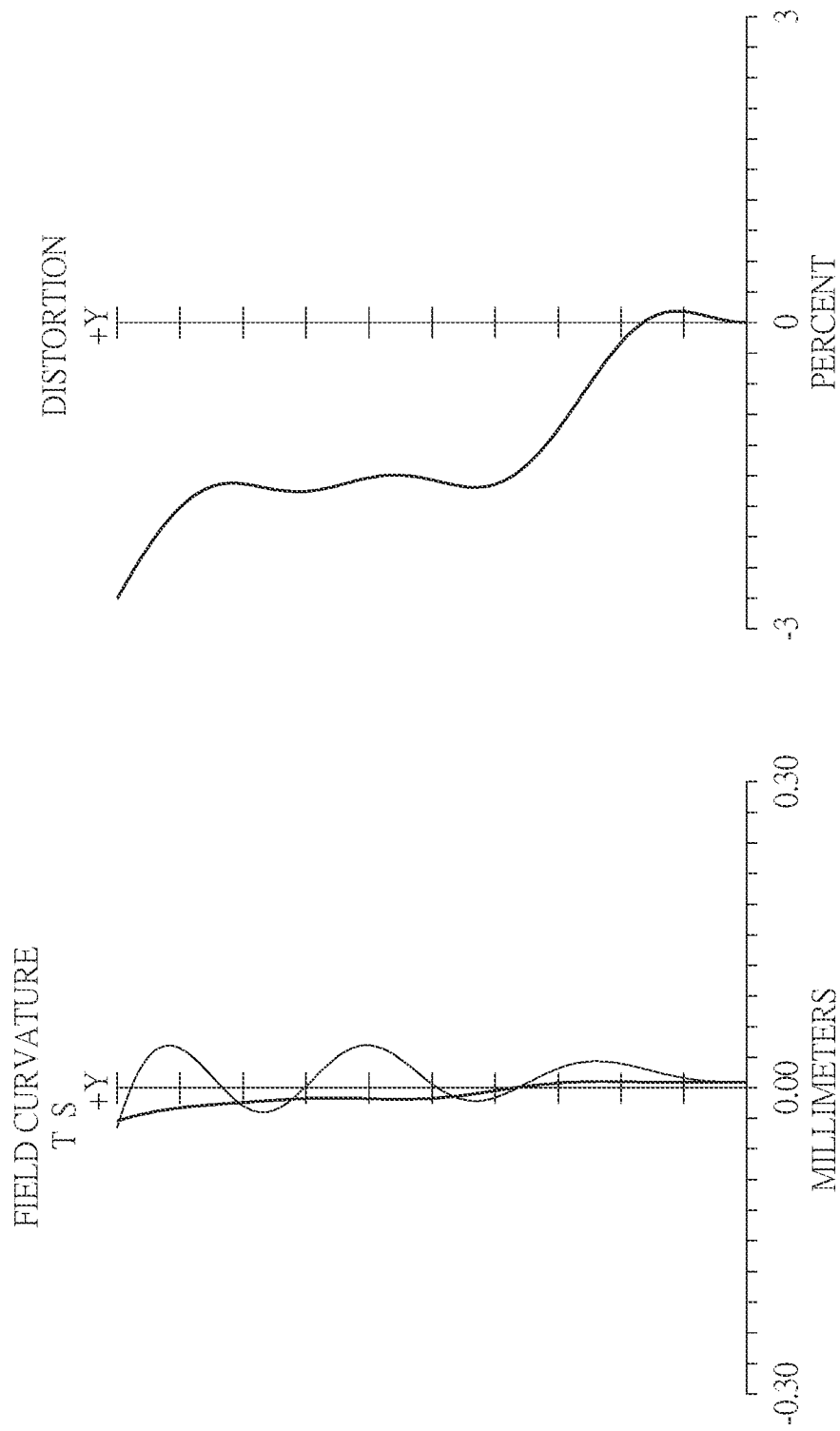
FIG. 7C shows the image plane curve and the distortion curve of the seventh embodiment of the present invention.

Referring to FIGS. 7A, 7B and FIG. 7C, FIG. 7A shows a three-piece compact optical lens system in accordance with a seventh embodiment of the present invention, FIG. 7B is a partial enlarged view of FIG. 7A, and FIG. 7C shows, in order from left to right, the image plane curve and the distortion curve of the seventh embodiment of the present invention. A three-piece compact optical lens system in accordance with the seventh embodiment of the present invention comprises, in order from an object side to an image side: a flat panel 760, a first lens element 710, a stop 700, a second lens element 720, a third lens element 730, an IR cut filter 770, and an image plane 780, wherein the three-piece compact optical lens system has a total of three lens elements with refractive power. The stop 700 is disposed between the first lens element 710 and the second lens element 720.

The IR cut filter 770 made of glass is located between the third lens element 730 and the image plane 780 and has no influence on the focal length of the three-piece compact optical lens system.

The detailed optical data of the seventh embodiment is shown in table 13, and the aspheric surface data is shown in table 14.

TABLE 13

Embodiment 7
f(focal length) = 0.47 mm, Fno = 1.55, FOV = 124.9 deg.

| surface | | Curvature Radius | | Thickness | Material | Index | Abbe # | Focal length |
|---|---|---|---|---|---|---|---|---|
| 0 | object | infinity | | 0.000 | | | | |
| 1 | flat panel | infinity | | 1.465 | glass | 1.52 | 64.2 | |
| 2 | | infinity | | 1.050 | | | | |
| 3 | Lens 1 | −0.646 | (ASP) | 0.399 | plastic | 1.54 | 56 | −1.132 |
| 4 | | 19.566 | (ASP) | 0.382 | | | | |
| 5 | stop | infinity | | 0.010 | | | | |
| 6 | Lens 2 | 1.243 | (ASP) | 0.621 | plastic | 1.54 | 56 | 1.300 |
| 7 | | −1.374 | (ASP) | 0.035 | | | | |
| 8 | Lens 3 | 0.462 | (ASP) | 0.274 | plastic | 1.54 | 56 | 0.993 |
| 9 | | 2.414 | (ASP) | 0.564 | | | | |
| 10 | IR-filter | infinity | | 0.145 | glass | 1.52 | 54.5 | |
| 11 | | infinity | | infinity | | | | |
| 12 | Image plane | infinity | | 0.000 | | | | |

TABLE 14

Aspheric Coefficients

| surface | 3 | 4 | 6 | 7 | 8 | 9 |
|---|---|---|---|---|---|---|
| K: | −1.0131E+01 | 9.3999E+01 | −1.8956E+00 | −2.0153E+01 | −3.7845E−01 | 1.0879E+01 |
| A: | 8.2565E−01 | 1.1484E+01 | 5.9964E−02 | 8.5446E+00 | −6.1522E+00 | 3.4686E+00 |
| B: | −1.2733E+00 | −1.9221E+02 | −3.4103E+01 | 4.0273E+01 | 3.4635E+01 | −3.1901E+01 |
| C: | 1.4818E+00 | 2.7726E+03 | −7.8485E+01 | −1.1434E+02 | −3.0137E+02 | 1.1949E+02 |
| D: | −1.0100E+00 | −2.2083E+04 | 9.3597E+03 | 1.4073E+02 | 1.4052E+03 | −2.6847E+02 |
| E: | 3.0120E−01 | 9.1086E+04 | −1.0926E+05 | −1.3810E+02 | −3.5767E+03 | 3.2170E+02 |
| F | −6.1680E−02 | −1.4695E+05 | 4.0793E+05 | −2.3842E+02 | 3.4314E+03 | −1.5645E+02 |
| G | 0.0000E+00 | 0.0000E+00 | 0.0000E+00 | 0.0000E+00 | 0.0000E+00 | 0.0000E+00 |

The flat panel 760 made of glass is located between an object O and the first lens element 710 and has no influence on the focal length of the three-piece compact optical lens system.

The first lens element 710 with a negative refractive power has an object-side surface 711 being concave near an optical axis 790 and an image-side surface 712 being concave near the optical axis 790, the object-side surface 711 and the image-side surface 712 are aspheric, and the first lens element 710 is made of plastic material.

The second lens element 720 with a positive refractive power has an object-side surface 721 being convex near the optical axis 790 and the image-side surface 722 being convex near the optical axis 790, the object-side surface 721 and the image-side surface 722 are aspheric, and the second lens element 720 is made of plastic material.

The third lens element 730 with a positive refractive power has an object-side surface 731 being convex near the optical axis 790 and an image-side surface 732 being concave near the optical axis 790, the object-side surface 731 and the image-side surface 732 are aspheric, and the third lens element 730 is made of plastic material.

In the seventh embodiment, the equation of the aspheric surface profiles of the aforementioned lens elements is the same as the equation of the first embodiment. Also, the definitions of these parameters shown in the following table are the same as those stated in the first embodiment with corresponding values for the seventh embodiment, so an explanation in this regard will not be provided again.

Moreover, these parameters can be calculated from Table 13 and Table 14 as the following values and satisfy the following conditions:

| Embodiment 7 | |
|---|---|
| f[mm] | 0.47 |
| Fno | 1.55 |
| FOV[deg.] | 124.9 |
| OTL | 4.95 |
| PTL | 3.48 |
| $|f/(f1 * f2 * f3)|[mm^{-2}]$ | 0.32 |
| f/f1 | −0.42 |
| f/f2 | 0.36 |
| f/f3 | 0.48 |
| f/f23 | 0.76 |
| f1/f23 | −1.81 |

-continued

| Embodiment 7 | |
|---|---|
| f1/R1 | 1.75 |
| f1/R2 | −0.06 |
| f2/R3 | 1.05 |
| f2/R4 | −0.95 |
| f3/R5 | 2.15 |
| f3/R6 | 0.41 |
| R1/R2 | −0.03 |
| R3/R4 | −0.91 |
| R5/R6 | 0.19 |
| OTL/f | 10.48 |
| PTL/f | 7.38 |
| (f1 + f2 + f3)/(f1 * f2 * f3) [mm$^{-2}$] | −0.79 |
| P/Y | 3.81 |
| OTL/Y | 5.71 |

Figure 8A:
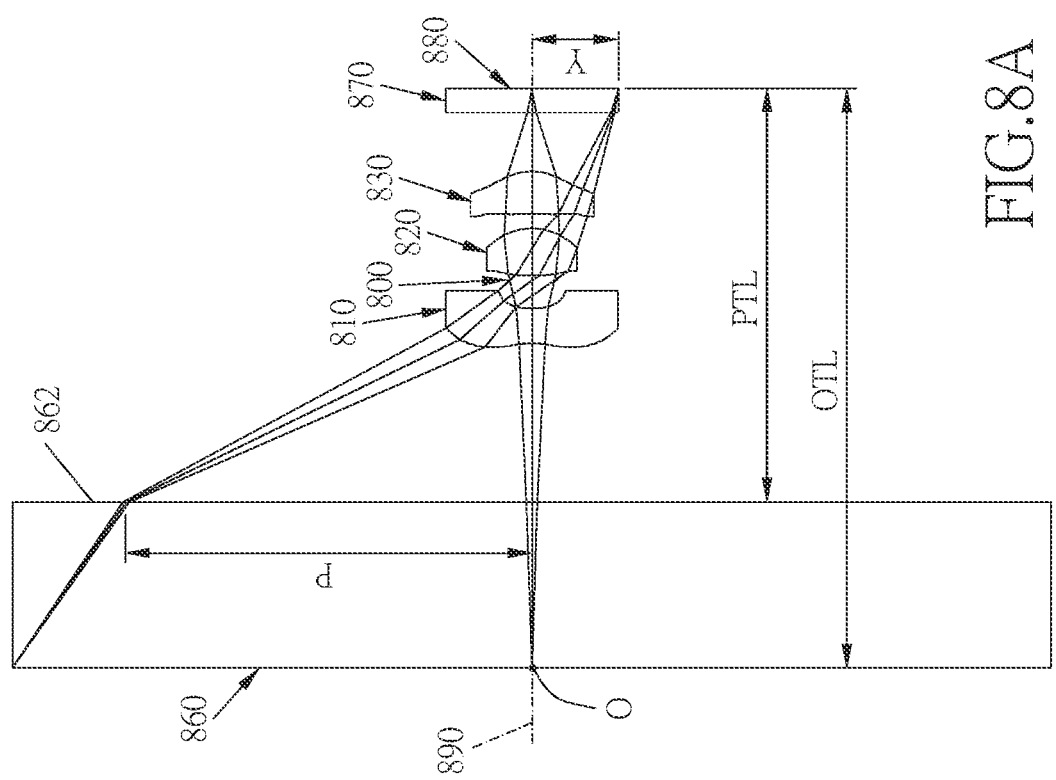
FIG. 8A shows a three-piece compact optical lens system in accordance with an eighth embodiment of the present invention.
Figure 8B:
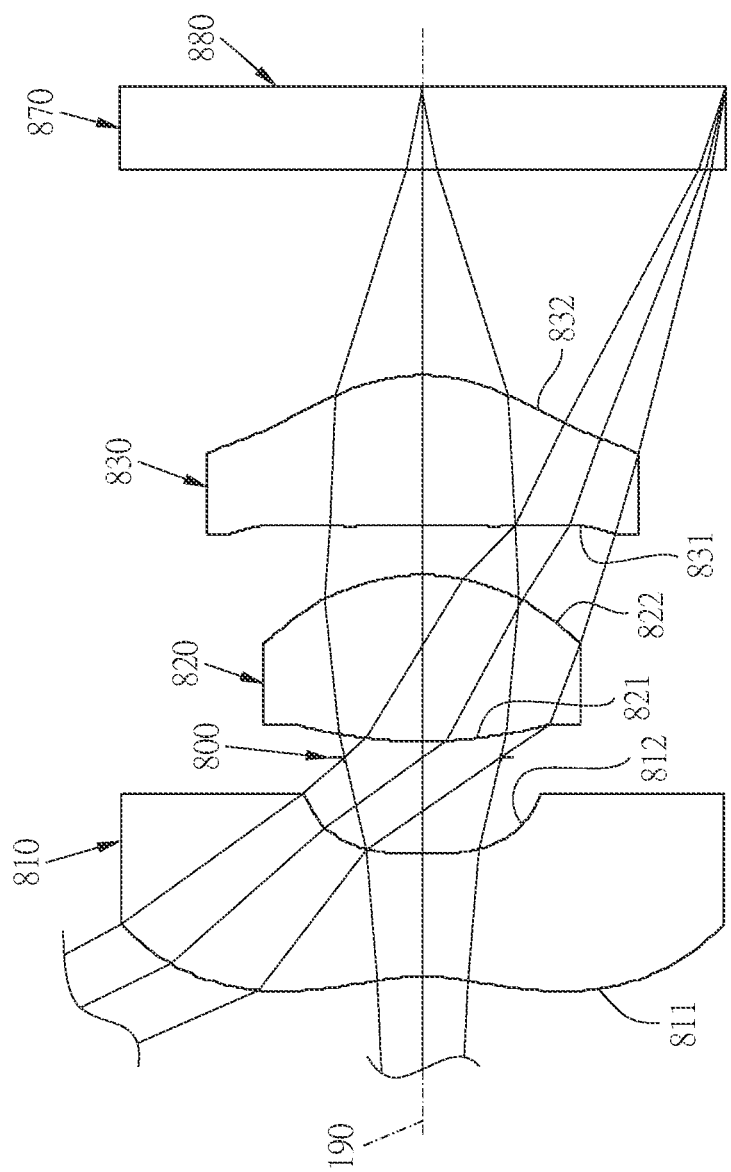
FIG. 8B is a partial enlarged view of FIG. 8A.
Figure 8C:
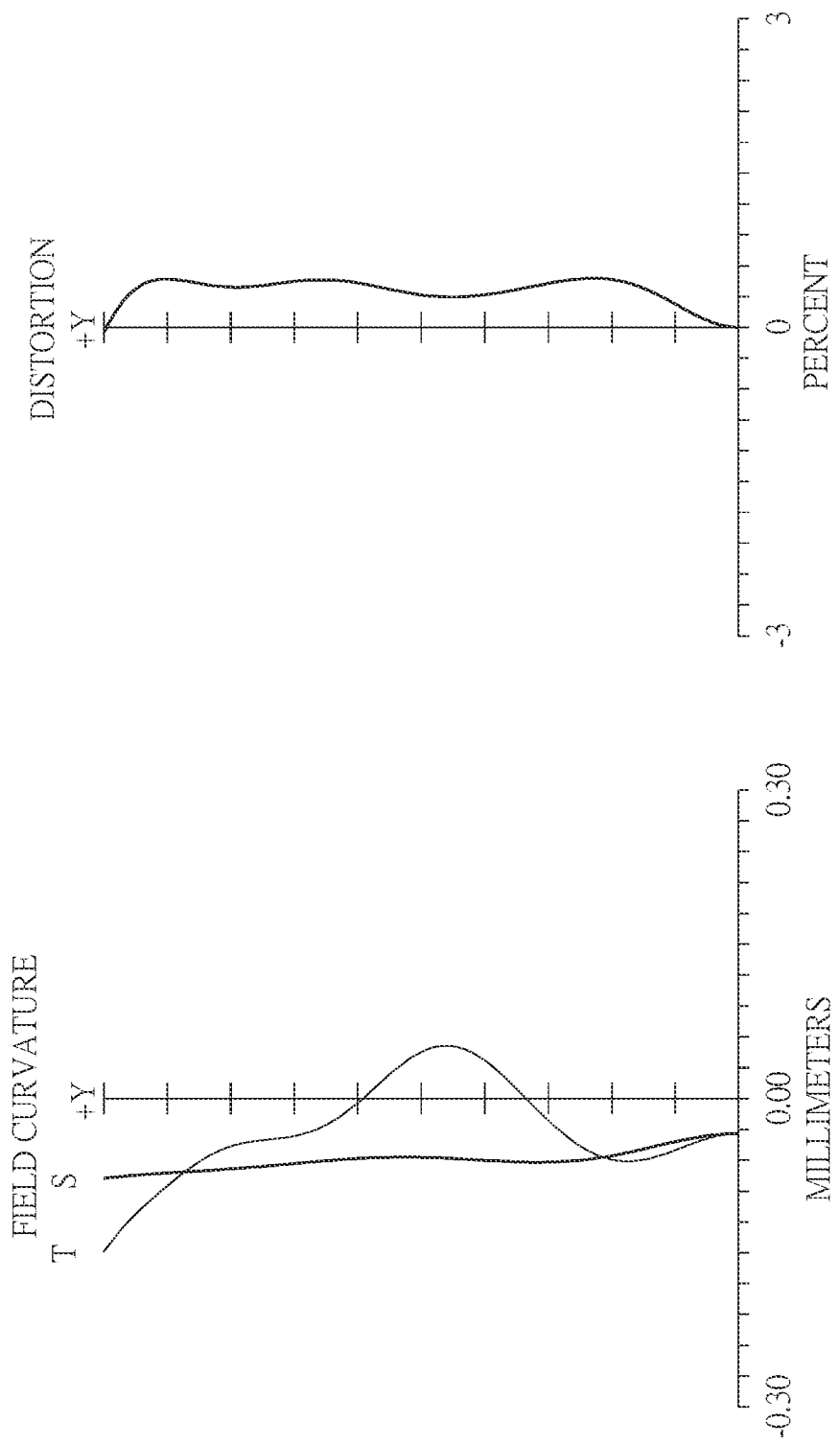
FIG. 8C shows the image plane curve and the distortion curve of the eighth embodiment of the present invention.

Referring to FIGS. 8A, 8B and FIG. 8C, FIG. 8A shows a three-piece compact optical lens system in accordance with an eighth embodiment of the present invention, FIG. 8B is a partial enlarged view of FIG. 8A, and FIG. 8C shows, in order from left to right, the image plane curve and the distortion curve of the eighth embodiment of the present invention. A three-piece compact optical lens system in accordance with the eighth embodiment of the present invention comprises, in order from an object side to an image side: a flat panel 860, a first lens element 810, a stop 800, a second lens element 820, a third lens element 830, an IR cut filter 870, and an image plane 880, wherein the three-piece compact optical lens system has a total of three lens elements with refractive power. The stop 800 is disposed between the first lens element 810 and the second lens element 820.

The flat panel 860 made of glass is located between an object O and the first lens element 810 and has no influence on the focal length of the three-piece compact optical lens system.

The first lens element 810 with a negative refractive power has an object-side surface 811 being concave near an optical axis 890 and an image-side surface 812 being concave near the optical axis 890, the object-side surface 811 and the image-side surface 812 are aspheric, and the first lens element 810 is made of plastic material.

The second lens element 820 with a positive refractive power has an object-side surface 821 being convex near the optical axis 890 and the image-side surface 822 being convex near the optical axis 890, the object-side surface 821 and the image-side surface 822 are aspheric, and the second lens element 820 is made of plastic material.

The third lens element 830 with a positive refractive power has an object-side surface 831 being concave near the optical axis 890 and an image-side surface 832 being convex near the optical axis 890, the object-side surface 831 and the image-side surface 832 are aspheric, and the third lens element 830 is made of plastic material.

The IR cut filter 870 made of glass is located between the third lens element 830 and the image plane 880 and has no influence on the focal length of the three-piece compact optical lens system.

The detailed optical data of the eighth embodiment is shown in table 15, and the aspheric surface data is shown in table 16.

TABLE 15

Embodiment 8
f(focal length) = 0.44 mm, Fno = 1.50, FOV = 132.3 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.479 | glass | 1.52 | 64.2 | |
| 2 | | infinity | 1.417 | | | | |
| 3 | Lens 1 | −0.632 (ASP) | 0.312 | plastic | 1.54 | 56 | −0.851 |
| 4 | | 2.101 (ASP) | 0.245 | | | | |
| 5 | stop | infinity | 0.042 | | | | |
| 6 | Lens 2 | 1.225 (ASP) | 0.425 | plastic | 1.54 | 56 | 0.771 |
| 7 | | −0.566 (ASP) | 0.125 | | | | |
| 8 | Lens 3 | −10.208 (ASP) | 0.383 | plastic | 1.54 | 56 | 1.050 |
| 9 | | −0.552 (ASP) | 0.524 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 16

Aspheric Coefficients

| surface | 3 | 4 | 6 | 7 | 8 | 9 |
|---|---|---|---|---|---|---|
| K: | 2.1456E+01 | −9.9429E+01 | −1.8573E+01 | 3.0003E−01 | 5.2564E+01 | −5.7592E−01 |
| A: | 1.3518E+00 | 1.1184E+01 | −6.5504E−01 | 2.0075E+00 | 5.7561E−01 | 2.8745E−01 |
| B: | −2.8741E+00 | −9.9210E+01 | 7.4499E+00 | 9.1538E+00 | 1.1120E+00 | 9.4536E+00 |
| C: | 4.3199E+00 | 1.0259E+03 | 8.1575E+00 | −2.0725E+02 | −3.4213E+00 | −2.2519E+01 |
| D: | −3.2447E+00 | −6.1578E+03 | 3.6632E+01 | 6.6121E+02 | −1.1599E+02 | 7.4517E+00 |
| E: | 8.7751E−01 | 2.3017E+04 | −1.2165E+03 | 1.5422E+03 | 3.4881E+02 | 1.8979E+01 |
| F | 1.4317E−01 | 6.7277E+04 | 2.1879E+03 | −4.5804E+03 | −1.5870E+02 | −1.1563E+00 |
| G | 0.0000E+00 | 0.0000E+00 | 0.0000E+00 | 0.0000E+00 | 0.0000E+00 | 0.0000E+00 |

In the eighth embodiment, the equation of the aspheric surface profiles of the aforementioned lens elements is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 15 and Table 16 as the following values and satisfy the following conditions:

| Embodiment 8 | |
|---|---|
| f[mm] | 0.44 |
| Fno | 1.50 |
| FOV[deg.] | 132.3 |
| OTL | 5.16 |
| PTL | 3.68 |
| $|f/(f1 * f2 * f3)|[mm^{-2}]$ | 0.64 |
| f/f1 | −0.52 |
| f/f2 | 0.57 |
| f/f3 | 0.42 |
| f/f23 | 0.73 |
| f1/f23 | −1.41 |
| f1/R1 | 1.35 |
| f1/R2 | −0.41 |
| f2/R3 | 0.63 |
| f2/R4 | −1.36 |
| f3/R5 | −0.10 |
| f3/R6 | −1.90 |
| R1/R2 | −0.30 |
| R3/R4 | −2.17 |
| R5/R6 | 18.49 |
| OTL/f | 11.71 |
| PTL/f | 8.36 |
| $(f1 + f2 + f3)/(f1 * f2 * f3)$ $[mm^{-2}]$ | −1.41 |
| P/Y | 4.69 |
| OTL/Y | 6.08 |

Figure 9A:
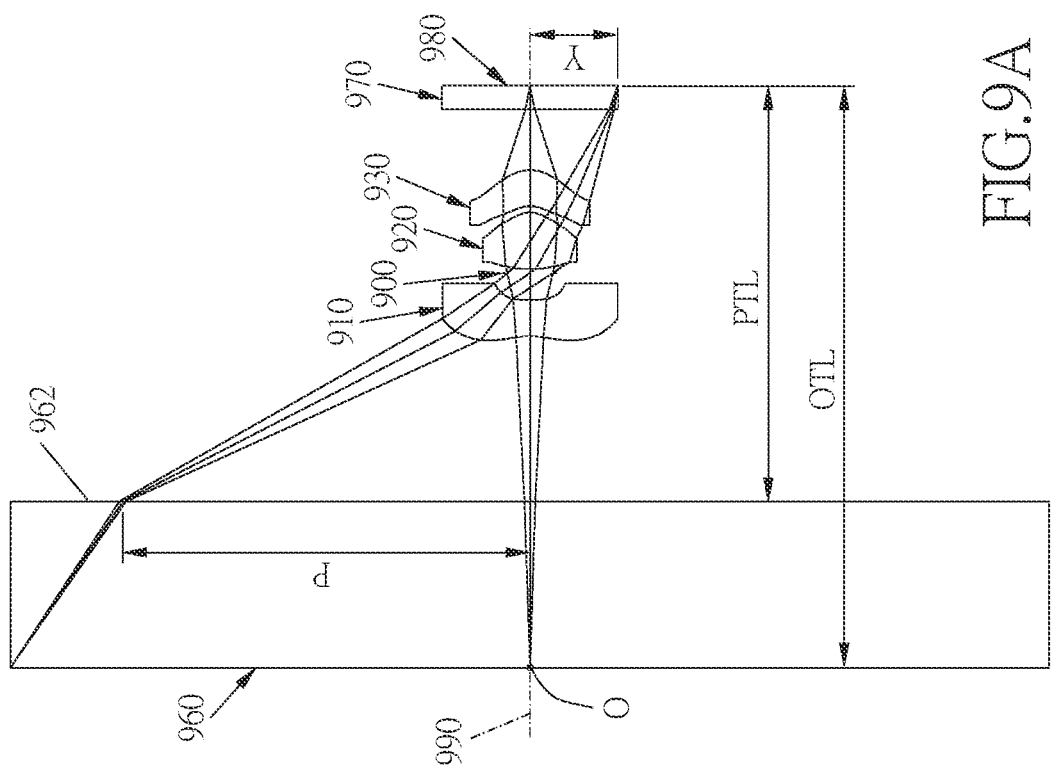
FIG. 9A shows a three-piece compact optical lens system in accordance with a ninth embodiment of the present invention.
Figure 9B:
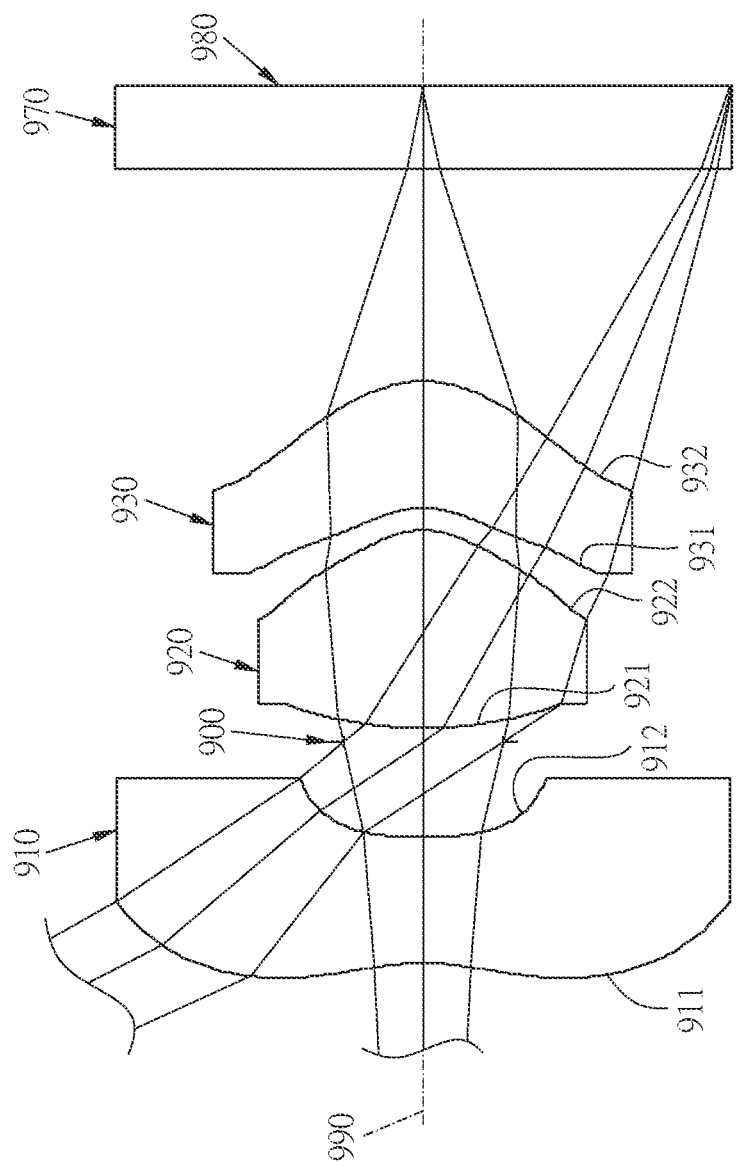
FIG. 9B is a partial enlarged view of FIG. 9A.

Referring to FIGS. 9A, 9B and FIG. 9C, FIG. 9A shows a three-piece compact optical lens system in accordance with a ninth embodiment of the present invention, FIG. 9B is a partial enlarged view of FIG. 9A, and FIG. 9C shows, in order from left to right, the image plane curve and the distortion curve of the ninth embodiment of the present invention. A three-piece compact optical lens system in accordance with the ninth embodiment of the present invention comprises, in order from an object side to an image side: a flat panel 960, a first lens element 910, a stop 900, a second lens element 920, a third lens element 930, an IR cut filter 970, and an image plane 980, wherein the three-piece compact optical lens system has a total of three lens elements with refractive power. The stop 900 is disposed between the first lens element 910 and the second lens element 920.

The flat panel 960 made of glass is located between an object O and the first lens element 910 and has no influence on the focal length of the three-piece compact optical lens system.

The first lens element 910 with a negative refractive power has an object-side surface 911 being concave near an optical axis 990 and an image-side surface 912 being concave near the optical axis 990, the object-side surface 911 and the image-side surface 912 are aspheric, and the first lens element 910 is made of plastic material.

The second lens element 920 with a positive refractive power has an object-side surface 921 being convex near the optical axis 990 and the image-side surface 922 being convex near the optical axis 990, the object-side surface 921 and the image-side surface 922 are aspheric, and the second lens element 920 is made of plastic material.

The third lens element 930 with a positive refractive power has an object-side surface 931 being concave near the optical axis 990 and an image-side surface 932 being convex near the optical axis 990, the object-side surface 931 and the image-side surface 932 are aspheric, and the third lens element 930 is made of plastic material.

The IR cut filter 970 made of glass is located between the third lens element 930 and the image plane 980 and has no influence on the focal length of the three-piece compact optical lens system.

The detailed optical data of the ninth embodiment is shown in table 17, and the aspheric surface data is shown in table 18.

TABLE 17

Embodiment 9
f(focal length) = 0.46 mm, Fno = 1.51, FOV = 131.7 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.454 | glass | 1.52 | 64.2 | |
| 2 | | infinity | 1.447 | | | | |
| 3 | Lens 1 | −0.622 (ASP) | 0.316 | plastic | 1.54 | 56 | −1.046 |
| 4 | | 8.570 (ASP) | 0.237 | | | | |
| 5 | stop | infinity | 0.033 | | | | |
| 6 | Lens 2 | 1.075 (ASP) | 0.495 | plastic | 1.54 | 56 | 0.430 |
| 7 | | −0.253 (ASP) | 0.056 | | | | |
| 8 | Lens 3 | −0.255 (ASP) | 0.315 | plastic | 1.54 | 56 | 11.985 |
| 9 | | −0.353 (ASP) | 0.530 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 18

Aspheric Coefficients

| surface | 3 | 4 | 6 | 7 | 8 | 9 |
|---|---|---|---|---|---|---|
| K: | 2.0598E+01 | −2.7024E+01 | −2.4769E+01 | −1.2897E+00 | −4.3761E+00 | −3.2130E+00 |
| A: | 1.4581E+00 | 1.7017E+01 | 3.0414E−01 | 6.8054E+00 | 1.8468E+00 | −2.4111E+00 |
| B: | −3.7909E+00 | −2.5524E+01 | 1.3398E+01 | 3.7485E+01 | 1.7333E+01 | 9.9442E+00 |
| C: | 7.7446E+00 | 3.1343E+03 | −1.7080E+02 | −8.9799E+02 | −1.9885E+02 | −1.0084E+01 |
| D: | −8.5792E+00 | −1.1246E+04 | −9.1901E+01 | 3.5279E+03 | 9.7016E+01 | −7.3492E+00 |
| E: | 2.5714E+00 | −1.0981E+05 | 2.0763E+04 | 5.3996E+02 | 2.2474E+03 | 8.4010E+01 |
| F | 4.2954E+00 | 1.1915E+06 | −1.6135E+05 | −6.2853E+04 | −1.7275E+03 | −1.2637E+02 |
| G | −3.1744E+00 | −2.6098E+06 | 3.8305E+05 | 1.1988E+05 | −6.9527E+03 | −1.0230E+02 |

In the ninth embodiment, the equation of the aspheric surface profiles of the aforementioned lens elements is the same as the equation of the first embodiment. Also, the definitions of these parameters shown in the following table are the same as those stated in the first embodiment with corresponding values for the ninth embodiment, so an explanation in this regard will not be provided again.

Moreover, these parameters can be calculated from Table 17 and Table 18 as the following values and satisfy the following conditions:

| Embodiment 9 | |
|---|---|
| f[mm] | 0.46 |
| Fno | 1.51 |
| FOV[deg.] | 131.7 |
| OTL | 5.09 |
| PTL | 3.64 |
| \|f/(f1 * f2 * f3)\|[mm$^{-2}$] | 0.08 |
| f/f1 | −0.44 |
| f/f2 | 1.06 |
| f/f3 | 0.04 |
| f/f23 | 0.75 |
| f1/f23 | −1.72 |
| f1/R1 | 1.68 |
| f1/R2 | −0.12 |
| f2/R3 | 0.40 |
| f2/R4 | −1.70 |
| f3/R5 | −46.95 |
| f3/R6 | −33.93 |
| R1/R2 | −0.07 |
| R3/R4 | −4.25 |
| R5/R6 | 0.72 |
| OTL/f | 11.19 |
| PTL/f | 8.00 |
| (f1 + f2 + f3)/(f1 * f2 * f3) [mm$^{-2}$] | −2.11 |
| P/Y | 4.65 |
| OTL/Y | 5.77 |

Figure 10A:
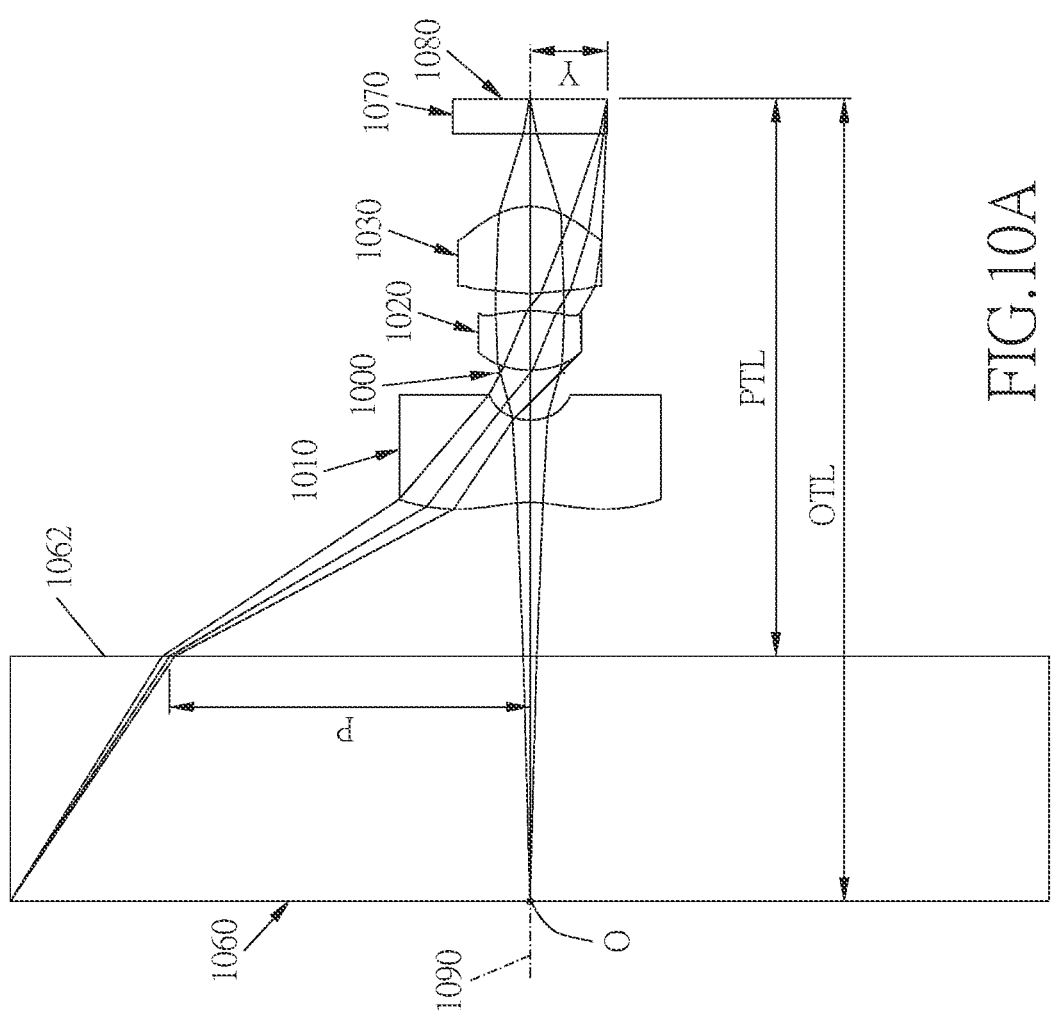
FIG. 10A shows a three-piece compact optical lens system in accordance with a tenth embodiment of the present invention.
Figure 10B:
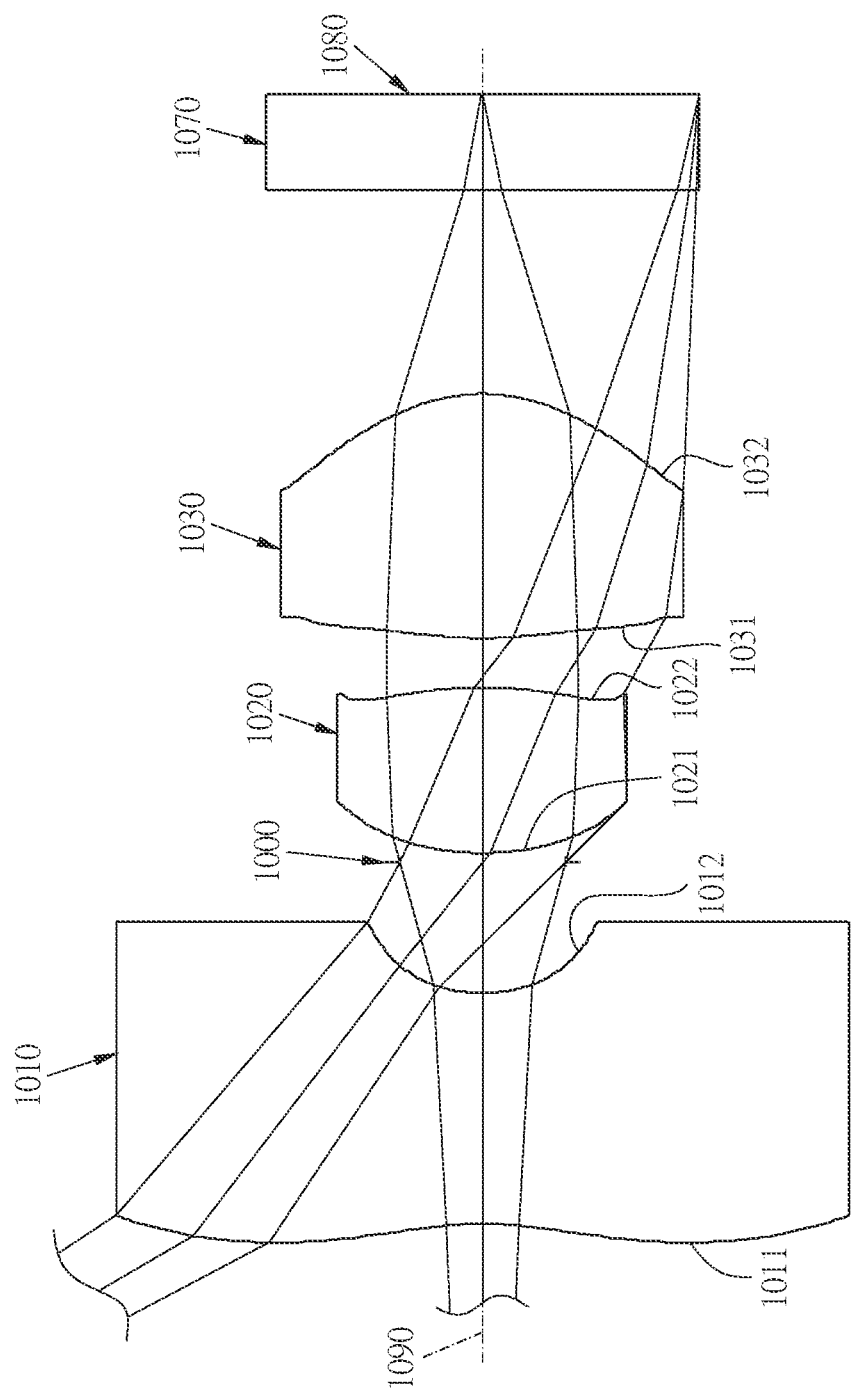
FIG. 10B is a partial enlarged view of FIG. 10A.
Figure 10C:
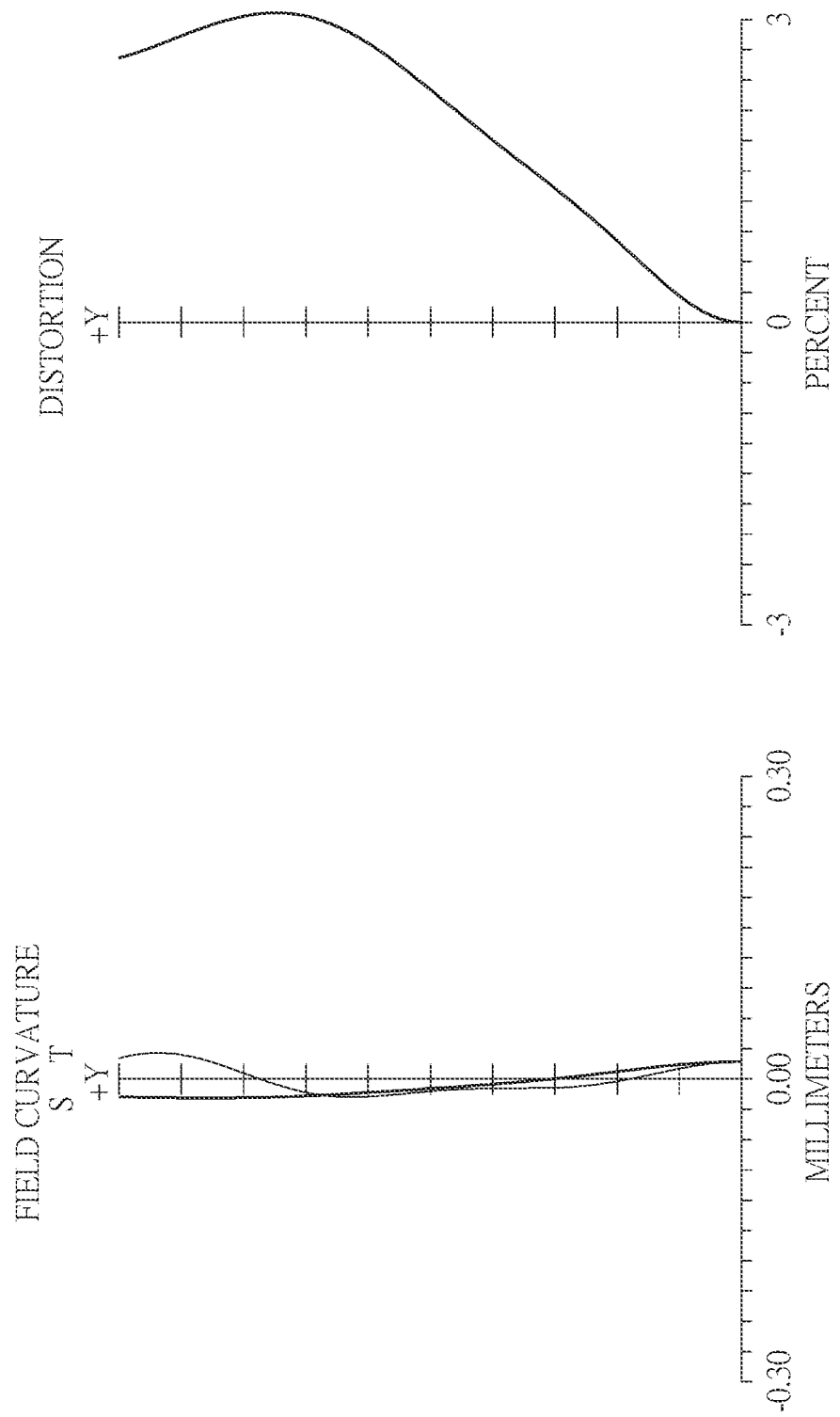
FIG. 10C shows the image plane curve and the distortion curve of the tenth embodiment of the present invention.

Referring to FIGS. 10A, 10B and FIG. 10C, FIG. 10A shows a three-piece compact optical lens system in accordance with a tenth embodiment of the present invention, FIG. 10B is a partial enlarged view of FIG. 10A, and FIG. 10C shows, in order from left to right, the image plane curve and the distortion curve of the tenth embodiment of the present invention. A three-piece compact optical lens system in accordance with the tenth embodiment of the present invention comprises, in order from an object side to an image side: a flat panel 1060, a first lens element 1010, a stop 1000, a second lens element 1020, a third lens element 1030, an IR cut filter 1070, and an image plane 1080, wherein the three-piece compact optical lens system has a total of three lens elements with refractive power. The stop 1000 is disposed between the first lens element 1010 and the second lens element 1020.

The flat panel 1060 made of glass is located between an object O and the first lens element 1010 and has no influence on the focal length of the three-piece compact optical lens system.

The first lens element 1010 with a negative refractive power has an object-side surface 1011 being concave near an optical axis 1090 and an image-side surface 1012 being concave near the optical axis 1090, the object-side surface 1011 and the image-side surface 1012 are aspheric, and the first lens element 1010 is made of plastic material.

The second lens element 1020 with a positive refractive power has an object-side surface 1021 being convex near the optical axis 1090 and the image-side surface 1022 being convex near the optical axis 1090, the object-side surface 1021 and the image-side surface 1022 are aspheric, and the second lens element 1020 is made of plastic material.

The third lens element 1030 with a positive refractive power has an object-side surface 1031 being convex near the optical axis 1090 and an image-side surface 1032 being convex near the optical axis 1090, the object-side surface 1031 and the image-side surface 1032 are aspheric, and the third lens element 1030 is made of plastic material.

The IR cut filter 1070 made of glass is located between the third lens element 1030 and the image plane 1080 and has no influence on the focal length of the three-piece compact optical lens system.

The detailed optical data of the tenth embodiment is shown in table 19, and the aspheric surface data is shown in table 20.

TABLE 19

Embodiment 10
f(focal length) = 0.34 mm, Fno = 1.60, FOV = 124.3 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.479 | glass | 1.52 | 64.2 | |
| 2 | | infinity | 1.417 | | | | |
| 3 | Lens 1 | −0.632 (ASP) | 0.312 | plastic | 1.54 | 56 | −0.851 |

TABLE 19-continued

Embodiment 10
f(focal length) = 0.34 mm, Fno = 1.60, FOV = 124.3 deg.

| surface | | Curvature Radius | Thickness | Material | Index | Abbe # | Focal length |
|---|---|---|---|---|---|---|---|
| 4 | | 2.101 (ASP) | 0.245 | | | | |
| 5 | stop | infinity | 0.042 | | | | |
| 6 | Lens 2 | 1.225 (ASP) | 0.425 | plastic | 1.54 | 56 | 0.771 |
| 7 | | −0.566 (ASP) | 0.125 | | | | |
| 8 | Lens 3 | −10.208 (ASP) | 0.383 | plastic | 1.54 | 56 | 1.050 |
| 9 | | −0.552 (ASP) | 0.524 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 20

Aspheric Coefficients

| surface | 3 | 4 | 6 | 7 | 8 | 9 |
|---|---|---|---|---|---|---|
| K: | −2.6065E+01 | 5.8549E−01 | 2.7878E+00 | 4.6178E+00 | −3.0175E+01 | −7.5712E−01 |
| A: | 7.4486E−01 | 8.1879E+00 | −2.4360E−01 | −2.8707E+00 | −9.3887E−01 | 2.6110E−01 |
| B: | −1.5134E+00 | −3.5185E+01 | 1.0421E+01 | 9.1894E+01 | −1.0260E+00 | 1.1059E+01 |
| C: | 3.1437E+00 | 1.7477E+03 | −1.8408E+00 | −1.2552E+03 | 3.3138E+01 | −1.1815E+02 |
| D: | −1.7502E+00 | 7.2185E+04 | −2.0495E+03 | 1.0269E+04 | −3.5042E+02 | 5.1799E+02 |
| E: | 5.7980E−01 | −8.6904E+05 | 2.2580E+04 | 3.4097E+03 | 3.0236E+03 | 4.5624E+00 |
| F | 1.1620E+00 | 3.0905E+06 | −9.9103E+04 | −5.0903E+05 | −6.6360E+03 | −6.9057E+03 |
| G | −1.3238E−01 | 1.3408E+07 | 3.0405E+03 | 2.3975E+06 | −2.8664E+03 | 1.6537E+04 |

In the tenth embodiment, the equation of the aspheric surface profiles of the aforementioned lens elements is the same as the equation of the first embodiment. Also, the definitions of these parameters shown in the following table are the same as those stated in the first embodiment with corresponding values for the tenth embodiment, so an explanation in this regard will not be provided again.

Moreover, these parameters can be calculated from Table 19 and Table 20 as the following values and satisfy the following conditions:

| Embodiment 10 | |
|---|---|
| f[mm] | 0.34 |
| Fno | 1.60 |
| FOV[deg.] | 124.3 |
| OTL | 4.91 |
| PTL | 3.41 |
| $|f/(f1 * f2 * f3)|[mm^{-2}]$ | 1.13 |
| f/f1 | −0.72 |
| f/f2 | 0.37 |
| f/f3 | 0.49 |
| f/f23 | 0.57 |
| f1/f23 | −0.79 |
| f1/R1 | 0.53 |
| f1/R2 | −1.07 |
| f2/R3 | 1.25 |
| f2/R4 | −0.70 |
| f3/R5 | 0.63 |
| f3/R6 | −1.44 |
| R1/R2 | −2.01 |
| R3/R4 | −0.56 |
| R5/R6 | −2.31 |
| OTL/f | 14.53 |
| PTL/f | 10.09 |
| $(f1 + f2 + f3)/(f1 * f2 * f3)\ [mm^{-2}]$ | −3.80 |
| P/Y | 4.65 |
| OTL/Y | 9.42 |

Figure 11A:
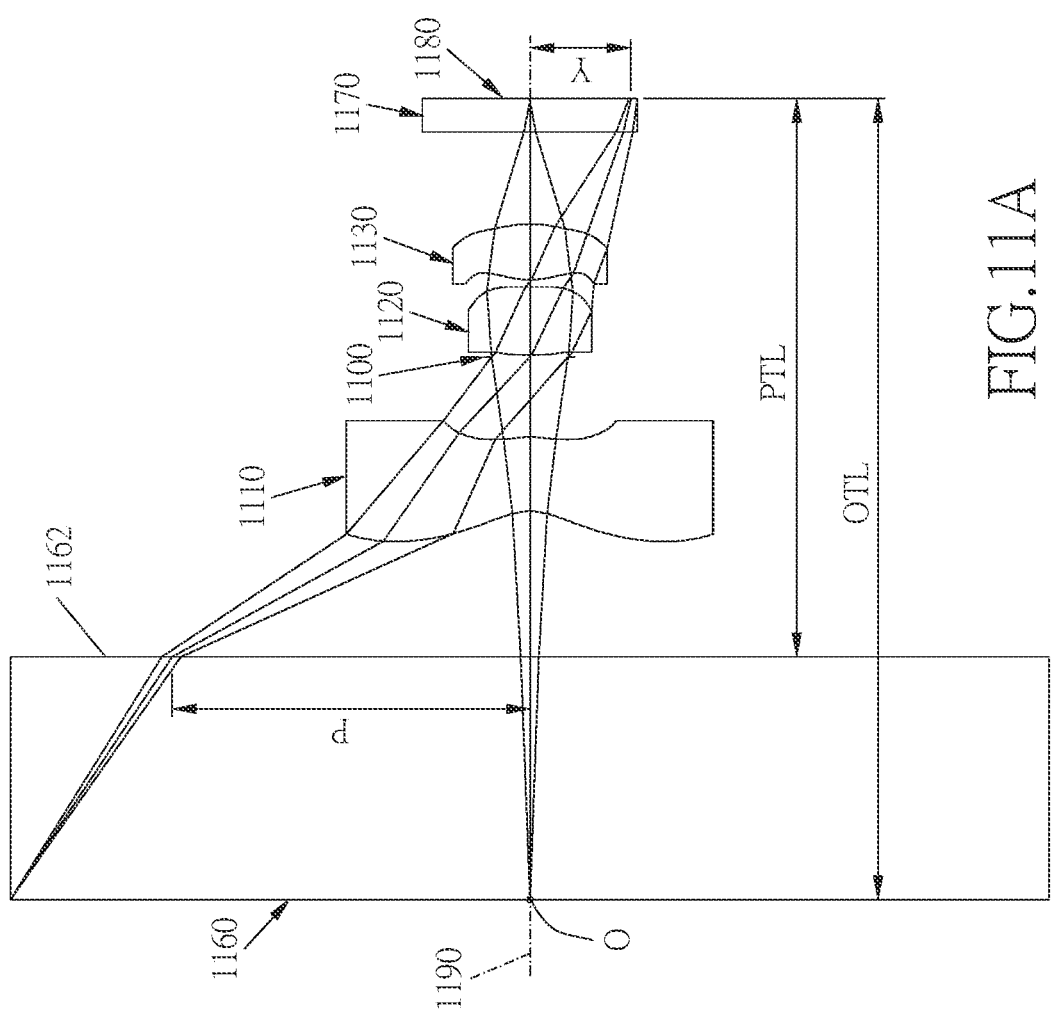
FIG. 11A shows a three-piece compact optical lens system in accordance with an eleventh embodiment of the present invention.
Figure 11B:
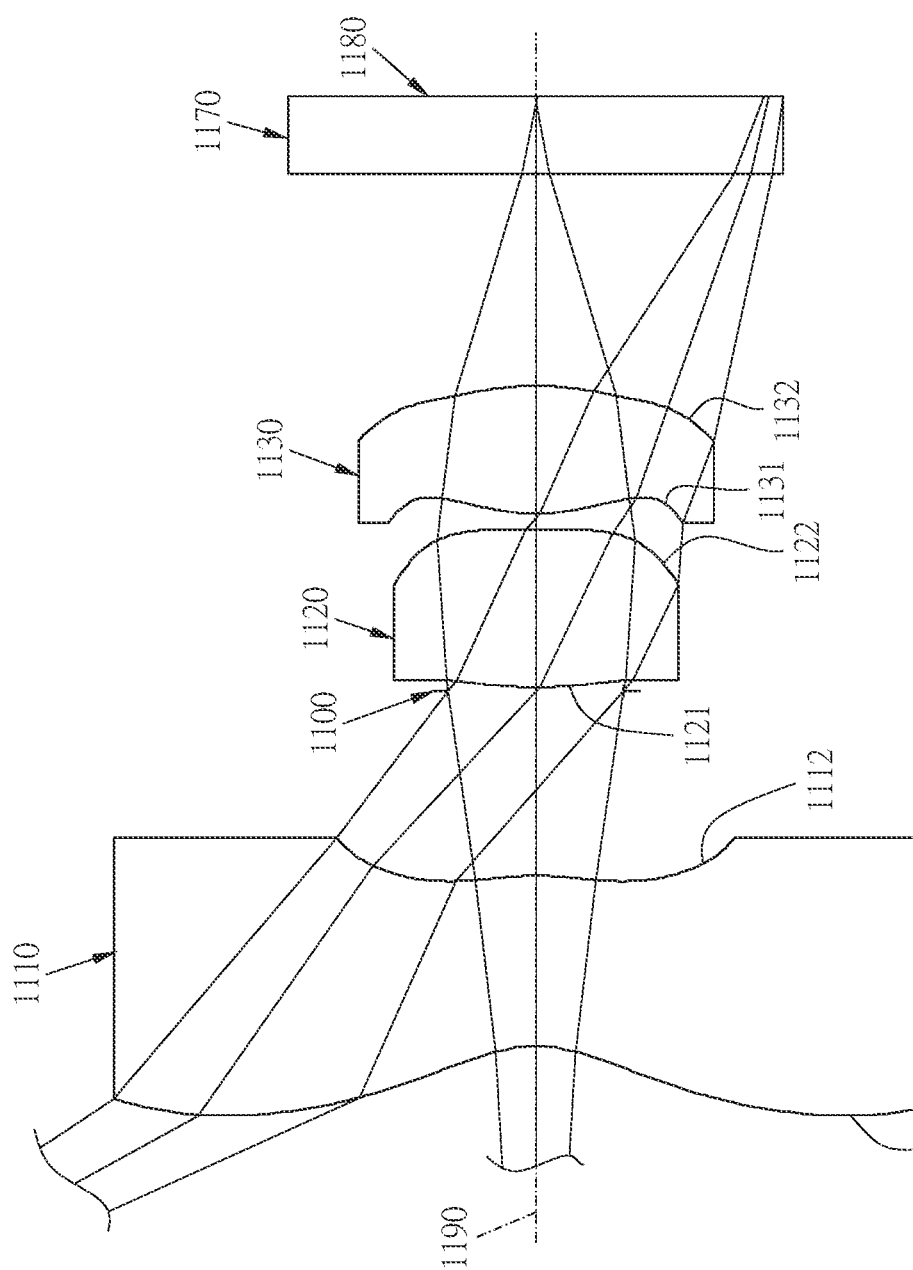
FIG. 11B is a partial enlarged view of FIG. 11A.
Figure 11C:
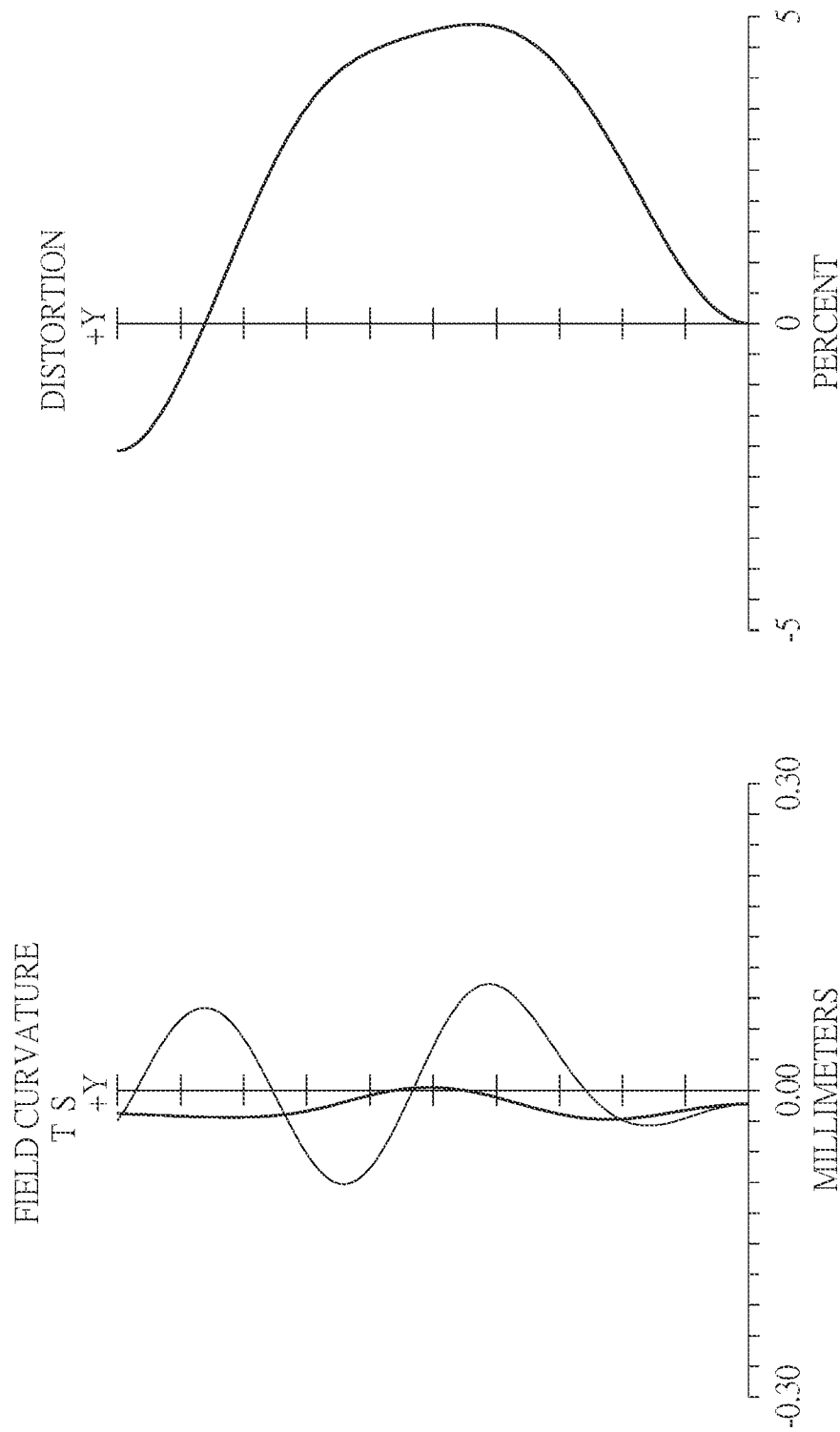
FIG. 11C shows the image plane curve and the distortion curve of the eleventh embodiment of the present invention.

Referring to FIGS. 11A, 11B and FIG. 11C, FIG. 11A shows a three-piece compact optical lens system in accordance with an eleventh embodiment of the present invention, FIG. 11B is a partial enlarged view of FIG. 11A, and FIG. 11C shows, in order from left to right, the image plane curve and the distortion curve of the eleventh embodiment of the present invention. A three-piece compact optical lens system in accordance with the eleventh embodiment of the present invention comprises, in order from an object side to an image side: a flat panel 1160, a first lens element 1110, a stop 1100, a second lens element 1120, a third lens element 1130, an IR cut filter 1170, and an image plane 1180, wherein the three-piece compact optical lens system has a total of three lens elements with refractive power. The stop 1100 is disposed between the first lens element 1110 and the second lens element 1120.

The flat panel 1160 made of glass is located between an object O and the first lens element 1110 and has no influence on the focal length of the three-piece compact optical lens system.

The first lens element 1110 with a negative refractive power has an object-side surface 1111 being concave near an optical axis 1190 and an image-side surface 1112 being convex near the optical axis 1190, the object-side surface 1111 and the image-side surface 1112 are aspheric, and the first lens element 1110 is made of plastic material.

The second lens element 1120 with a positive refractive power has an object-side surface 1121 being convex near the optical axis 1190 and the image-side surface 1122 being concave near the optical axis 1190, the object-side surface 1121 and the image-side surface 1122 are aspheric, and the second lens element 1120 is made of plastic material.

The third lens element 1130 with a positive refractive power has an object-side surface 1131 being convex near the optical axis 1190 and an image-side surface 1132 being convex near the optical axis 1190, the object-side surface 1131 and the image-side surface 1132 are aspheric, and the third lens element 1130 is made of plastic material.

The IR cut filter 1170 made of glass is located between the third lens element 1130 and the image plane 1180 and has no influence on the focal length of the three-piece compact optical lens system.

The detailed optical data of the eleventh embodiment is shown in table 21, and the aspheric surface data is shown in table 22.

TABLE 21

Embodiment 11
f(focal length) = 0.38 mm, Fno = 1.37, FOV = 109.1 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.500 | glass | 1.52 | 64.2 | |
| 2 | | infinity | 0.901 | | | | |
| 3 | Lens 1 | −0.378 (ASP) | 0.457 | plastic | 1.54 | 56 | −1.558 |
| 4 | | −0.969 (ASP) | 0.497 | | | | |
| 5 | stop | infinity | 0.010 | | | | |
| 6 | Lens 2 | 1.348 (ASP) | 0.421 | plastic | 1.54 | 56 | 6.333 |
| 7 | | 1.963 (ASP) | 0.044 | | | | |
| 8 | Lens 3 | 0.491 (ASP) | 0.344 | plastic | 1.54 | 56 | 0.654 |
| 9 | | −0.996 (ASP) | 0.570 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 22

Aspheric Coefficients

| surface | 3 | 4 | 6 | 7 | 8 | 9 |
|---|---|---|---|---|---|---|
| K: | −6.2214E+00 | −6.2403E−01 | −6.7035E+00 | 1.9920E+01 | −1.1433E+01 | −1.6950E+00 |
| A: | 5.5289E−01 | 6.1674E+00 | 2.5480E+00 | −1.7030E+01 | −8.5605E+00 | −3.0978E+00 |
| B: | −8.3998E−01 | −2.5654E+01 | −4.5061E+02 | 3.9829E+02 | 3.1214E+02 | 1.1603E+02 |
| C: | 8.1714E−01 | 2.1781E+01 | −2.3718E+04 | −7.6801E+03 | −5.5433E+03 | −1.3118E+03 |
| D: | −4.8494E−01 | 4.3860E+02 | −6.3239E+05 | 8.6648E+04 | 5.2235E+04 | 7.4996E+03 |
| E: | 1.7190E−01 | −2.3259E+03 | 8.9361E+06 | −5.7134E+05 | −2.8331E+05 | −2.4721E+04 |
| F | −3.3136E−02 | 4.8651E+03 | −6.3837E+07 | −2.0276E+06 | 8.0778E+05 | 4.4416E+04 |
| G | 2.6973E−03 | −3.7398E+03 | 1.8060E+08 | −2.9951E+06 | −9.1679E+05 | −3.2991E+04 |

In the eleventh embodiment, the equation of the aspheric surface profiles of the aforementioned lens elements is the same as the equation of the first embodiment. Also, the definitions of these parameters shown in the following table are the same as those stated in the first embodiment with corresponding values for the eleventh embodiment, so an explanation in this regard will not be provided again.

Moreover, these parameters can be calculated from Table 21 and Table 22 as the following values and satisfy the following conditions:

| Embodiment 11 | |
|---|---|
| f[mm] | 0.43 |
| Fno | 1.50 |
| FOV[deg.] | 126.6 |
| OTL | 4.95 |
| PTL | 3.45 |
| \|f/(f1 * f2 * f3)\|[mm$^{-2}$] | 0.07 |
| f/f1 | −0.28 |
| f/f2 | 0.07 |
| f/f3 | 0.66 |
| f/f23 | 0.64 |
| f1/f23 | −2.32 |

-continued

| Embodiment 11 | |
|---|---|
| f1/R1 | 4.12 |
| f1/R2 | 1.61 |
| f2/R3 | 4.70 |
| f2/R4 | 3.23 |
| f3/R5 | 1.33 |
| f3/R6 | −0.66 |

-continued

| Embodiment 11 | |
|---|---|
| R1/R2 | 0.39 |
| R3/R4 | 0.69 |
| R5/R6 | −0.49 |
| OTL/f | 11.47 |
| PTL/f | 8.00 |
| (f1 + f2 + f3)/(f1 * f2 * f3) [mm$^{-2}$] | −0.84 |
| P/Y | 3.53 |
| OTL/Y | 7.26 |

Figure 12A:
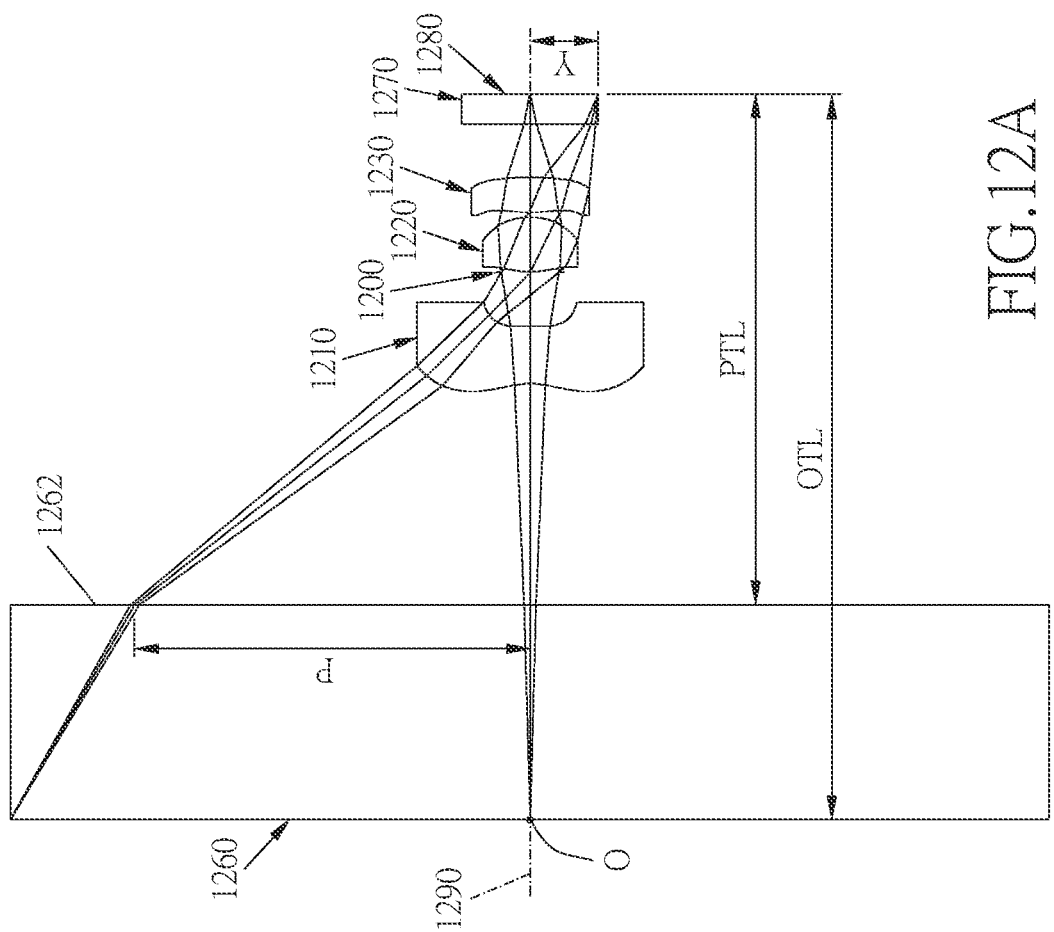
FIG. 12A shows a three-piece compact optical lens system in accordance with a twelfth embodiment of the present invention.
Figure 12B:
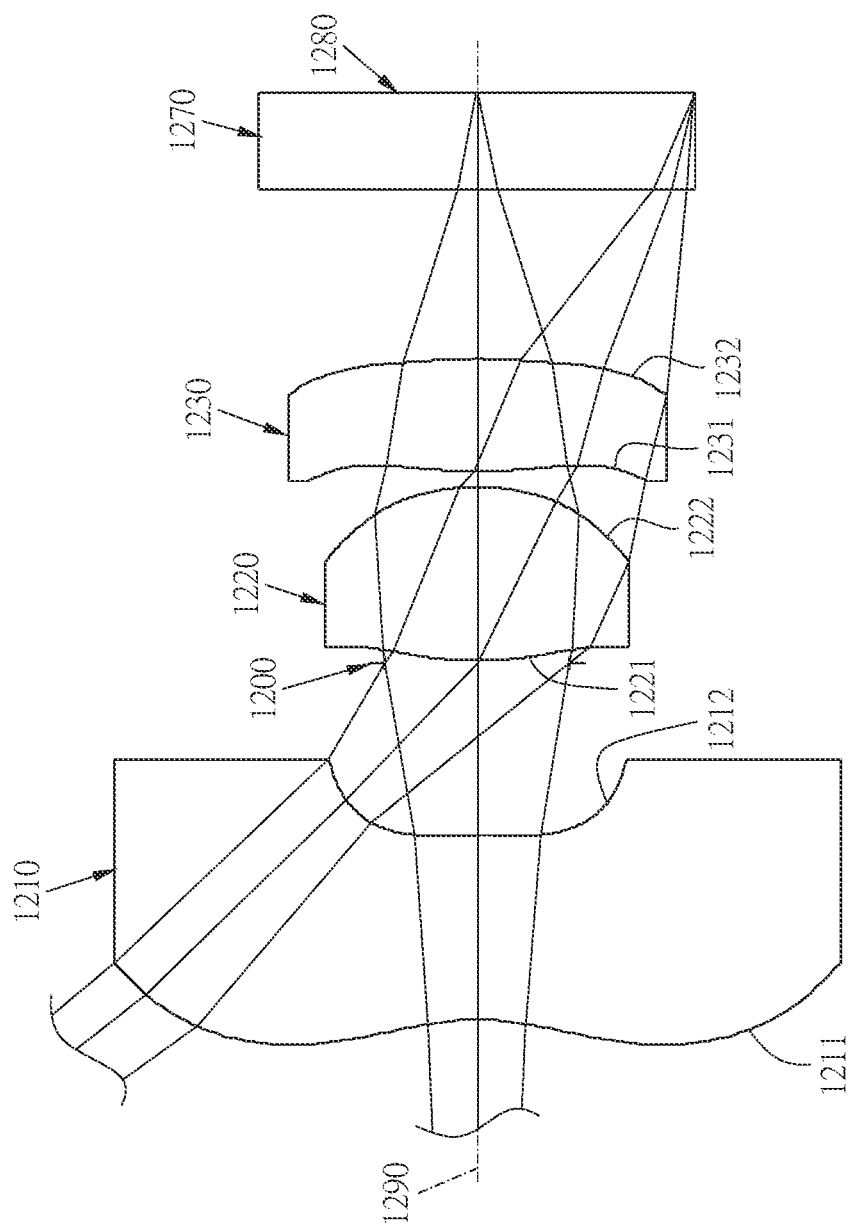
FIG. 12B is a partial enlarged view of FIG. 12A.
Figure 12C:
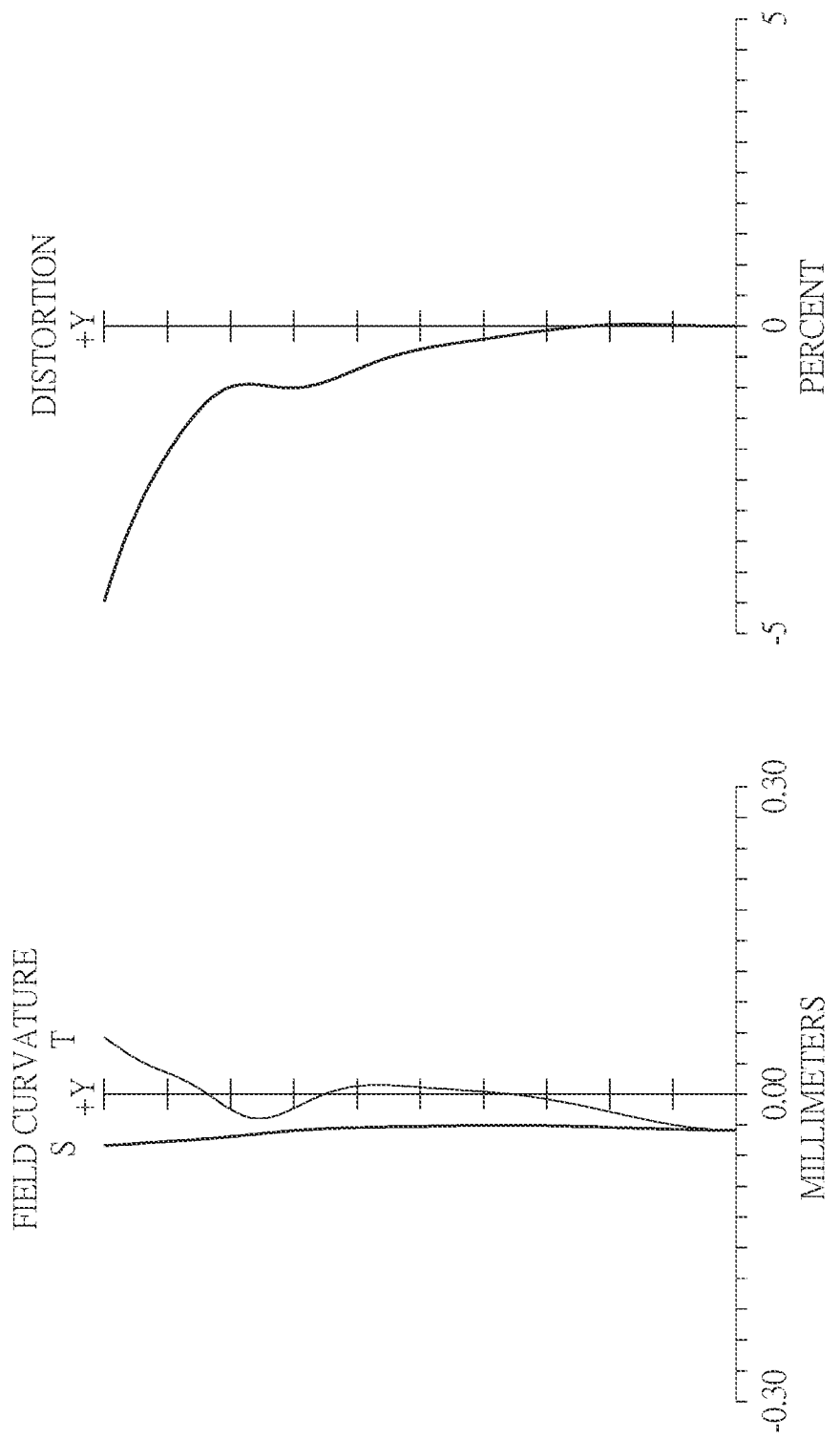
FIG. 12C shows the image plane curve and the distortion curve of the twelfth embodiment of the present invention.

Referring to FIGS. 12A, 12B and FIG. 12C, FIG. 12A shows a three-piece compact optical lens system in accordance with a twelfth embodiment of the present invention, FIG. 12B is a partial enlarged view of FIG. 12A, and FIG. 12C shows, in order from left to right, the image plane curve and the distortion curve of the twelfth embodiment of the present invention. A three-piece compact optical lens system in accordance with the twelfth embodiment of the present invention comprises, in order from an object side to an image side: a flat panel 1260, a first lens element 1210, a stop 1200, a second lens element 1220, a third lens element 1230, an IR cut filter 1270, and an image plane 1280, wherein the three-piece compact optical lens system has a total of three lens elements with refractive power. The stop 1200 is disposed between the first lens element 1210 and the second lens element 1220.

The flat panel 1260 made of glass is located between an object O and the first lens element 1210 and has no influence on the focal length of the three-piece compact optical lens system.

The first lens element 1210 with a negative refractive power has an object-side surface 1211 being concave near an optical axis 1290 and an image-side surface 1212 being convex near the optical axis 1290, the object-side surface 1211 and the image-side surface 1212 are aspheric, and the first lens element 1210 is made of plastic material.

The second lens element 1220 with a positive refractive power has an object-side surface 1221 being convex near the optical axis 1290 and the image-side surface 1222 being convex near the optical axis 1290, the object-side surface 1221 and the image-side surface 1222 are aspheric, and the second lens element 1220 is made of plastic material.

The third lens element 1230 with a positive refractive power has an object-side surface 1231 being convex near the optical axis 1290 and an image-side surface 1232 being convex near the optical axis 1290, the object-side surface 1231 and the image-side surface 1232 are aspheric, and the third lens element 1230 is made of plastic material.

The IR cut filter 1270 made of glass is located between the third lens element 1230 and the image plane 1280 and has no influence on the focal length of the three-piece compact optical lens system.

The detailed optical data of the eleventh embodiment is shown in table 23, and the aspheric surface data is shown in table 24.

In the twelfth embodiment, the equation of the aspheric surface profiles of the aforementioned lens elements is the same as the equation of the first embodiment. Also, the definitions of these parameters shown in the following table are the same as those stated in the first embodiment with corresponding values for the twelfth embodiment, so an explanation in this regard will not be provided again.

Moreover, these parameters can be calculated from Table 23 and Table 24 as the following values and satisfy the following conditions:

| | Embodiment 12 |
|---|---|
| f[mm] | 0.38 |
| Fno | 1.37 |
| FOV[deg.] | 109.1 |
| OTL | 5.07 |
| PTL | 3.57 |
| $|f/(f1 * f2 * f3)|[mm^{-2}]$ | 0.37 |
| f/f1 | −0.31 |
| f/f2 | 0.53 |
| f/f3 | 0.32 |
| f/f23 | 0.75 |
| f1/f23 | −2.41 |
| f1/R1 | 1.85 |
| f1/R2 | 0.02 |
| f2/R3 | 0.83 |
| f2/R4 | −1.18 |
| f3/R5 | 0.80 |
| f3/R6 | −0.79 |
| R1/R2 | 0.01 |
| R3/R4 | −1.42 |
| R5/R6 | −0.98 |
| OTL/f | 13.43 |
| PTL/f | 9.46 |
| $(f1 + f2 + f3)/(f1 * f2 * f3) [mm^{-2}]$ | −0.67 |

TABLE 23

Embodiment 12
f(focal length) = 0.38 mm, Fno = 1.37, FOV = 109.1 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.500 | glass | 1.52 | 64.2 | |
| 2 | | infinity | 1.547 | | | | |
| 3 | Lens 1 | −0.656 (ASP) | 0.401 | plastic | 1.54 | 56 | −1.211 |
| 4 | | −69.712 (ASP) | 0.378 | | | | |
| 5 | stop | infinity | 0.006 | | | | |
| 6 | Lens 2 | 0.851 (ASP) | 0.380 | plastic | 1.54 | 56 | 0.709 |
| 7 | | −0.601 (ASP) | 0.034 | | | | |
| 8 | Lens 3 | 1.474 (ASP) | 0.245 | plastic | 1.64 | 22.5 | 1.178 |
| 9 | | −1.499 (ASP) | 0.370 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 24

Aspheric Coefficients

| surface | 3 | 4 | 6 | 7 | 8 | 9 |
|---|---|---|---|---|---|---|
| K: | −6.9736E+00 | −3.9296E+02 | −4.7396E+01 | 9.0679E−01 | −2.9032E+01 | −7.4791E+01 |
| A: | 2.0784E+00 | 6.7934E+00 | 4.6843E+00 | −5.6507E−02 | 1.0874E+00 | 2.0901E+00 |
| B: | −6.5561E+00 | −3.5290E−01 | −6.7783E+01 | −3.9015E+01 | −4.9116E+01 | −2.9440E+01 |
| C: | 1.4843E+01 | 2.7348E+02 | −4.1059E+02 | 3.2753E+02 | 1.3496E+02 | 1.5265E+01 |
| D: | −1.8684E+01 | −2.5856E+03 | 1.0551E+04 | 7.1057E+02 | 1.1134E+03 | 4.9651E+02 |
| E: | 8.7396E+00 | −1.2814E+04 | 8.4599E+04 | 9.9465E+01 | −3.6762E+02 | 4.0724E+03 |
| F | 8.9833E+00 | 2.5022E+05 | −1.9475E+06 | −6.1082E+04 | −7.6825E+04 | −4.8500E+04 |
| G | −5.0812E+00 | −1.5286E+05 | 6.3524E+06 | 1.8552E+05 | 2.8670E+05 | 1.1350E+05 |

-continued

Embodiment 12

| | |
|---|---|
| P/Y | 5.82 |
| OTL/Y | 9.68 |

Figure 13A:
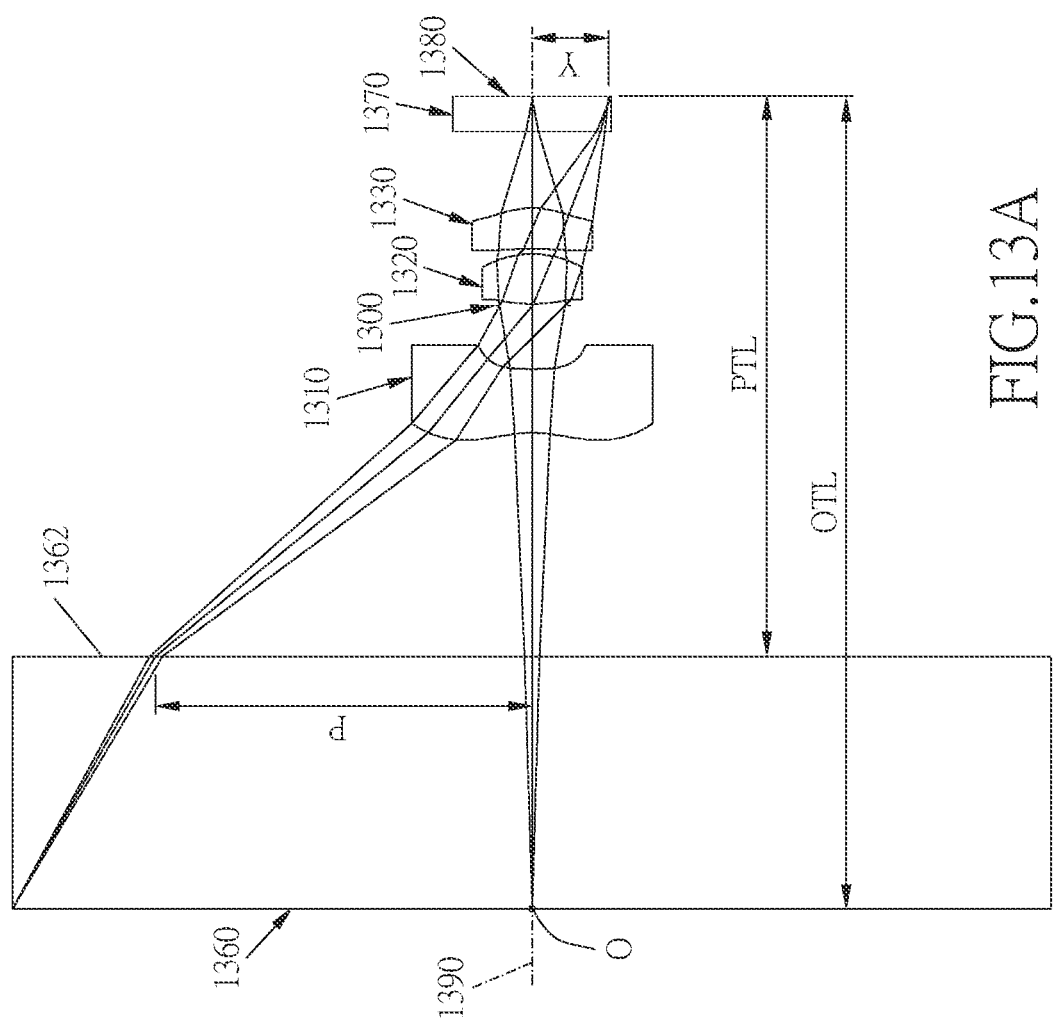
FIG. 13A shows a three-piece compact optical lens system in accordance with a thirteenth embodiment of the present invention.
Figure 13B:
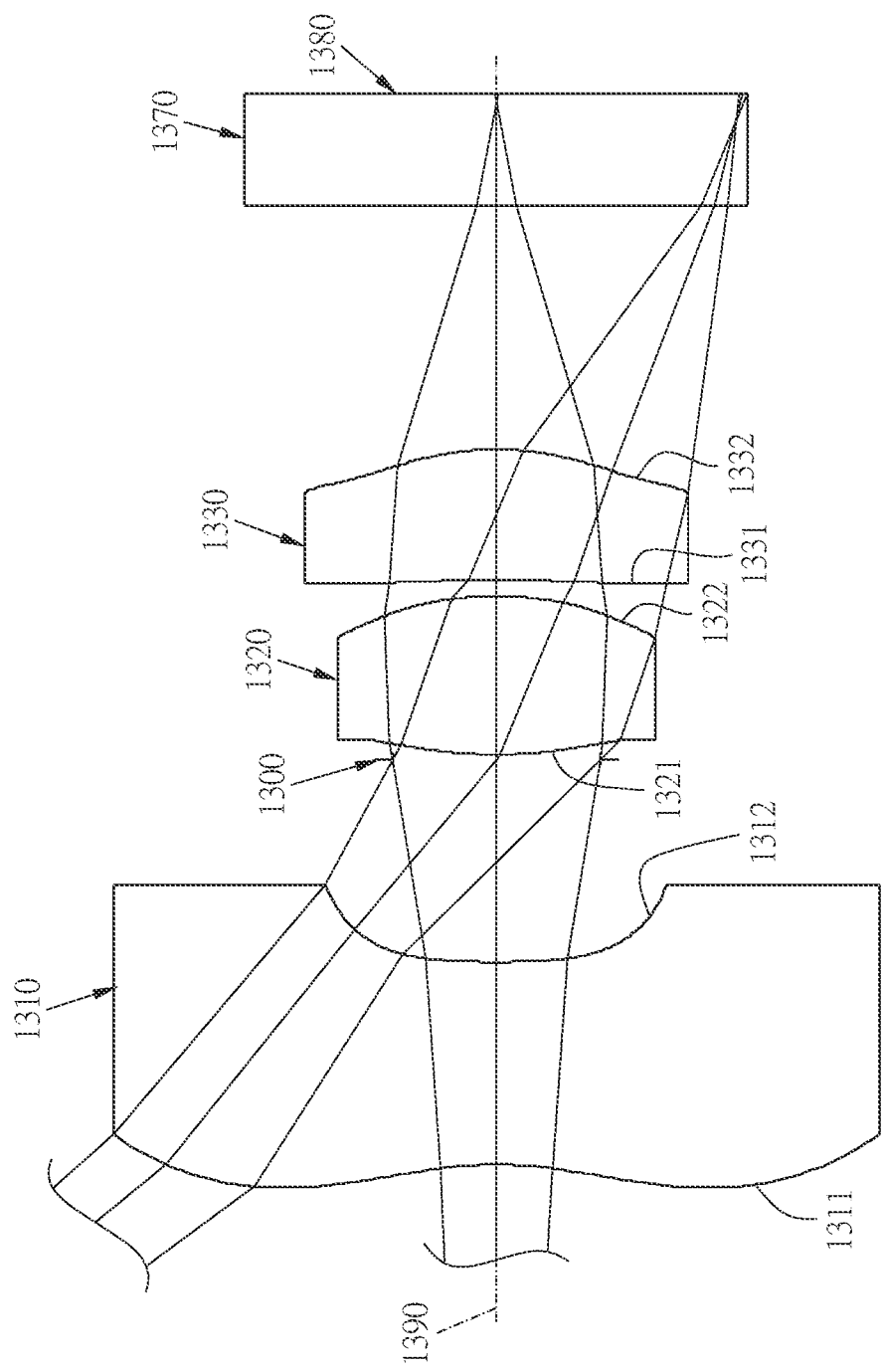
FIG. 13B is a partial enlarged view of FIG. 13A.

Referring to FIGS. 13A, 13B and FIG. 13C, FIG. 13A shows a three-piece compact optical lens system in accordance with a thirteenth embodiment of the present invention, FIG. 13B is a partial enlarged view of FIG. 13A, and FIG. 13C shows, in order from left to right, the image plane curve and the distortion curve of the thirteenth embodiment of the present invention. A three-piece compact optical lens system in accordance with the thirteenth embodiment of the present invention comprises, in order from an object side to an image side: a flat panel 1360, a first lens element 1310, a stop 1300, a second lens element 1320, a third lens element 1330, an IR cut filter 1370, and an image plane 1380, wherein the three-piece compact optical lens system has a total of three lens elements with refractive power. The stop 1300 is disposed between the first lens element 1310 and the second lens element 1320.

The flat panel 1360 made of glass is located between an object O and the first lens element 1310 and has no influence on the focal length of the three-piece compact optical lens system.

The first lens element 1310 with a negative refractive power has an object-side surface 1311 being concave near an optical axis 1390 and an image-side surface 1312 being concave near the optical axis 1390, the object-side surface 1311 and the image-side surface 1312 are aspheric, and the first lens element 1310 is made of plastic material.

The second lens element 1320 with a positive refractive power has an object-side surface 1321 being convex near the optical axis 1390 and the image-side surface 1322 being convex near the optical axis 1390, the object-side surface 1321 and the image-side surface 1322 are aspheric, and the second lens element 1320 is made of plastic material.

The third lens element 1330 with a positive refractive power has an object-side surface 1331 being concave near the optical axis 1390 and an image-side surface 1332 being convex near the optical axis 1390, the object-side surface 1331 and the image-side surface 1332 are aspheric, and the third lens element 1330 is made of plastic material.

The IR cut filter 1370 made of glass is located between the third lens element 1330 and the image plane 1380 and has no influence on the focal length of the three-piece compact optical lens system.

The detailed optical data of the thirteenth embodiment is shown in table 25, and the aspheric surface data is shown in table 26.

TABLE 25

Embodiment 13
f(focal length) = 0.41 mm, Fno = 1.47, FOV = 108.1 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.500 | glass | 1.52 | 64.2 | |
| 2 | | infinity | 1.331 | | | | |
| 3 | Lens 1 | −0.843 (ASP) | 0.378 | plastic | 1.54 | 56 | −1.027 |
| 4 | | 1.928 (ASP) | 0.378 | | | | |
| 5 | stop | infinity | 0.009 | | | | |
| 6 | Lens 2 | 0.972 (ASP) | 0.296 | plastic | 1.64 | 22.5 | 0.709 |
| 7 | | −0.756 (ASP) | 0.030 | | | | |
| 8 | Lens 3 | −3.514 (ASP) | 0.244 | plastic | 1.64 | 22.5 | 1.113 |
| 9 | | −0.610 (ASP) | 0.455 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 26

Aspheric Coefficients

| surface | 3 | 4 | 6 | 7 | 8 | 9 |
|---|---|---|---|---|---|---|
| K: | −2.2362E+00 | −3.3745E+02 | −1.0571E+02 | 2.8497E−01 | −2.1565E+01 | −2.1919E+00 |
| A: | 2.9700E+00 | 5.4168E+00 | 7.4607E+00 | 1.5634E+00 | 2.3501E+00 | 2.3346E+00 |
| B: | −1.1069E+01 | 9.0972E+00 | −1.0751E+02 | −7.1435E+01 | −5.7065E+01 | −2.7162E+01 |
| C: | 3.5276E+01 | 5.5538E+02 | −9.4256E+02 | 5.5088E+02 | 3.4026E+02 | 1.1783E+02 |
| D: | −5.0177E+01 | −6.4540E+03 | 2.5280E+04 | 2.3453E+03 | 2.9163E+03 | 1.2740E+03 |
| E: | 2.8972E+01 | −3.6209E+04 | 2.6569E+05 | −3.4098E+03 | 2.3166E+03 | 1.0112E+04 |
| F | 2.0766E+01 | 9.3658E+05 | −7.3232E+06 | −3.1066E+05 | −3.4197E+05 | −2.1800E+05 |
| G | −2.5109E+01 | −3.5226E+06 | 3.5207E+07 | 9.5880E+05 | 1.0964E+06 | 6.7802E+05 |

In the thirteenth embodiment, the equation of the aspheric surface profiles of the aforementioned lens elements is the same as the equation of the first embodiment. Also, the definitions of these parameters shown in the following table are the same as those stated in the first embodiment with corresponding values for the thirteenth embodiment, so an explanation in this regard will not be provided again.

Moreover, these parameters can be calculated from Table 25 and Table 26 as the following values and satisfy the following conditions:

| Embodiment 13 | |
|---|---|
| f[mm] | 0.41 |
| Fno | 1.47 |
| FOV[deg.] | 108.1 |
| OTL | 4.83 |
| PTL | 3.33 |
| \|f/(f1 * f2 * f3)\|[mm$^{-2}$] | 0.50 |
| f/f1 | -0.39 |
| f/f2 | 0.57 |
| f/f3 | 0.36 |
| f/f23 | 0.79 |
| f1/f23 | -2.00 |
| f1/R1 | 1.22 |
| f1/R2 | -0.53 |
| f2/R3 | 0.73 |
| f2/R4 | -0.94 |
| f3/R5 | -0.32 |
| f3/R6 | -1.82 |
| R1/R2 | -0.44 |
| R3/R4 | -1.29 |
| R5/R6 | 5.76 |
| OTL/f | 11.92 |
| PTL/f | 8.22 |
| (f1 + f2 + f3)/(f1 * f2 * f3) [mm$^{-2}$] | -0.98 |
| P/Y | 4.91 |
| OTL/Y | 9.30 |

Figure 14A:
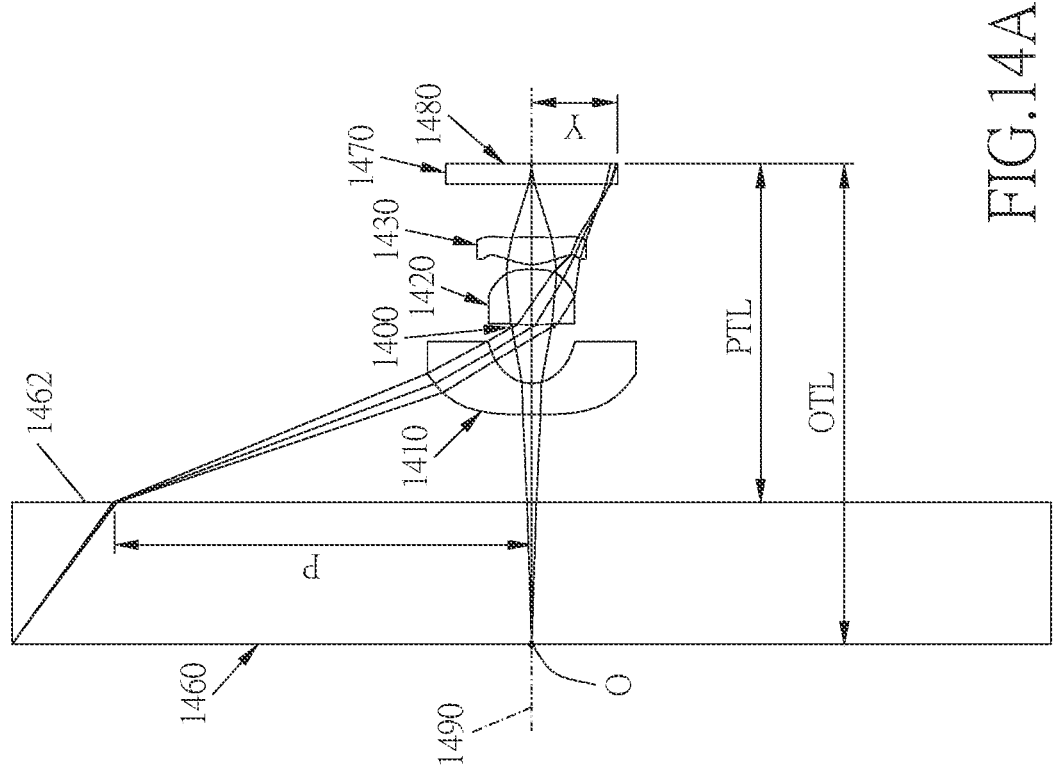
FIG. 14A shows a three-piece compact optical lens system in accordance with a fourteenth embodiment of the present invention.
Figure 14B:
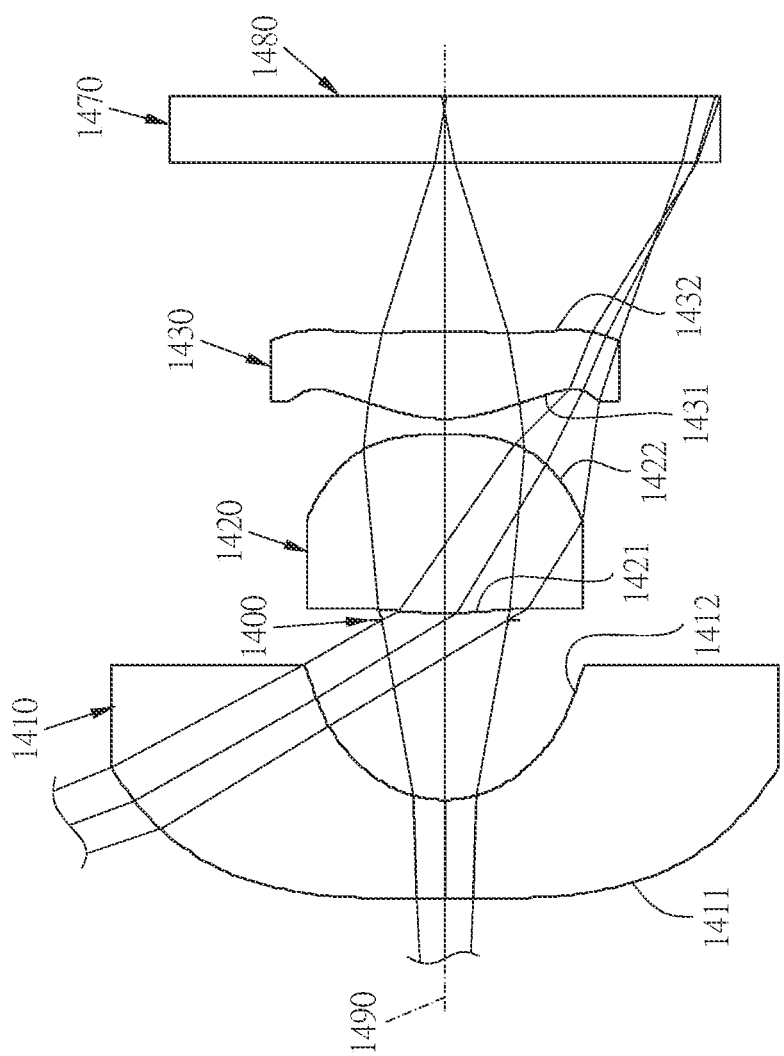
FIG. 14B is a partial enlarged view of FIG. 14A.
Figure 14C:
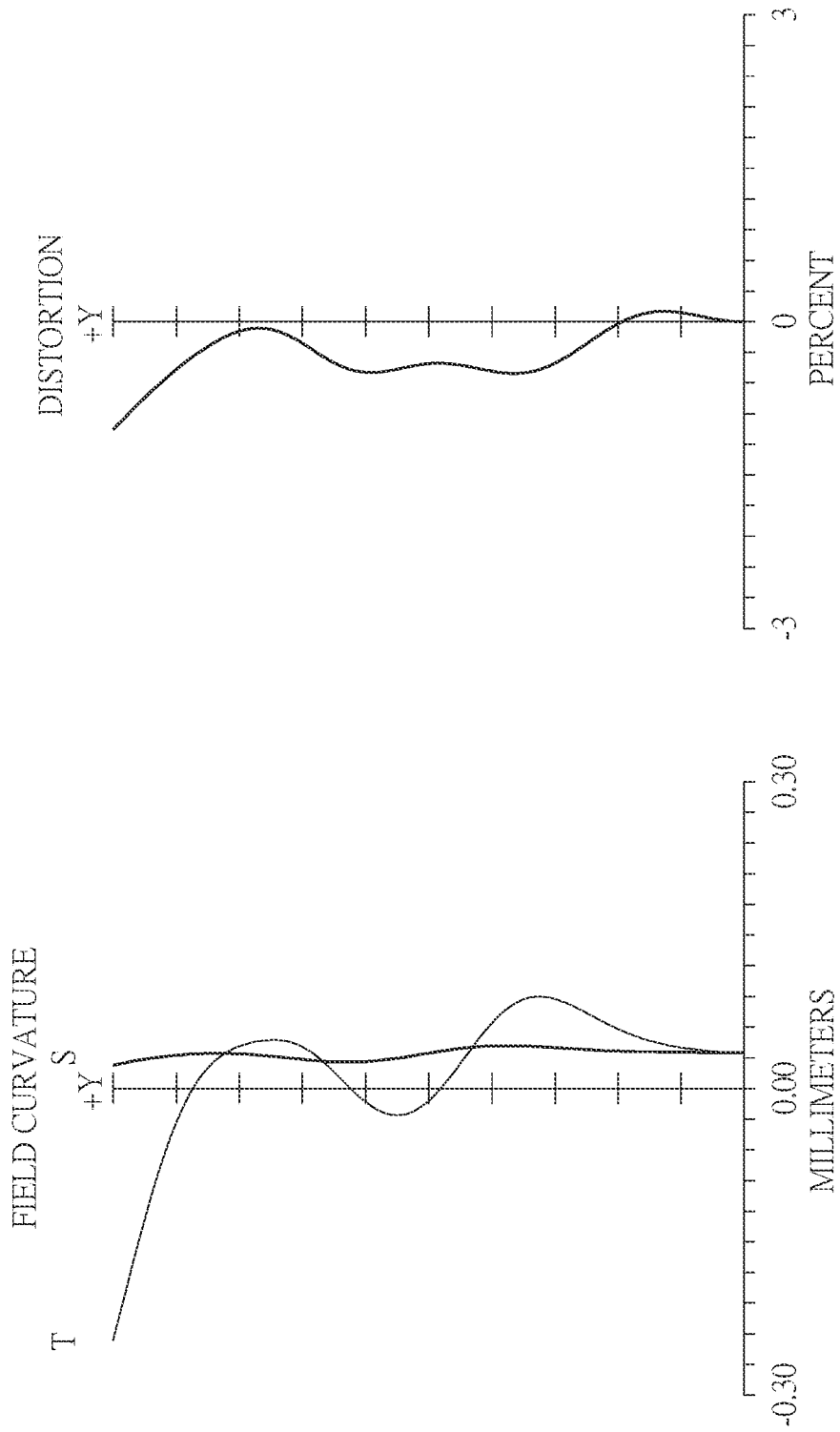
FIG. 14C shows the image plane curve and the distortion curve of the fourteenth embodiment of the present invention.

Referring to FIGS. 14A, 14B and FIG. 14C, FIG. 14A shows a three-piece compact optical lens system in accordance with a fourteenth embodiment of the present invention, FIG. 14B is a partial enlarged view of FIG. 14A, and FIG. 14C shows, in order from left to right, the image plane curve and the distortion curve of the fourteenth embodiment of the present invention. A three-piece compact optical lens system in accordance with the fourteenth embodiment of the present invention comprises, in order from an object side to an image side: a flat panel 1460, a first lens element 1410, a stop 1400, a second lens element 1420, a third lens element 1430, an IR cut filter 1470, and an image plane 1480, wherein the three-piece compact optical lens system has a total of three lens elements with refractive power. The stop 1400 is disposed between the first lens element 1410 and the second lens element 1420.

The flat panel 1460 made of glass is located between an object O and the first lens element 1410 and has no influence on the focal length of the three-piece compact optical lens system.

The first lens element 1410 with a negative refractive power has an object-side surface 1411 being convex near an optical axis 1490 and an image-side surface 1412 being concave near the optical axis 1490, the object-side surface 1411 and the image-side surface 1412 are aspheric, and the first lens element 1410 is made of plastic material.

The second lens element 1420 with a positive refractive power has an object-side surface 1421 being convex near the optical axis 1490 and the image-side surface 1422 being convex near the optical axis 1490, the object-side surface 1421 and the image-side surface 1422 are aspheric, and the second lens element 1420 is made of plastic material.

The third lens element 1430 with a positive refractive power has an object-side surface 1431 being convex near the optical axis 1490 and an image-side surface 1432 being convex near the optical axis 1490, the object-side surface 1431 and the image-side surface 1432 are aspheric, and the third lens element 1430 is made of plastic material.

The IR cut filter 1470 made of glass is located between the third lens element 1430 and the image plane 1480 and has no influence on the focal length of the three-piece compact optical lens system.

The detailed optical data of the fourteenth embodiment is shown in table 27, and the aspheric surface data is shown in table 28.

TABLE 27

Embodiment 14
f(focal length) = 0.39 mm, Fno = 1.50, FOV = 143.4 deg.

| surface | | Curvature Radius | Thickness | Material | Index | Abbe # | Focal length |
|---|---|---|---|---|---|---|---|
| 0 | object | infinity | 0.000 | | | | |
| 1 | flat panel | infinity | 1.465 | glass | 1.52 | 64.2 | |
| 2 | | infinity | 0.907 | | | | |
| 3 | Lens 1 | 100.806 (ASP) | 0.318 | plastic | 1.54 | 56 | -0.804 |
| 4 | | 0.438 (ASP) | 0.579 | | | | |
| 5 | stop | infinity | 0.023 | | | | |
| 6 | Lens 2 | 1.654 (ASP) | 0.576 | plastic | 1.54 | 56 | 1.960 |
| 7 | | -2.686 (ASP) | 0.051 | | | | |
| 8 | Lens 3 | 0.583 (ASP) | 0.283 | plastic | 1.64 | 22.5 | 0.719 |
| 9 | | -1.966 (ASP) | 0.546 | | | | |
| 10 | IR-filter | infinity | 0.210 | glass | 1.52 | 54.5 | |
| 11 | | infinity | infinity | | | | |
| 12 | Image plane | infinity | 0.000 | | | | |

TABLE 28

| Aspheric Coefficients | | | | | | |
|---|---|---|---|---|---|---|
| surface | 3 | 4 | 6 | 7 | 8 | 9 |
| K: | -7.9025E+01 | -9.7792E-01 | 3.8493E+00 | 2.2959E+01 | -3.8031E+00 | -5.3410E+01 |
| A: | 3.3919E-01 | 4.6434E-01 | -8.9808E-01 | -5.6153E+00 | -9.7728E-01 | 2.3129E+00 |
| B: | -2.8327E-01 | 7.8700E+00 | -1.5985E+01 | 1.3648E+01 | 3.0802E+00 | -6.5931E+00 |
| C: | 1.9890E-01 | 4.5563E+01 | 4.9613E+01 | -1.3640E+01 | -4.5797E+00 | -1.5064E+00 |

TABLE 28-continued

| | Aspheric Coefficients | | | | | |
|---|---|---|---|---|---|---|
| surface | 3 | 4 | 6 | 7 | 8 | 9 |
| D: | −2.2727E−02 | −6.8060E+02 | 1.0346E+03 | −5.9763E+01 | −4.0423E+01 | 1.0277E+01 |
| E: | −3.2964E−02 | 4.3919E+03 | −1.6354E+02 | 9.6214E+01 | −7.1267E+01 | 6.6424E+00 |
| F | 1.7054E−02 | 2.6783E+03 | −6.3971E+04 | 4.2482E+02 | 8.3388E+01 | 3.5107E+00 |
| G | −3.8132E−03 | −2.9701E+04 | 9.4078E+03 | −2.7147E+03 | 8.3674E+02 | 4.0253E+00 |

In the fourteenth embodiment, the equation of the aspheric surface profiles of the aforementioned lens elements is the same as the equation of the first embodiment. Also, the definitions of these parameters shown in the following table are the same as those stated in the first embodiment with corresponding values for the fourteenth embodiment, so an explanation in this regard will not be provided again.

Moreover, these parameters can be calculated from Table 27 and Table 28 as the following values and satisfy the following conditions:

| Embodiment 14 | |
|---|---|
| f[mm] | 0.39 |
| Fno | 1.50 |
| FOV[deg.] | 143.4 |
| OTL | 4.96 |
| PTL | 3.49 |
| $|f/(f1 * f2 * f3)|[mm^{-2}]$ | 0.35 |
| f/f1 | −0.49 |
| f/f2 | 0.20 |
| f/f3 | 0.55 |
| f/f23 | 0.65 |
| f1/f23 | −1.34 |
| f1/R1 | −0.01 |
| f1/R2 | −1.83 |
| f2/R3 | 1.18 |
| f2/R4 | −0.73 |
| f3/R5 | 1.23 |
| f3/R6 | −0.37 |
| R1/R2 | 230.11 |
| R3/R4 | −0.62 |
| R5/R6 | −0.30 |
| OTL/f | 12.64 |
| PTL/f | 8.91 |
| $(f1 + f2 + f3)/(f1 * f2 * f3)$ [mm$^{-2}$] | −1.66 |
| P/Y | 4.95 |
| OTL/Y | 5.08 |

In the present three-piece compact optical lens system, the lens elements can be made of plastic or glass. If the lens elements are made of plastic, the cost will be effectively reduced. If the lens elements are made of glass, there is more freedom in distributing the refractive power of the three-piece compact optical lens system. Plastic lens elements can have aspheric surfaces, which allow more design parameter freedom (than spherical surfaces), so as to reduce the aberration and the number of the lens elements, as well as the total track length of the three-piece compact optical lens system.

In the present three-piece compact optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

While we have shown and described various embodiments in accordance with the present invention, it should be clear to those skilled in the art that further embodiments may be made without departing from the scope of the present invention.

What is claimed is:

1. A three-piece compact optical lens system, in order from an object side to an image side, comprising:
   a flat panel made of glass;
   a first lens element with a negative refractive power, at least one of an object-side surface and an image-side surface of the first lens element being aspheric;
   a stop;
   a second lens element with a positive refractive power, having an object-side surface being convex near an optical axis, at least one of the object-side surface and an image-side surface of the second lens element being aspheric; and
   a third lens element with a refractive power, at least one of an object-side surface and an image-side surface of the third lens element being aspheric;
   wherein the three-piece compact optical lens system has a total of three lens elements with refractive power, a distance from an object to an image plane along the optical axis is OTL, a distance from an image-side surface of the flat panel to the image plane along the optical axis is PTL, an image height of the image plane is Y, an object height of a chief ray of the image height of the image plane which corresponds to the image-side surface of the flat panel is P, a focal length of the three-piece compact optical lens system is f, a focal length of the first lens element is f1, a radius of curvature of the object-side surface of the first lens element is R1, a radius of curvature of the image-side surface of the first lens element is R2, and they satisfy the relations:
   2.5 mm<PTL<4.5 mm; 2.2<P/Y<7.0; 4<OTL/Y<12; 7.71<OTL/f≤12.64; −0.01≅f1/R1≅0.14 and −38.2 <R1/R2≅−31.83; or
   2.5 mm<PTL<4.5 mm; 2.2<P/Y<7.0; 4<OTL/Y<12; 7.71<OTL/f≤12.64; −0.01≅f1/R1≅0.14 and −9.98<R1/R2≅−276.13.

2. The three-piece compact optical lens system as claimed in claim 1, wherein the focal length of the three-piece compact optical lens system is f, the focal length of the first lens element is f1, and they satisfy the relation: −0.86<f/f1<−0.22.

3. The three-piece compact optical lens system as claimed in claim 1, wherein the focal length of the three-piece compact optical lens system is f, a focal length of the second lens element is f2, and they satisfy the relation: 0.05<f/f2<1.27.

4. The three-piece compact optical lens system as claimed in claim 1, wherein the focal length of the three-piece compact optical lens system is f, a focal length of the third lens element is f3, and they satisfy the relation: $-0.17 < f/f3 < 0.82$.

5. The three-piece compact optical lens system as claimed in claim 1, wherein the focal length of the three-piece compact optical lens system is f, a focal length of the second lens element and the third lens element combined is f23, and they satisfy the relation: $0.45 < f/f23 < 1.04$.

6. The three-piece compact optical lens system as claimed in claim 1, wherein the focal length of the first lens element is f1, a focal length of the second lens element and the third lens element combined is f23, and they satisfy the relation: $-3.07 < f1/f23 < -0.63$.

7. The three-piece compact optical lens system as claimed in claim 1, wherein the focal length of the first lens element is f1, the radius of curvature of the image-side surface of the first lens element is R2, and they satisfy the relation: $-2.41 < f1/R2 < 1.93$.

8. The three-piece compact optical lens system as claimed in claim 1, wherein a focal length of the second lens element is f2, a radius of curvature of the object-side surface of the second lens element is R3, and they satisfy the relation: $0.25 < f2/R3 < 5.64$.

9. The three-piece compact optical lens system as claimed in claim 1, wherein a focal length of the second lens element is f2, a radius of curvature of the image-side surface of the second lens element is R4, and they satisfy the relation: $-2.04 < f2/R4 < 3.87$.

10. The three-piece compact optical lens system as claimed in claim 1, wherein a focal length of the third lens element is f3, a radius of curvature of the object-side surface of the third lens element is R5, and they satisfy the relation: $-56.34 < f3/R5 < 2.58$.

11. The three-piece compact optical lens system as claimed in claim 1, wherein a focal length of the third lens element is f3, a radius of curvature of the image-side surface of the third lens element is R6, and they satisfy the relation: $-40.72 < f3/R6 < 0.49$.

12. The three-piece compact optical lens system as claimed in claim 1, wherein a radius of curvature of the object-side surface of the second lens element is R3, a radius of curvature of the image-side surface of the second lens element is R4, and they satisfy the relation: $-5.91 < R3/R4 < 0.82$.

13. The three-piece compact optical lens system as claimed in claim 1, wherein a radius of curvature of the object-side surface of the third lens element is R5, a radius of curvature of the image-side surface of the third lens element is R6, and they satisfy the relation: $-2.86 < R5/R6 < 22.19$.

14. The three-piece compact optical lens system as claimed in claim 1, wherein the focal length of the first lens element is f1, a focal length of the second lens element is f2, a focal length of the third lens element is f3, and they satisfy the relation: $-4.56 \text{ mm}^{-2} < (f1+f2+f3)/(f1 \ast f2 \ast f3) < -0.53 \text{ mm}^{-2}$.

15. The three-piece compact optical lens system as claimed in claim 1, wherein the object-side surface of the first lens element is concave near the optical axis.

16. The three-piece compact optical lens system as claimed in claim 1, wherein the image-side surface of the second lens element is convex near the optical axis.

17. The three-piece compact optical lens system as claimed in claim 1, wherein the image-side surface of the third lens element is convex near the optical axis.

* * * * *